United States Patent
Hashimoto et al.

(10) Patent No.: US 7,820,301 B2
(45) Date of Patent: *Oct. 26, 2010

(54) CELLULOSE ACYLATE FILM AND METHOD FOR PRODUCING THE SAME

(75) Inventors: Kiyokazu Hashimoto, Minami-ashigara (JP); Masaaki Otoshi, Fujinomiya (JP)

(73) Assignee: FUJIFILM CORPORATION, Minato-Ku, Tokyo (JP)

( * ) Notice: Subject to any disclaimer, the term of this patent is extended or adjusted under 35 U.S.C. 154(b) by 1483 days.

This patent is subject to a terminal disclaimer.

(21) Appl. No.: 11/084,259

(22) Filed: Mar. 21, 2005

(65) Prior Publication Data

US 2005/0234231 A1  Oct. 20, 2005

(30) Foreign Application Priority Data

Mar. 19, 2004 (JP) .............................. 2004-079973

(51) Int. Cl.
*B32B 5/16* (2006.01)

(52) U.S. Cl. ....................... 428/532; 428/535; 428/536; 428/537.1; 428/537.5; 427/162; 427/163.1; 427/164; 427/307; 427/308; 427/324; 427/353; 425/354; 425/402; 425/412.2

(58) Field of Classification Search ................. 428/532, 428/535, 536, 537.1, 537.5; 427/162, 163.1, 427/164, 307, 308, 324, 353, 354, 402, 412.2
See application file for complete search history.

(56) References Cited

U.S. PATENT DOCUMENTS 7,166,321 B2 * 1/2007 Ogawa et al. ................ 427/162
7,282,091 B2 * 10/2007 Hashimoto ............. 106/163.01

FOREIGN PATENT DOCUMENTS

| JP | 2001-042130 | 2/2001 |
| JP | 2003-315551 | 11/2003 |

* cited by examiner

*Primary Examiner*—Leszek Kiliman
(74) *Attorney, Agent, or Firm*—Buchanan Ingersoll & Rooney PC

(57) ABSTRACT

A cellulose acylate film showing 10 marks/m$^2$ or less of adhesion marks and having an in-plane retardation value (Re value) of 0 to 200 nm and a retardation value along the thickness direction (Rth value) of 30 to 500 nm. The cellulose acylate film shows favorable optical uniformity and can provide an improved liquid crystal display.

24 Claims, 2 Drawing Sheets

CELLULOSE ACYLATE FILM AND METHOD FOR PRODUCING THE SAME

BACKGROUND OF THE INVENTION

1. Field of the Invention

The present invention relates to a cellulose acylate film showing favorable optical uniformity and a method for producing the same.

2. Description of the Related Art

It has conventionally been attempted to increase viewing angles of liquid crystal display devices by using a cellulose acylate film obtained by stretching a cellulose acylate resin so that the film should have an in-plane retardation value (Re value) and retardation value along the thickness direction (Rth value) as a phase difference film.

As methods for stretching a cellulose acylate resin for such a purpose, a method of performing the stretching along the longitudinal direction (for example, the longitudinal direction in a roll-to-roll process), a method of performing the stretching along the transverse direction (for example, the direction perpendicular to the longitudinal direction in a roll-to-roll process, width direction) and a method of performing the stretching along the longitudinal and transverse directions simultaneously (simultaneous stretching) are known.

Among these, the longitudinal stretching has conventionally been used in many cases, because it uses a compact apparatus. FIG. 2 shows an example of a conventionally used longitudinal stretching apparatus, and in this apparatus, a cellulose acylate resin (4) is heated to a temperature higher than the glass transition temperature (Tg) and stretched between two or more pairs of nip rollers (5, 5) by using a transportation speed of the rollers on the exit side faster than that of the rollers on the entrance side.

Furthermore, for example, as for a method of stretching a cellulose acylate resin, Japanese Patent Laid-open Publication (Kokai) No. 2001-42130 describes that the unevenness of slow axis angle can be improved by using reverse directions for casting for film formation and longitudinal stretching.

Further, Japanese Patent Laid-open Publication No. 2003-315551 describes a method of performing the stretching by using nip rollers installed in a stretching zone with a short span represented by a length/width ratio (L/W) of 2 or less so as to improve the orientation along the thickness direction (Rth value). The length/width ratio (LAN) used herein means a value obtained by dividing the interval of the nip rollers used for the stretching (L) with the width (W) of the cellulose acylate film to be stretched (the same shall also apply to the present invention).

However, if a stretched film obtained by any of the methods described in these patent documents is used as a phase difference film, fine planar unevenness and frame-like failure are generated, and improvement of these phenomena has been desired.

SUMMARY OF THE INVENTION

The present invention aims at solving the aforementioned problem, that is, an object of the present invention is to improve the fine display unevenness caused when a cellulose acylate film obtained by stretching a cellulose acylate resin is used in a liquid crystal display device as, for example, a phase difference plate.

The aforementioned object of the present invention has been achieved by the followings.

(1) A cellulose acylate film showing 10 marks/m$^2$ or less of adhesion marks and having an in-plane retardation value (Re value) of 0 to 200 nm and a retardation value along the thickness direction (Rth value) of 30 to 500 nm.

(2) The cellulose acylate film of (1), which shows variation ratios of 5% or less for the Re value and Rth value along both of the width direction and the longitudinal direction.

(3) The cellulose acylate film of (1) or (2), wherein substitution degrees of acylate groups in the cellulose acylate film satisfy the following equations [3] and [4]:

$$2.5 \leq A+B < 3.0 \qquad \text{Equation [3]}$$

$$1.25 \leq B < 3 \qquad \text{Equation [4]}$$

wherein, in the equations [3] and [4], A represents a substitution degree of acetyl groups, and B represents the sum of substitution degrees of propionyl groups, butyryl groups, pentanoyl groups and hexanoyl groups.

(4) The cellulose acylate film of any one of (1) to (3), which is transversely stretched by 1.05 to 2.5 times.

(5) The cellulose acylate film of any one of (1) to (4), which is stretched with a ratio of longitudinal stretching to transverse stretching of 0.05 to 0.5.

(6) The cellulose acylate film of any one of (1) to (5), which is stretched with a ratio of longitudinal stretching to transverse stretching of 2 to 20.

(7) The cellulose acylate film of any one of (1) to (6), which is longitudinally stretched with a ratio of width after the stretching to width before the stretching of 0.9 to 1.

(8) The cellulose acylate film of any one of (1) to (7), which is formed by a malt film formation method.

(9) The cellulose acylate film of any one of (1) to (8), which comprises 1 to 20% of a low molecular weight component.

(10) The cellulose acylate film of any one of (1) to (9), which comprises 1 to 20% of a plasticizer.

(11) The cellulose acylate film of any one of (1) to (10), which is formed by a solution film formation method.

(12) The cellulose acylate film of (11), which is obtained by stretching a cellulose acylate resin containing 3% by weight or less of a residual amount of a solvent used for dissolving the cellulose acylate resin in the solution film formation method.

(13) The cellulose acylate film of any one of (1) to (12), wherein the Rth value is larger than the Re value.

(14) An optical material utilizing the cellulose acylate film of any one of (1) to (13).

(15) The optical material of (14), which is a polarizing plate comprising a polarizing film and at least one layer of the cellulose acylate film provided on the polarizing film.

(16) The optical material of (14), which is an optical compensation film for liquid crystal display panels comprising the cellulose acylate film.

(17) The optical material of (14) which is an antireflection film comprising the cellulose acylate film.

(18) A method for producing a cellulose acylate film, which comprises longitudinally stretching 1.05 to 3 times a cellulose acylate film having a length/width ratio of more than 2 and not more than 50.

(19) The method for producing a cellulose acylate film of (18), wherein the film is longitudinally stretched by using two or more pairs of nip rollers installed outside a stretching zone.

(20) The method for producing a cellulose acylate film of (18) or (19), wherein the film is transversely stretched by using a tenter.

(21) The method for producing a cellulose acylate film of any one of (18) to (20), wherein the temperature of two or more pairs of the nip rollers is not lower than (Tg--150)° C. and not more than Tg and the temperature of the stretching zone is (Tg) to (Tg+100)° C. in which Tg is a glass transition temperature of the cellulose acylate film.

(22) The method for producing a cellulose acylate film of any one of (18) to (21), wherein the film is longitudinally stretched while the film is transported in a heat treatment zone in a non-contact state.

(23) The method for producing a cellulose acylate film of any one of (18) to (22), wherein a temperature drop rate after the stretching is adjusted at 1 to 30° C./sec.

(24) The method for producing a cellulose acylate film of any one of (18) to (23), wherein slack in the width direction during the stretching is controlled at 0.5% to 50%.

The present invention can improve the fine display unevenness observed when a phase difference plate obtained by stretching a cellulose acylate film is used in a liquid crystal display device.

BEST MODE FOR CARRYING OUT THE INVENTION

Hereafter, the present invention will be explained in detail. The ranges expressed with "to" in the present specification mean ranges including the numerical values indicated before and after "to" as a lower limit value and upper limit value. The term "Tg" used in the present invention refers to a glass transition temperature of cellulose acylate resin or film, unless otherwise indicated.

In the present invention, as a result of analysis concerning cause of the fine display unevenness observed when a cellulose acylate film is used in a liquid crystal display device, it was elucidated that the unevenness originated in adhesion marks of the cellulose acylate film formed by contact with the nip rollers.

The cellulose acylate film of the present invention is stretched at a high ratio so as to have an in-plane retardation value (Re value) and a retardation value for the thickness direction (Rth value). These Re values (nm) and Rth value (nm) are represented by the following equations.

$$Re = |n(MD) - n(TD)| \times T \qquad \text{Equation (1)}$$

$$Rth = |\{(n(MD) + n(TD))/2\} - n(TH)| \times T \qquad \text{Equation (2)}$$

In the equations (1) and (2), n(MD), n(TD) and n(TH) represent refractive indexes along the longitudinal direction, width direction and thickness direction of the film, respectively, and T represents thickness of the film in a unit of nm.

Figure 2:
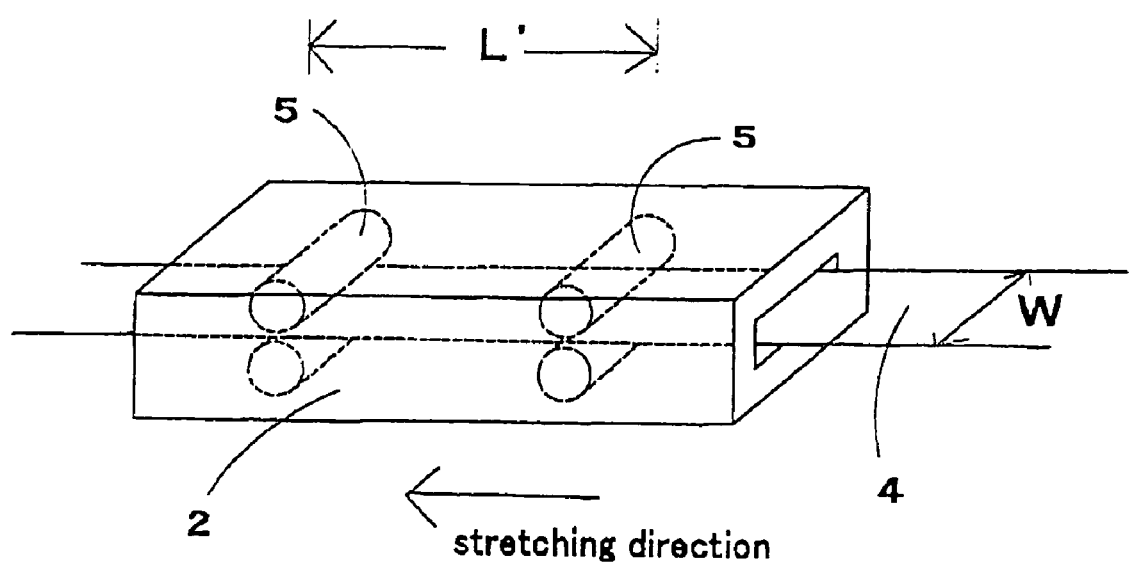
FIG. 2 shows an example of conventionally used longitudinal stretching zone.

In order to perform the stretching at a high ratio, the stretching is preferably performed at a high temperature. The longitudinal stretching is generally attained in many cases by using different transportation speeds of two or more pairs of nip rollers. For example, the stretching is performed by using a short roller interval (i.e., a relatively small interval of the nip rollers (L') with respect to the width of the cellulose acylate film (W), thus a small length/width ratio (L'/W)) as shown in FIG. 2 while heating not only the cellulose acylate resin but also the nip rollers to a high temperature. This is because the nip rollers are used also as preheating rollers to quickly heat the cellulose acylate resin for quick stretching in a short period of time.

Under such conditions, adhesion failure is very likely to occur. The adhesion failure is a mark in the shape of two unparallel short lines (bird footprint shape) having a length of several millimeters or so, and when the film adhered to the stretching roller upon contact is removed from the roller, the film surface is radially pooled, and an adhesion point as a starting point is radially extended to form such a mark. When the film is stretched at a high ratio, the film is often stretched at a high temperature, and such adhesion failures notably appear. The number of such adhesion marks in preferably 10 marks/m$^2$ or less, more preferably 3 marks/m$^2$ or less, still more preferably 5 marks/m$^2$ or less.

In order to cope with such adhesion failures, the present invention is characterized by stretching with an increased length/width ratio. That is, if the stretching is performed with a small length/width ratio, i.e., within a short distance (short time), a large stretching stress is required to rapidly perform the stretching, and as a result, adhesion failures generated on the nip rollers are likely to be amplified. That is, a large tension is rapidly applied after the adhesion, and therefore the areas of the adhesion marks become likely to be enlarged. On the other hand, if the length/width ratio is large, the span in which the stretching is performed becomes long, and the film is slowly stretched within this span. Thus, adhesion in unlikely to be amplified and becomes difficult to be detected by visual inspection. The length/width ratio is preferably more than 2 and not more than 50, more preferably 3 to 40, still more preferably 4 to 20. The stretching temperature is preferably (Tg) to (Tg+100)° C., more preferably (Tg+2) to (Tg+50)° C., still more preferably (Tg+5) to (Tg+30)° C. The stretching ratio is preferably 1.05 to 3 times, more preferably 1.05 to 1.7 times, still more preferably 1.05 to 1.4 times. By such stretching, an Re value of 0 to 200 nm, more preferably 10 to 200 nm, still more preferably 15 to 100 nm, an Rth value of 30 to 500 nm, more preferably 50 to 400 nm, still more preferably 70 to 350 nm, and variation of the Re value and Rth value in the width direction and longitudinal direction of 5% or less, more preferably 4% or less, still more preferably 3% or less, can be obtained. That is, if adhesion failures occur, stretching unevenness is generated on and around the adhesion failure regions, and unevenness of Re value and Rth value is also simultaneously caused. Therefore, by improving the adhesion unevenness according to the present invention, unevenness of these can also be decreased.

Figure 1:
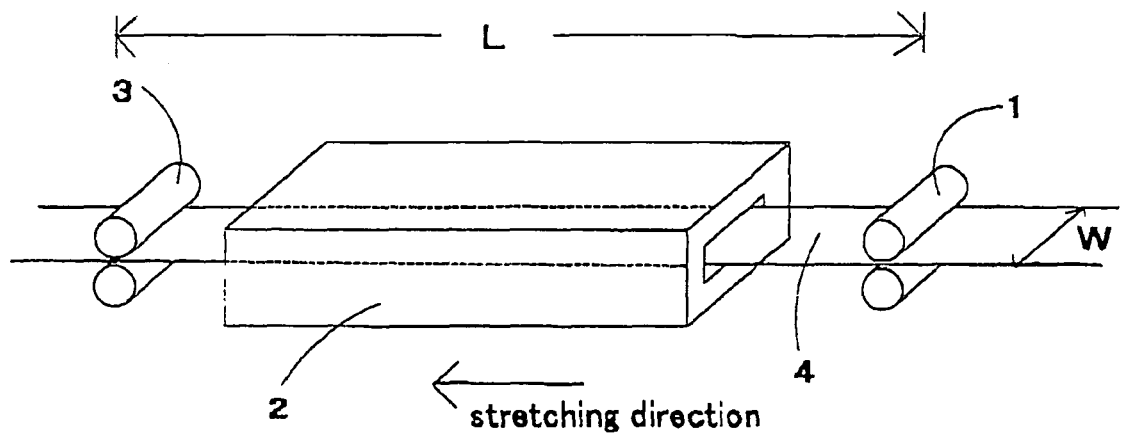
FIG. 1 shows an example of preferred longitudinal stretching zone used in the present invention.

Furthermore, as another countermeasure against adhesion failure, the present invention is characterized by providing the nip rollers outside the stretching zone required to be heated. That is, the nip rollers (1, 3) are provided outside the stretching zone (2) as shown in FIG. 1. The temperature of the nip rollers is preferably not lower than (Tg−150)° C. and lower than (Tg)° C., more preferably (Tg−120) to (Tg−2)° C., still more preferably (Tg−100) to (Tg−5)° C., for both of the entrance and exit sides. When the stretching is performed in such a long span as in the present invention, it is not necessary to also heat the nip rollers to rapidly heat the cellulose acylate resin as in the conventional techniques, but the stretching can be performed while slowly heating the film in the long stretching zone. Therefore, the nip rollers may be at a low temperature as described above.

In such a longitudinal stretching zone, the film in more preferably transported in a non-contact state without contact with rollers etc., because such a state unlikely to generate adhesion.

Further, in the present invention, a ratio of widths before and after stretching (width after stretching/width before stretching) is preferably 0.9 to 1, more preferably 0.91 to 0.99, and further preferably 0.92 to 0.98. In this way, it is possible to make Rth larger. That is, though the thickness direction and the width direction (TD direction) are shrunk in proportion to the elongation in the longitudinal direction (LD direction) by the longitudinal stretching, by making the shrinkage in the TD direction small as described above, it is possible to make the shrinkage in the width direction larger and to make the in-plane orientation large, and therefore, it is possible to make Rth large.

In order to make the ratio of widths before and after stretching fall within the aforementioned range, such can be achieved by, for example, (1) a method in which a temperature drop rate after stretching is adjusted at 1 to 30° C./sec and (2) a method in which slack in the width direction during stretching is controlled at 05% to 50%.

The method (1) will be described below in detail. When the temperature drop rate is adjusted preferably at 1 to 30° C./sec, more preferably 2 to 20° C./sec, and further preferably 3 to 15° C./sec, it is possible to suppress rapid width shrinkage of the stretched film at an exit. That is, at the exit, the stretched film is liable to shrink in the width direction, the temperature is lowered at Tg or lower, the elastic modulus increases, and a large shrinkage stress is generated in the width direction. The stress to shrink this width is transmitted into the inside of the stretching zone, thereby making the shrinkage in the width direction in the stretching zone larger. As a result, the shrinkage in the thickness direction in the stretching zone is suppressed, whereby Rth hardly reveals. Accordingly, the term "cooling rate after stretching" as referred to in the present invention can be defined as a cooling rate from the exit of the stretching zone to the nip rollers. That is, the cooling rate after stretching refers to a value obtained by dividing the temperature difference during this period by the necessary time during this period. Such a control of the cooling rate at the exit of the stretching zone can be achieved by providing a gradual cooling zone behind the stretching zone or providing a blow opening of temperature controlled air or a radiant heat source (for example, an IR heater and a halogen heater) at the exit of the stretching zone. By applying such a cooling rate, there gives rise an effect to make variation ratios of the Re value and Rth value small. That is, it is possible to suppress the matter that the shrinkage stress in the width stress generates a non-uniform stress, whereby the Re value and Rth value are varied.

Next, the method (2) will be described below in detail. Slack in the width direction during stretching is controlled preferably at 0.5% to 50%, more preferably 1 to 35%, and further preferably 2 to 20%. The term "slack in the width direction" as referred to herein is a value determined by [slack (%)=100×(L/W)] wherein W represents a total width of the film, and L represents a linear distance between a straight line linking the both ends during stretching and the most slack portion. That is, what the slack in the width direction is large means that the film is elongated in the width direction by gravity, and shrinkage caused due to stretching is hardly generated. In the stretching zone, since the film is heated at Tg or higher and the elastic modulus is lowered, the film is elongated in the width direction even by such slight gravity. As a result, the shrinkage preferentially occurs in the width direction and the in-plane orientation advances, whereby the Rth value is liable to reveal. For example, in the case where floating transportation by air is carried out, the slack in the TD direction can be achieved by controlling the flow rates at the upper and lower blow exits of hot air (the flow rate in the lower side is made slightly low) By applying such slack in the TD direction, there gives rise to an effect for making variation ratios of the Re value and Rth value small. That is, it is estimated that when the shrinkage stress in the TD direction is relaxed by slacking, unevenness of the stress generated in the film plane is solved, whereby variation of the Re value and Rth value are suppressed.

An Re value and Rth value can be obtained by such stretching as described above. As for the Re value and Rth value, those satisfying the relationship of Re<Rth are more preferred, and those satisfying the relationship of Re×2<Rth are still more preferred. In order to realize such a high Rth value and a low Re value, it is preferable to longitudinally stretch a film first as described above and then stretch the film also in the transverse (width) direction. That is, the difference of orientation along the longitudinal direction and transverse direction corresponds to the difference of in-plane retardation value (Re value), and therefore if a film is also stretched along the transverse direction perpendicular to the longitudinal direction, in addition to the longitudinal direction, the difference of orientation along the longitudinal direction and transverse direction can be reduced, and thus in-plane orientation (Re value) can be reduced. Further, because the area increasing ratio is increased by the stretching along the transverse direction in addition to the longitudinal direction, the thickness is reduced. In connection with the reduction of the thickness, orientation along the thickness direction increases, and thus the Rth value can be increased. For the stretching along the transverse direction, a method of fixing both side ends of a film with a chuck and widening the film by using a tenter is generally used. The ratio of such transverse stretching is preferably more than 1 and not more than 3 times, more preferably 1.0 to 2.5 times, still more preferably 1.05 to 2.2 times, particularly preferably 1.1 to 2 times.

In the present invention, the ratio of longitudinal stretching to transverse stretching is preferably 0.05 to 0.5 (mainly transverse stretching) or 2 to 20 (mainly longitudinal stretching). In the case of transverse direction, the ratio of longitudinal stretching to transverse stretching is more preferably 0.03 to 0.45, and further preferably 0.1 to 0.4. In the case of longitudinal stretching, the ratio of longitudinal stretching to transverse stretching is more preferably 3 to 30, and further preferably 4 to 20. Of the longitudinal stretching and the transverse stretching, the transverse stretching is more preferable. This is because in the transverse stretching, variations of the Re value and the Rth value are small. Further, this is because in the transverse stretching, the slow axis is aligned in the width direction, and therefore, lamination with a polarizing film in the subsequent stop becomes easy. That is, since the polarizing film is prepared by stretching in the longitudinal direction, when the slow axis is crossed at right angles against the stretching direction, the rollers may be superimposed thereon as it is, and the film can be laminated in a roll-to-roll manner so that there is an advantage that times and labors can be largely reduced.

The term "ratio of longitudinal stretching to transverse stretching" as referred to in the present invention is a value obtained by dividing the ratio of longitudinal stretching by the ratio of transverse stretching, and the stretching ratio is expressed by the following expression (A):

[Stretching ratio (%)]={100×[(length after stretching)−(length before stretching)]/(length before stretching)}

Incidentally, the stretching ratio as referred to in the present invention refers to the subject stretching ratio unless otherwise indicated.

In usual stretching, the ratio of longitudinal stretching to transverse stretching of stretching for stretching with an equal balance between the longitudinal and transverse directions is 1±0.2. However, in the present invention, it is preferable to perform stretching strongly in one direction with imbalance. In this way, a frame-like failure can be reduced. The frame-like failure as referred to herein is a failure of light leakage such that when as in the present invention, a phase difference plate is laminated on a liquid crystal display plate (LCD), thereby displaying entirely a black color, immediately after turning on an electric supply, the LCD periphery becomes whitish in a frame-like state. According to this failure, by turning on an electric supply, the temperature of the phase difference plate increases to cause thermal expansion and generate a dimensional strain, and a stress is thus applied to the phase difference plate, whereby the retardation is changed. This frame-like failure is generated remarkably after taking out from forced thermo conditions (at 80° C. for 24 hours) This is caused by the matter that dimensional changes by thermal expansion and heat shrinkage are applied to this thermo, whereby the aforementioned dimensional strain is further increased.

In the prevent invention, as described above, the stretching is performed with imbalance, and in the cellulose acylate film of the present invention, the frame-like failure can be remarkably reduced by this stretching. It is considered that this mechanism involves in the following possibility. That is, as in the present invention, when the stretching ratio in one direction is increased, a coefficient of thermal expansion in that direction becomes small, the dimensional change hardly occurs, and movement on the LCD plate becomes difficult. In this way, when the dimension in one direction is fixed, the thermal dimensional change in the other direction is also suppressed, whereby the frame-like failure is reduced.

The stretching temperature is preferably (Tg) to (Tg+100)° C., more preferably (Tg+2) to (Tg+50)° C., still more preferably (Tg+4) to (Tg+50)° C., most preferably (Tg+4) to (Tg+30)° C.

As the cellulose acylate resin to be subjected to such stretching, the following cellulose acylate resin is more preferred.

(Cellulose Acylate Resin)

The cellulose acylate resin used in the present invention is preferably one having the following characteristics.

(1) A cellulose acylate resin in which substitution degrees of acylate groups satisfy the following equations (3) and (4):

$$2.5 \leq A+B < 3.0 \quad \text{Equation (3)}$$

$$1.25 \leq B < 3 \quad \text{Equation (4)}$$

(in the equations (3) and (4), A represents a substitution degree of acetyl groups, and B represents the sum of substitution degrees of propionyl groups, butyrate groups, pentanoyl groups and hexanoyl groups), more preferably, when ½ or more of B consists of the substitution degree of propionyl groups, $$2.6 \leq A+B \leq 2.95$$

$$2.0 \leq B \leq 2.95$$

and when less than ½ of B consists of the substitution degree of propionyl groups, $$2.6 \leq A+B \leq 2.95$$

$$1.3 \leq B \leq 2.5$$

still more preferably, when ½ or more of B consists of the substitution degree of propionyl groups, $$2.7 \leq A+B \leq 2.95$$

$$2.4 \leq B \leq 2.9$$

and when less than ½ of B consists of the substitution degree of propionyl groups, $$2.7 \leq A+B \leq 2.95$$

$$1.3 \leq B \leq 2.0$$

The present invention is characterized in that the substitution degree of acetyl groups is reduced, and the sum of the substitution degrees of propionyl groups, butyrate groups, pentanoyl groups and hexanoyl groups is increased. Thanks to this characteristic, unevenness of stretching is unlikely to occur during the stretching, and unevenness of the Re value and Rth value is also unlikely to occur. In addition, the crystal melting temperature (Tm) can be lowered, and thus the yellowing of the film caused by heat used for the melt film formation can be more effectively suppressed. Although these effects can be achieved by using substituents as large an possible, too large substituents tend to decrease the glass transition temperature (Tg) and elastic modulus, and therefore appropriate substituents are preferably selected. For the above reason; propionyl group, butyrate group, pentanoyl group and hexanoyl group are preferred, which are larger than acetyl group, propionyl group and butyrate group are more preferred, and butyrate group is still more preferred.

The fundamental principle of the synthesis method of such cellulose acylate is described in Migita et al., "Mokuzai Kagaku (Chemistry of Wood Material)", pp. 180-190 (published by Kyoritsu Shuppan Co., Ltd., 1968) A typical synthesis method is a liquid-phase acetylating method using a carboxylic acid anhydride, acetic acid and a sulfuric acid catalyst. Specifically, a cellulose material such an cotton linter or wood pulp is subjected to a pretreatment with an appropriate amount of acetic acid and then poured into a carboxylating mixture cooled beforehand to esterify the cellulose and thereby synthesize complete cellulose acylate (the sum of the acyl substitution degrees at the 2-, 3- and 6-positions is about 3.00). The aforementioned carboxylating mixture generally contains acetic acid as a solvent, carboxylic acid anhydride as an esterification agent and sulfuric acid as a catalyst. The carboxylic acid anhydride is usually used in a stoichiometrically excessive amount with respect to the total amount of cellulose, which reacts with the anhydride, and water present in the system. After completion of the acylation reaction, an aqueous solution of a neutralizing agent (e.g., carbonate, acetate or oxide of calcium, magnesium, iron, aluminum or zinc) is added to the system in order to hydrolyze excessive carboxylic acid anhydride remaining in the system and neutralize a part of the esterification catalyst remaining in the system. Then, the obtained complete cellulose acylate is kept at 50 to 90° C. in the presence of a small amount of an acetylation reaction catalyst (usually the remaining sulfuric acid) so that the cellulose acylate should be saponified, ripened and thereby converted into cellulose acylate having desired acyl substitution degree and polymerization degree. When the desired cellulose acylate is obtained, the cellulose acylate solution is poured into water or diluted sulfuric acid (or water or diluted sulfuric acid is poured into the cellulose acylate solution) after neutralizing the catalyst remaining in the system with such an a neutralizing agent as described above or without such neutralization to separate the cellulose acylate resin. This cellulose acylate resin is washed and subjected to stabilization treatment to yield a cellulose acylate resin.

The viscosity average polymerization degree of cellulose acylate preferably used in the present invention is generally 200 to 700, preferably 250 to 550, still more preferably 250 to 400, particularly preferably 250 to 350. The average polymerization degree can be measured by the limiting viscosity method of Uda et al. (Kazuo Uda and Hideo Saito, Journal of the Society of Fiber Science and Technology, Japan, vol. 18, No. 1, pp. 105-120, 1962). The method is also described in detail in Japanese Patent Laid-open Publication No. 9-95538.

The polymerization degree can also be controlled by removing low molecular weight components. If low molecular weight components are removed, the average molecular weight (polymerization degree) tends to become high. However, the viscosity becomes lower than that of ordinary cellulose acylate, and therefore the removal is useful. Low molecular weight components can be removed by washing a cellulose acylate resin with an appropriate organic solvent. The molecular weight can also be controlled by the polymerization method. When cellulose acylate containing a small amount of low molecular weight components is produced, the amount of the sulfuric acid catalyst for the acetylation reaction is preferably adjusted to 0.5 to 25 parts by weight for 100 parts by weight of the cellulose. If the amount of the sulfuric acid catalyst in adjusted to be within the aforementioned range, cellulose acylate having preferred molecular weight distribution (uniform molecular weight distribution) can be synthesized.

As the cellulose acylate resin used in the present invention, one having a weight average molecular weight/number average molecular weight ratio (Mw/Mn ratio) of 1.5 to 5.5, more preferably 2.0 to 5.0, still more preferably 2.5 to 5.0, most preferably 3.0 to 5.0, is preferably used.

Such a cellulose acylate resin may be used independently, or a mixture of two or more kinds of much cellulose acylate resins may be used. Further, an appropriate polymer component other than cellulose acylate resin may also be mixed unless such addition deteriorates the effects of the present invention. The polymer component to be mixed is preferably a polymer showing superior compatibility with a cellulose ester and transmission of 80% or higher, more preferably 90% or higher, still more preferably 92% or higher, as a film.

Further, by adding a plasticizer, the optical unevenness due to the adhesion caused in connection with the stretching can be more effectively reduced in the present invention. It is considered that this is because a small amount of plasticizer exuding on the surface exerts a function of lubricating oil and thereby prevents the adhesion. Examples of the plasticizer include, for example, alkyl phthalyl alkyl glycolates, phosphoric acid esters, carboxylic acid esters and so forth.

Examples of the alkyl phthalyl alkyl glycolates include, for example, methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, octyl phthalyl ethyl glycolate and so forth.

Examples of the phosphoric acid esters include, for example, triphenyl phosphate, tricresyl phosphate, phenyl diphenyl phosphate and so forth. It is further preferable to use the phosphoric acid ester plasticizers described in International Patent Publication in Japanese No. 6-501040, claims 3 to 7.

Examples of the carboxylic acid esters include, for example, phthalic acid esters such as dimethyl phthalate, diethyl phthalate, dibutyl phthalate, dioctyl phthalate, and diethylhexyl phthalate, citric acid esters such as acetyl trimethyl citrate, acetyl triethyl citrate and acetyl tributyl citrate, and adipic acid esters such as dimethyl adipate, dibutyl adipate, di-isobutyl adipate, bis(2-ethylhexyl) adipate, di-isodecyl adipate and bis(butyl diglycol adipate). In addition, butyl oleate, methyl acetyl ricinoleate, dibutyl sebacate, triacetine and so forth are preferably used independently or as a mixture of two or more kinds of them.

These plasticizers are preferably used in an amount of 0 to 20 weight %, more preferably 1 to 20 weight %, still more preferably 2 to 15 weight %, with respect to the cellulose acylate film. If needed, two or more kinds of these plasticizers may be used together.

Furthermore, in addition to the plasticizers, various addirives of low molecular weight (for example, ultraviolet inhibitors, antidegradants, optical anisotropy controlling agents, microparticles, infrared absorption agents, surface active agents, odor trapping agents, (amino etc.) and so forth) can be added. The addirives of low molecular weight is referred to as the components having a molecular weight of 1,000 or less. As infrared absorption dyes, for example, those described in Japanese Patent Laid-open Publication No. 2001-194522 can be used, and as ultraviolet ray absorption agents, for example, those described in Japanese Patent Laid-open Publication No. 2001-151901 can be used. These are preferably incorporated in an amount of 0.001 to 5 weight % with respect to the cellulose acylate resin. As the microparticles, those having an average particle size of 5 to 3000 nm are preferably used, and those consisting of metal oxide or crosslinked polymer are preferably used. The microparticles are preferably incorporated in an amount of 0.001 to 5 weight % with respect to the cellulose acylate resin. The antidegradants are preferably incorporated in an amount of 0.0001 to 2 weight % with respect to the cellulose acylate resin. Among them, optical anisotropy controlling agents are more preferably incorporated. Examples of preferred optical anisotropy controlling agents include the compounds described in Japanese Patent Laid-open Publication Nos. 2001-166144 and 2002-296421. Compounds in which two aromatic rings are bonded through —COO— as shown below can also be preferably incorporated.

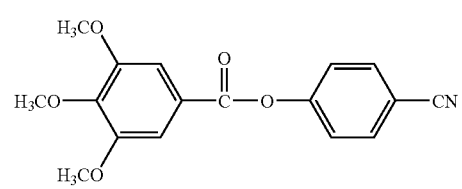

A-1

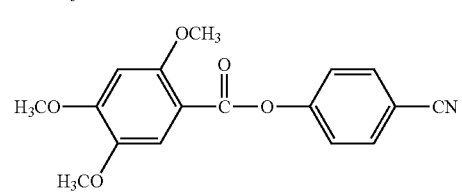

A-2

-continued
A-3
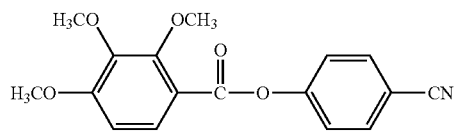
A-4
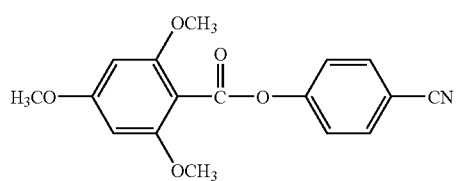
A-5
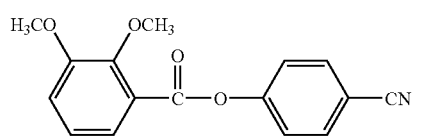
A-6
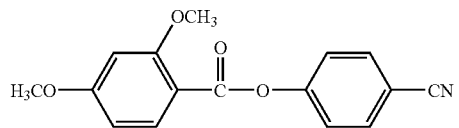
A-7
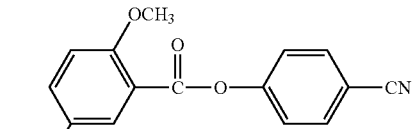
A-8
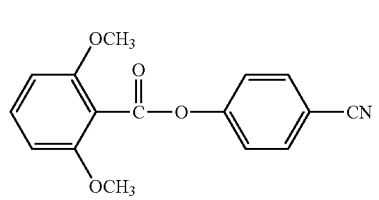
A-9
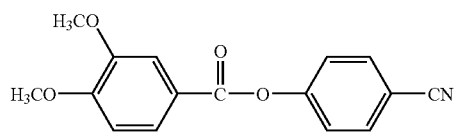
A-10
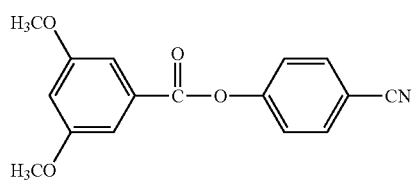
A-11
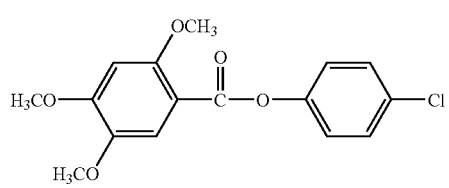
-continued
A-12
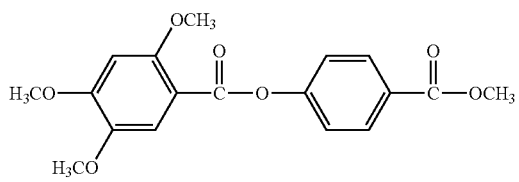
A-13
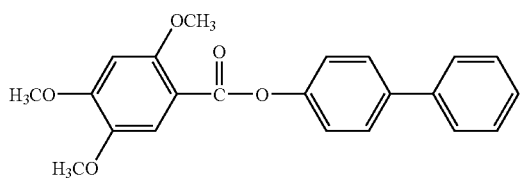
A-14
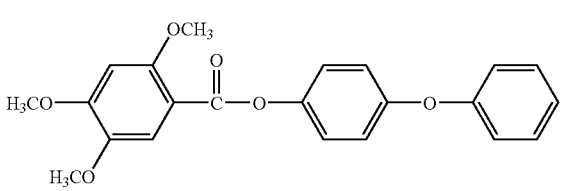
A-15
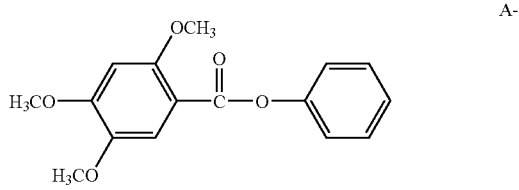
A-16
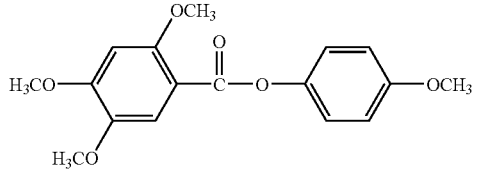
A-17
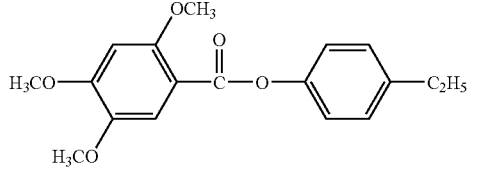
A-18
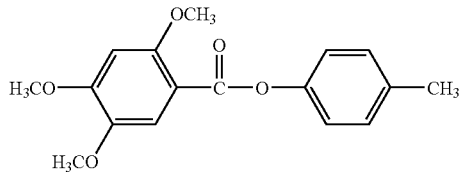
A-19
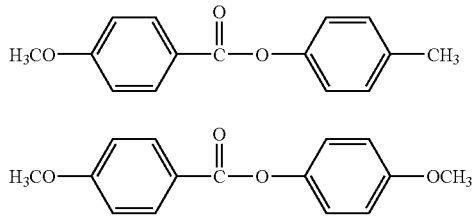
A-20

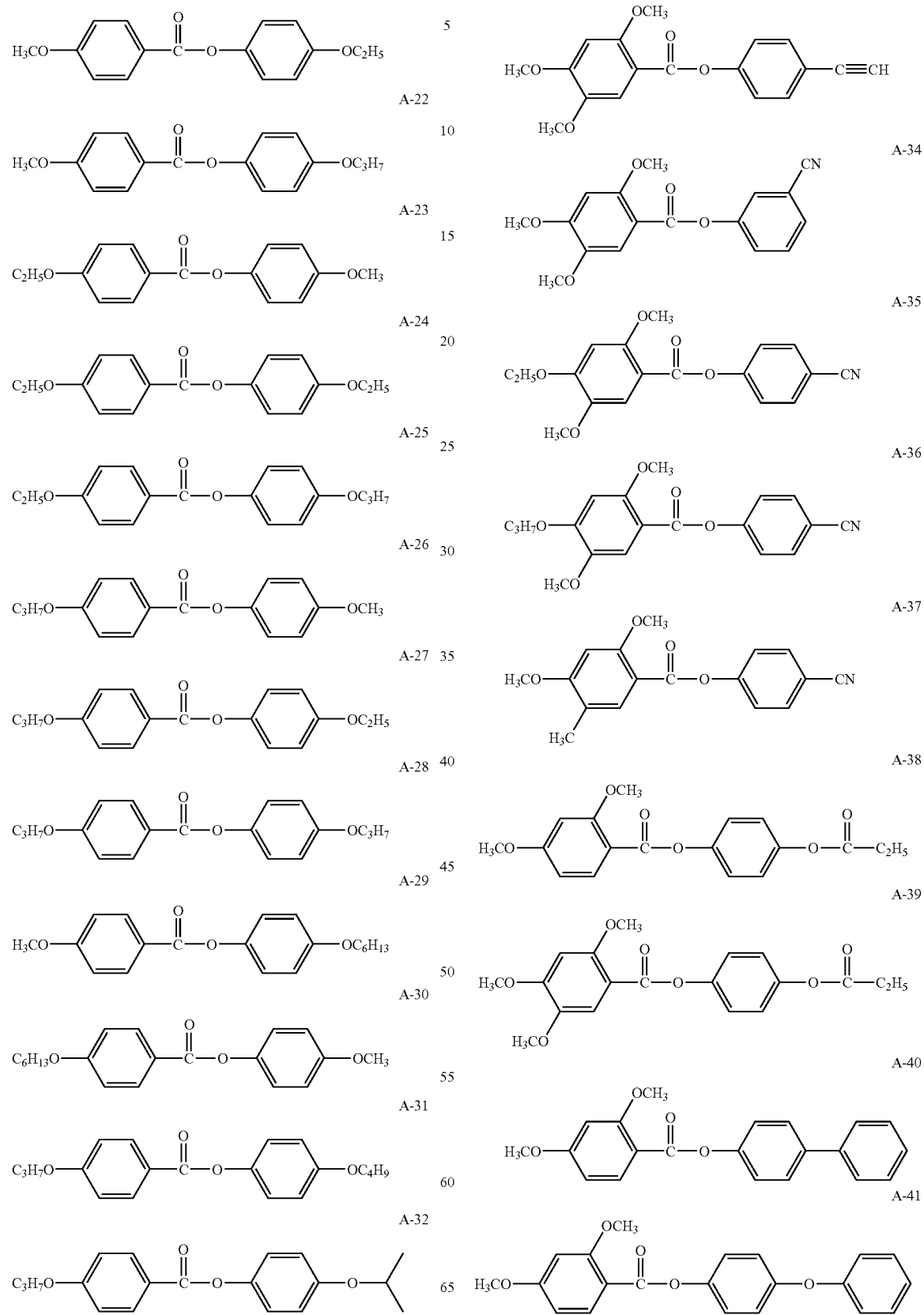

-continued
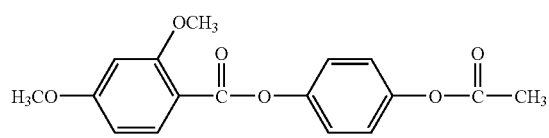
A-42
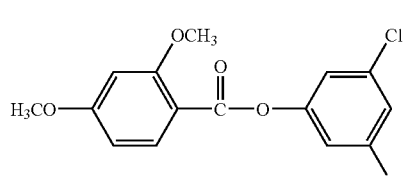
A-43
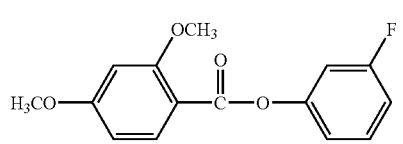
A-45
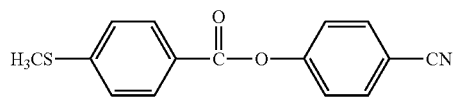
A-46
-continued
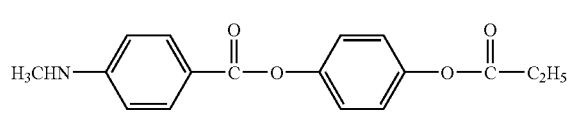
A-47
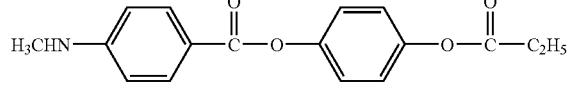
A-48
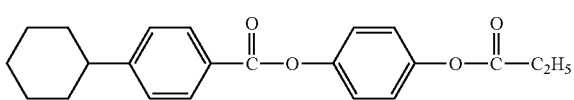
A-49
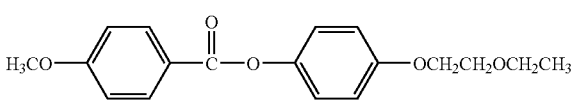
A-50
Compounds in which three aromatic rings are bonded together through —COO— or —CONR′— (R′ is hydrogen atom or a substituent) as shown below can also be preferably incorporated.
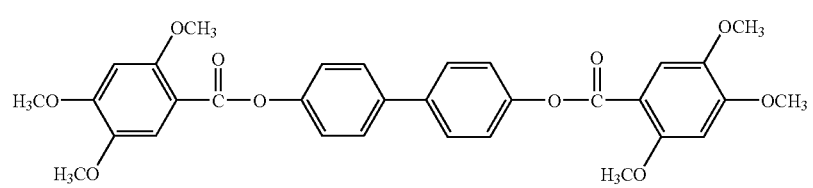
A′-1
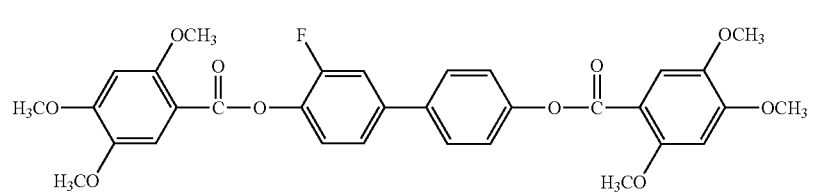
A′-2
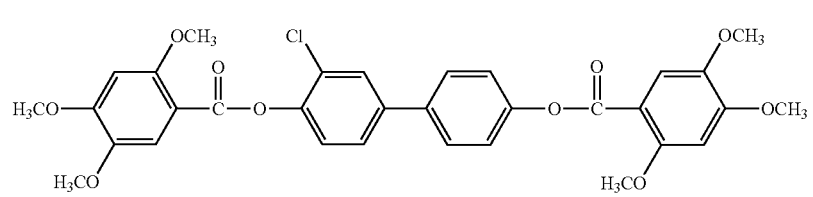
A′-3
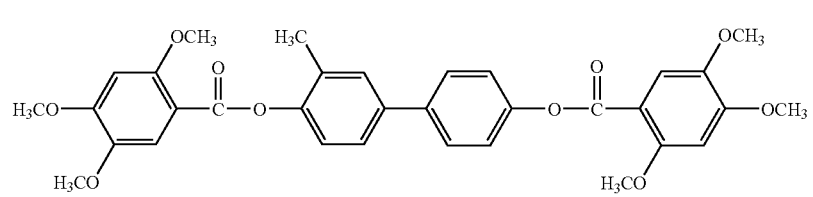
A′-4

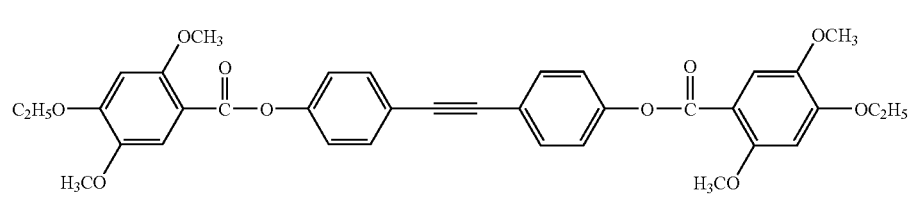
A'-5
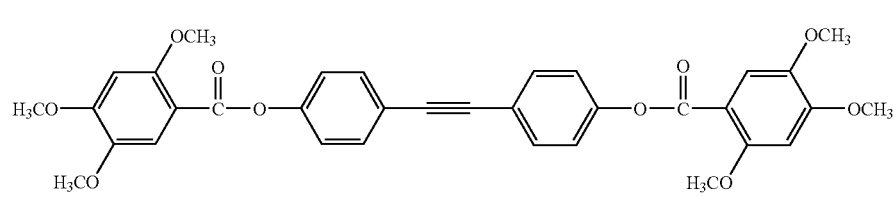
A'-6
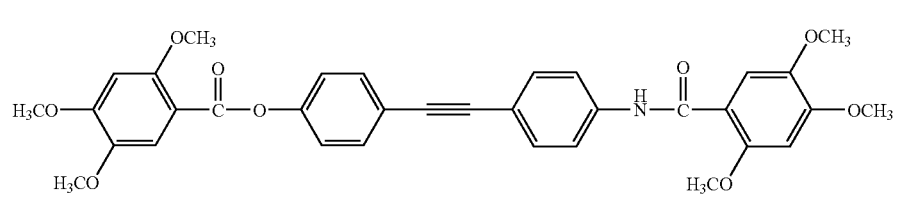
A'-7
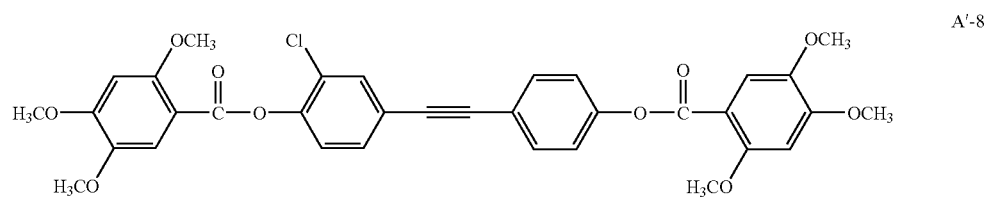
A'-8
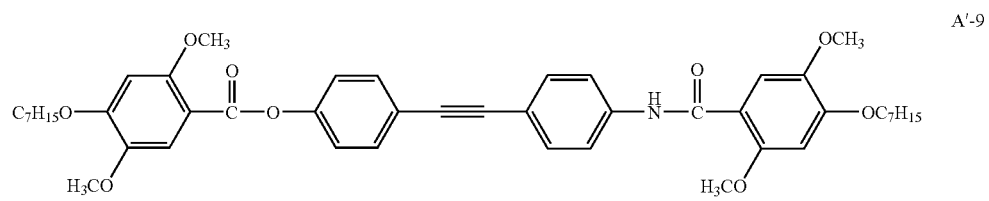
A'-9
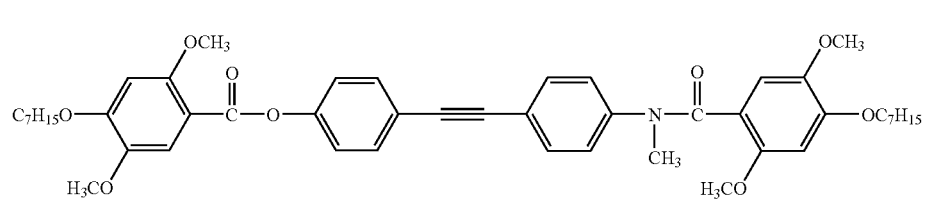
A'-10
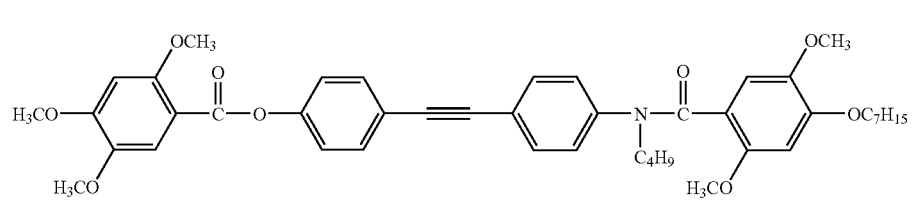
A'-11
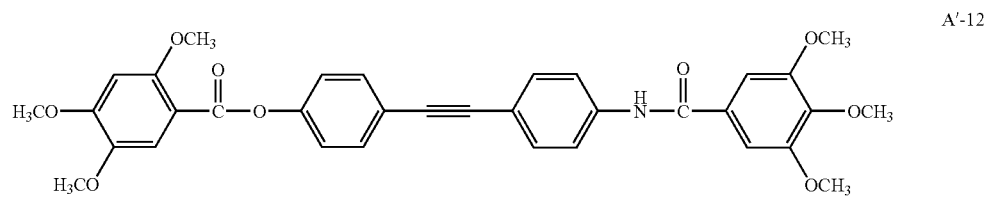
A'-12

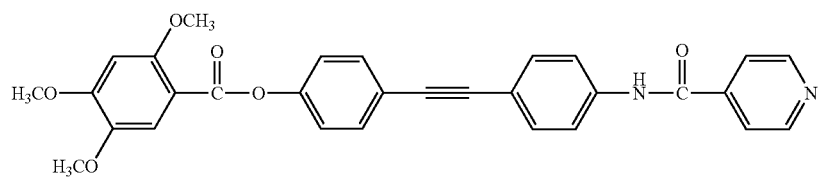
A'-13
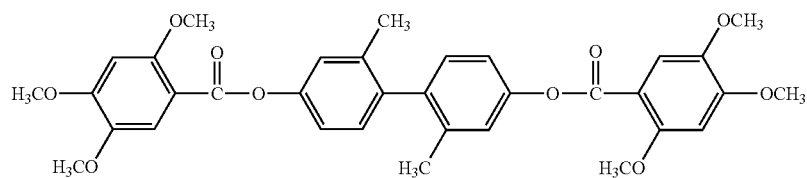
A'-14
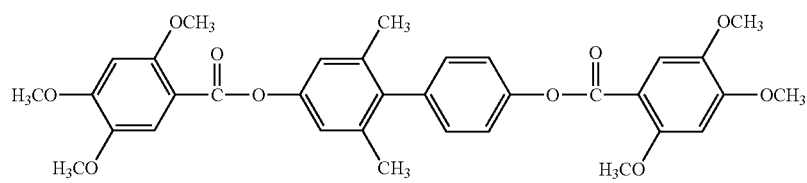
A'-15
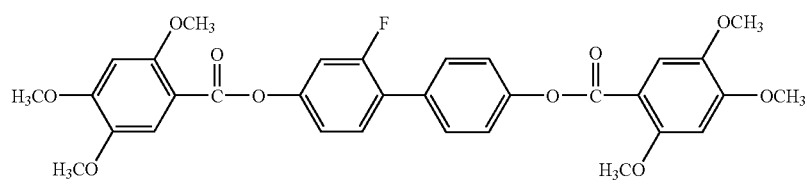
A'-16
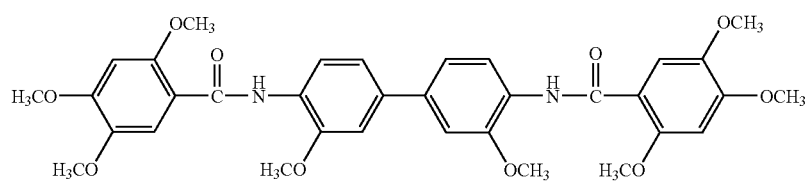
A'-17
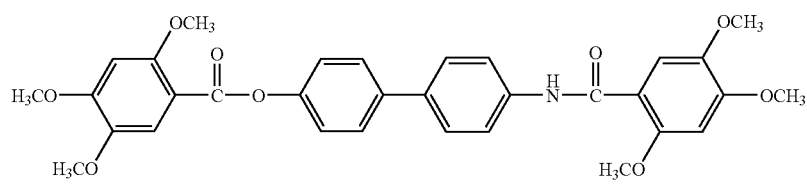
A'-18
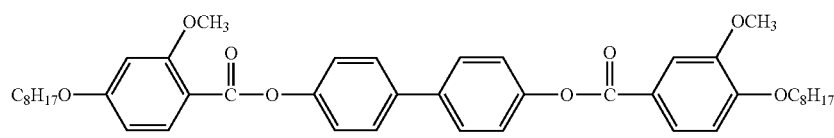
A'-19
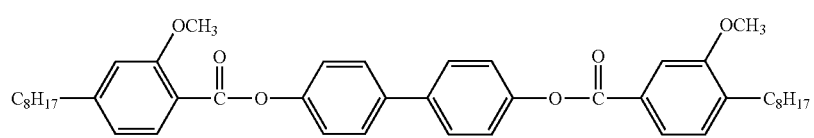
A'-20
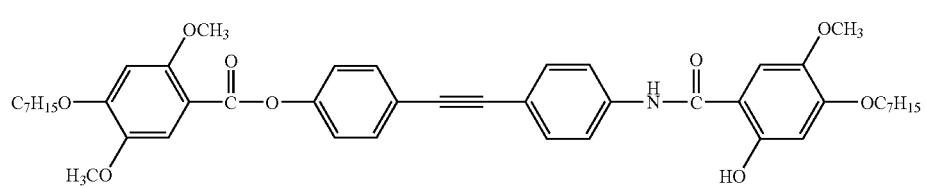
A'-21

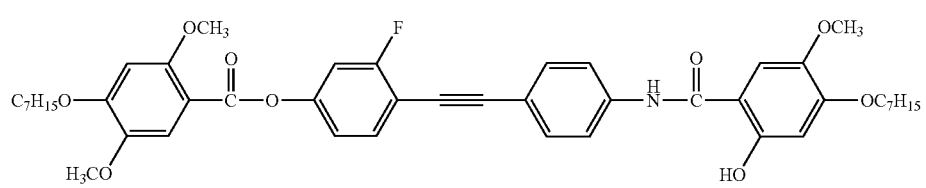
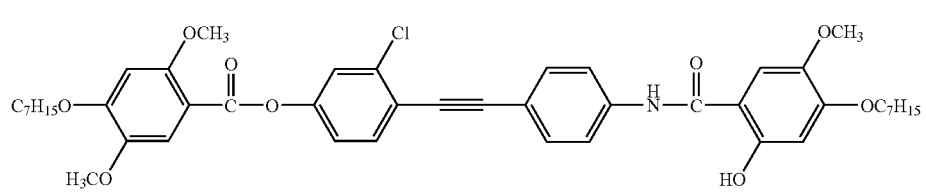
Compounds in which three arylamino groups are substituted on the triazine ring as shown below can also be preferably incorporated.
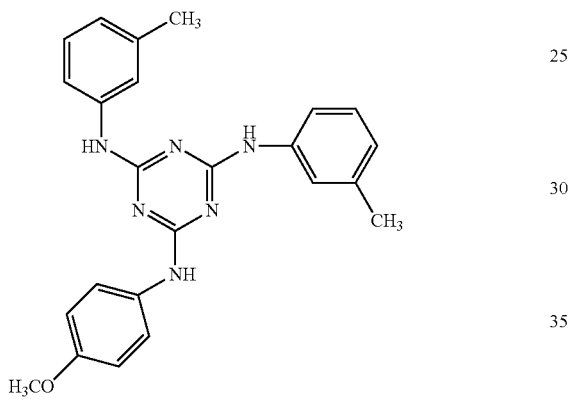
Compounds in which plural aromatic rings are linearly bonded as shown below can also be preferably incorporated.
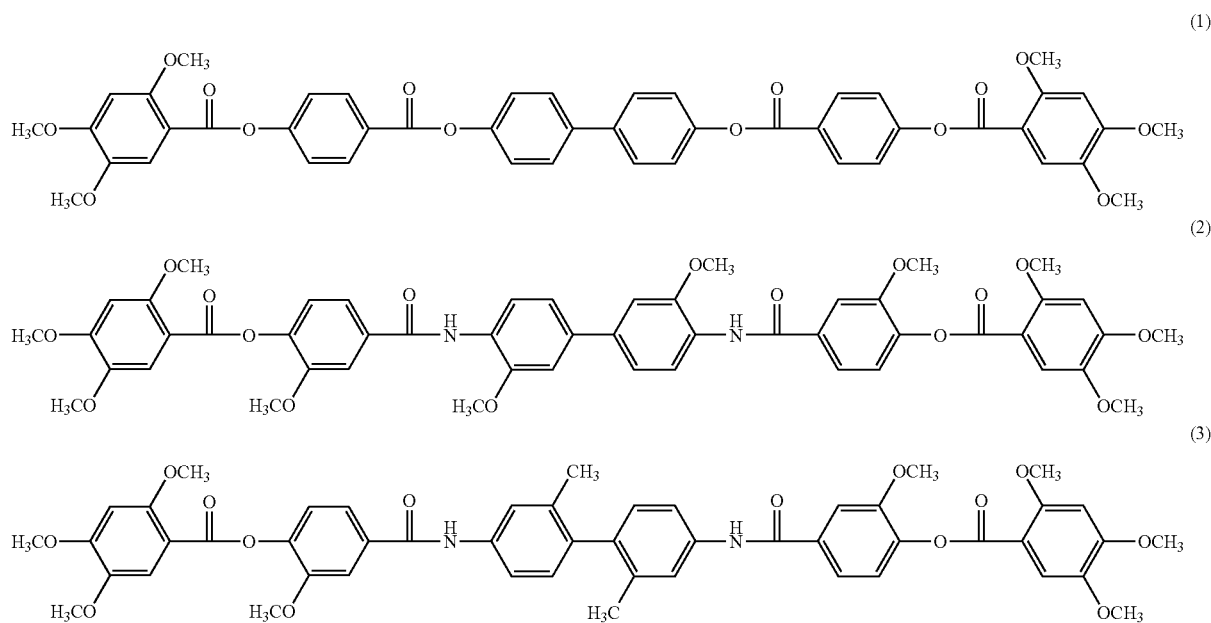

-continued
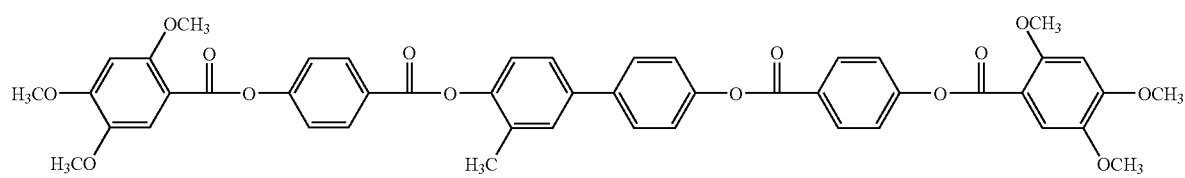
(4)
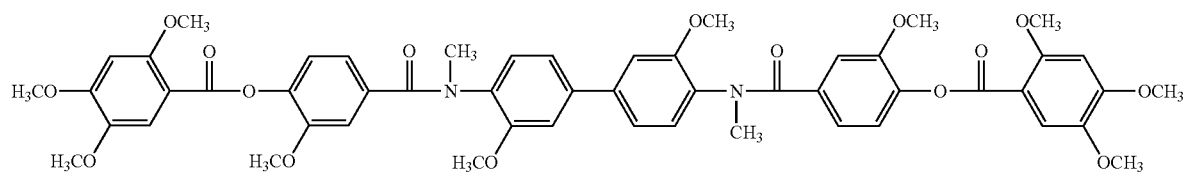
(5)
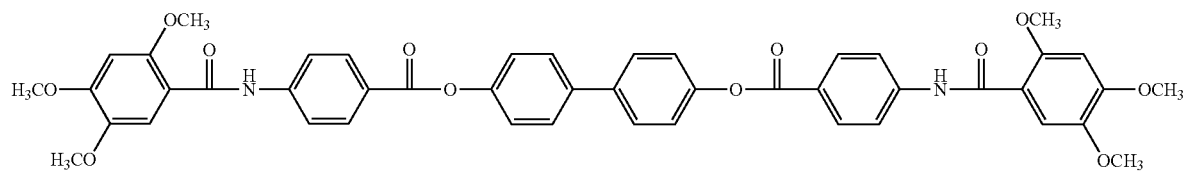
(6)
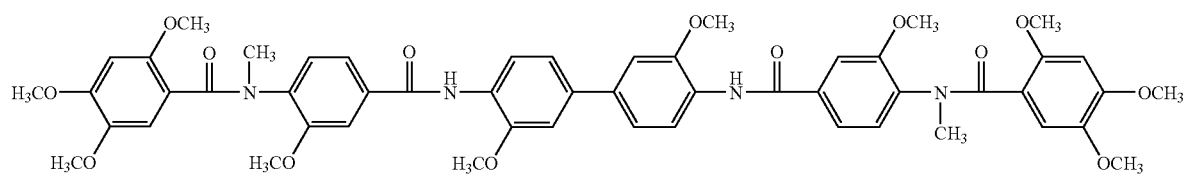
(7)
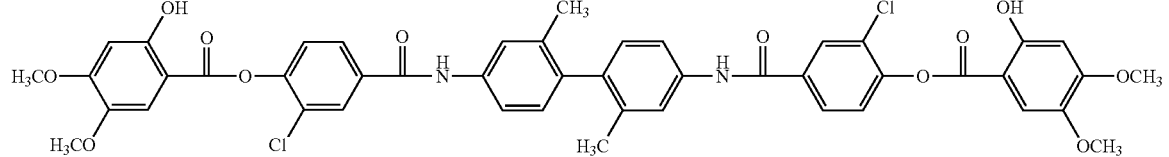
(8)
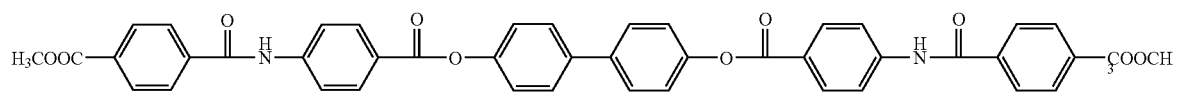
(9)
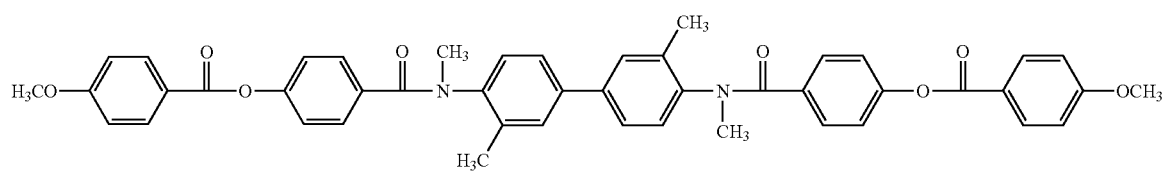
(10)
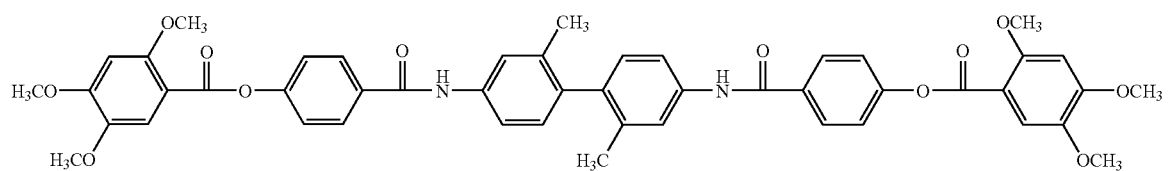
(11)

-continued
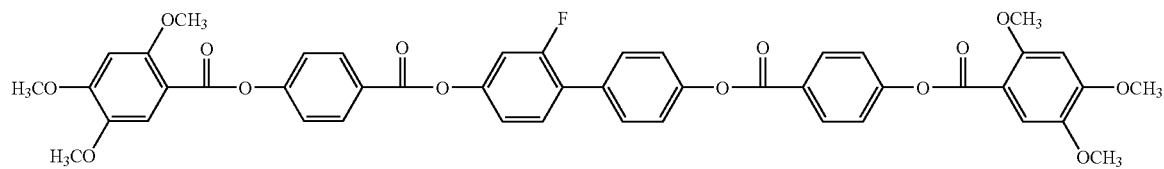
(12)
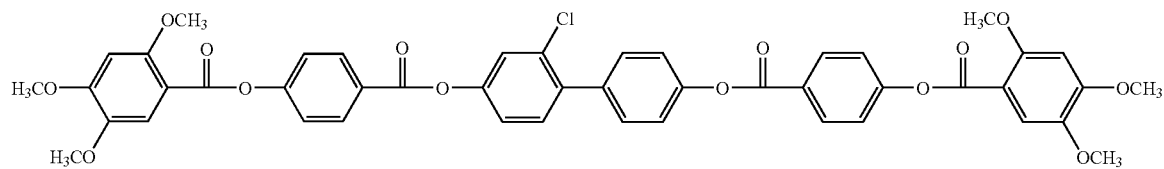
(13)
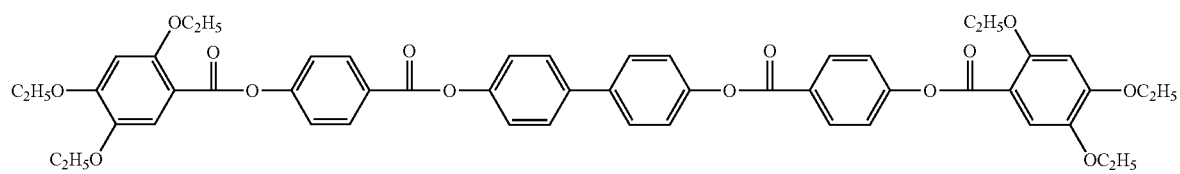
(14)
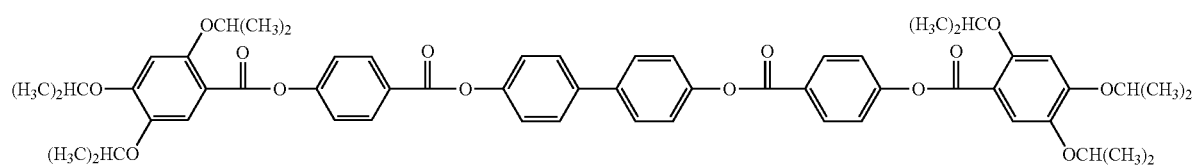
(15)
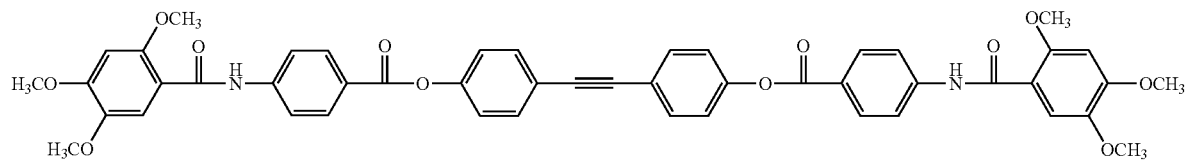
(16)
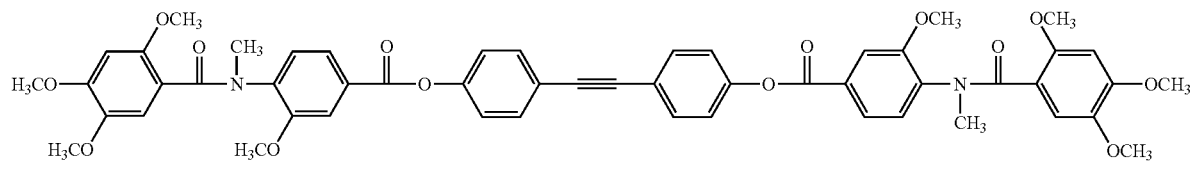
(17)
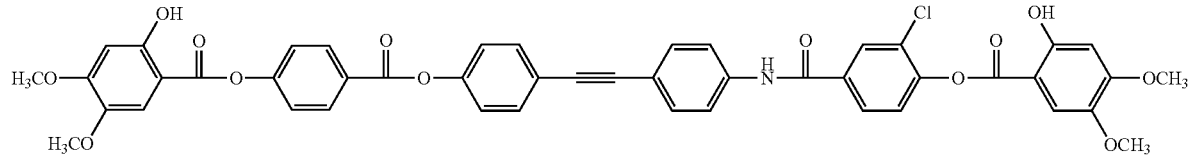
(18)
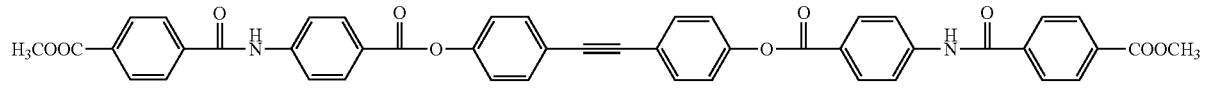
(19)
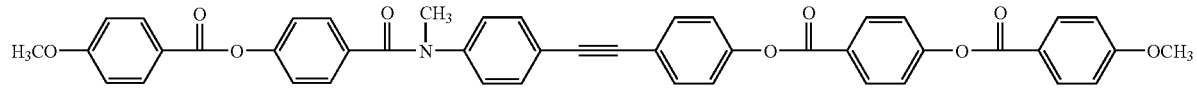
(20)

-continued
(21)
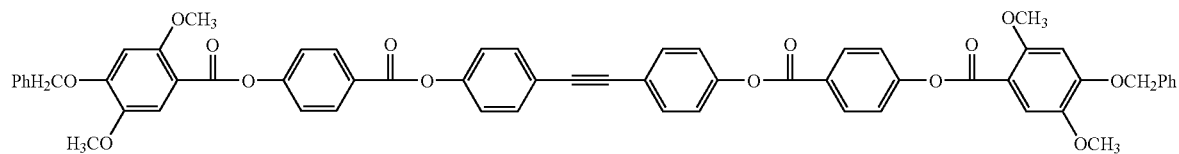
(22)
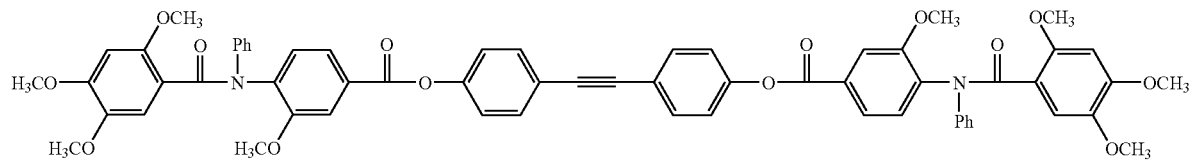
(23)
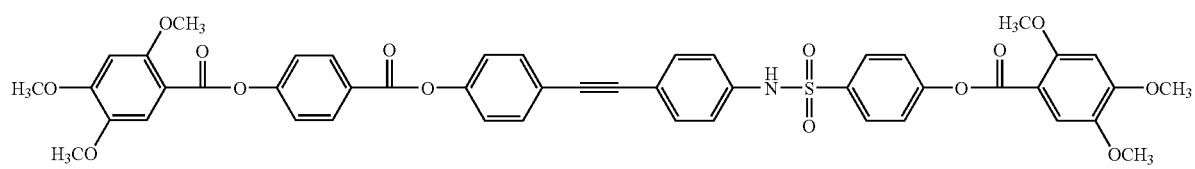
(24)
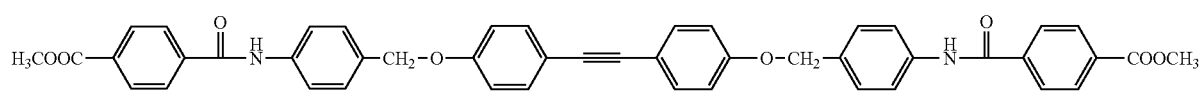
(25)
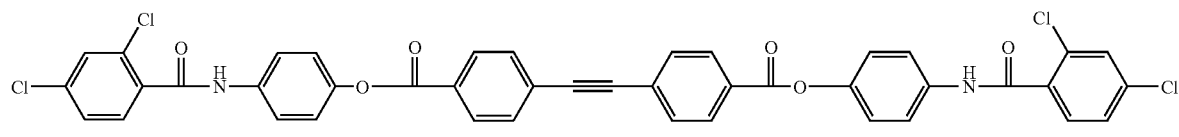
(26)
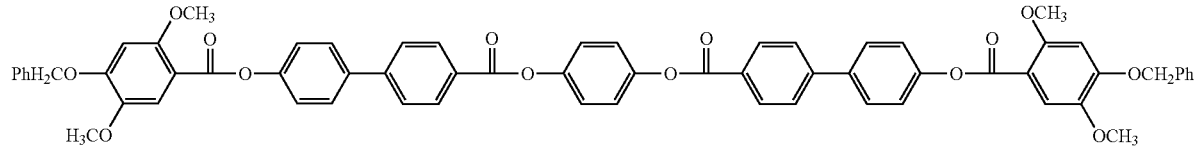
(27)
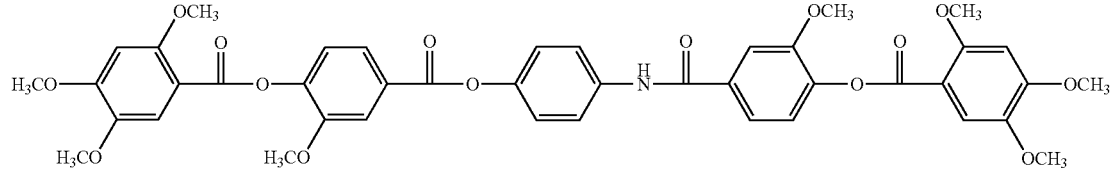
(28)
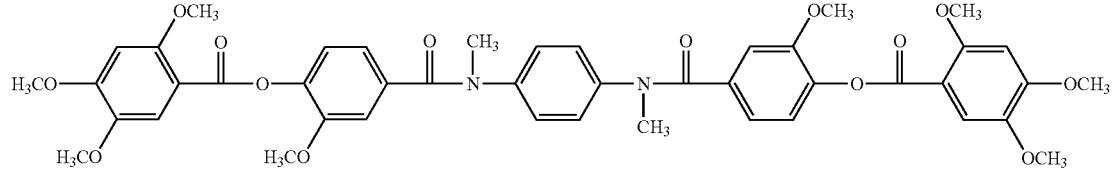
(29)
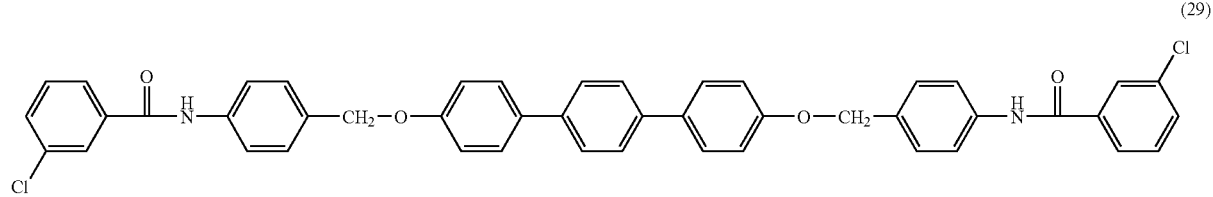

-continued
(30)
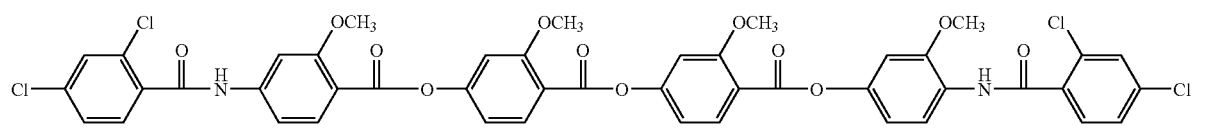
(31)
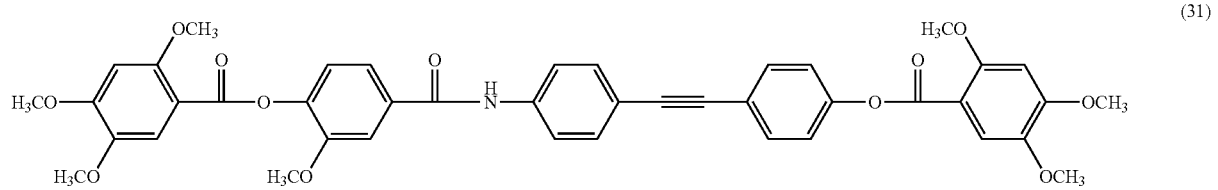
(32)
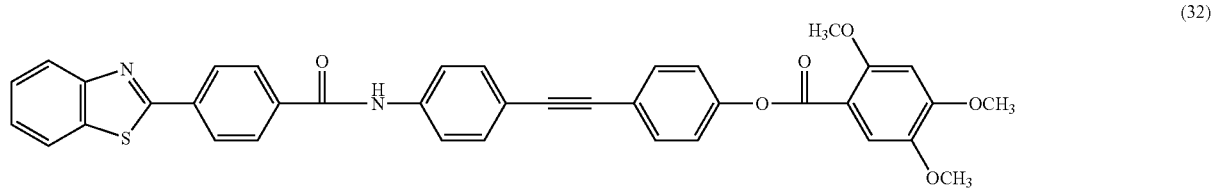
(33)
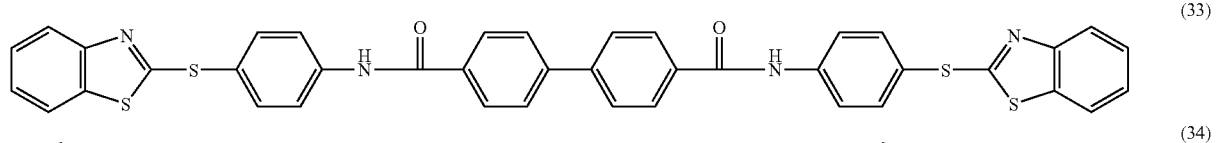
(34)
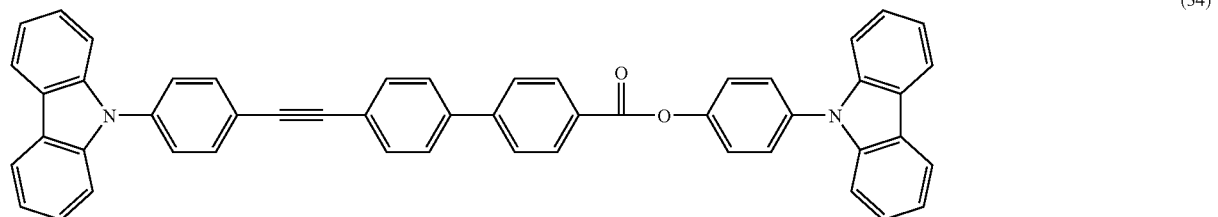
(35)
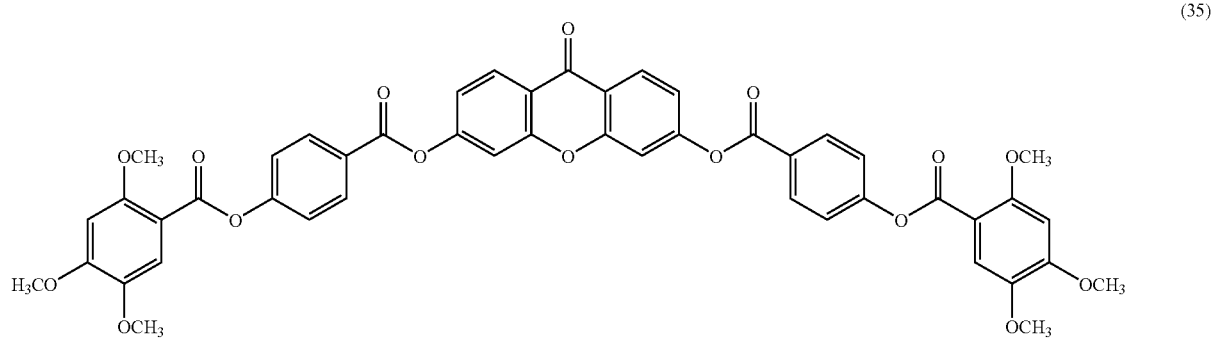
(36)
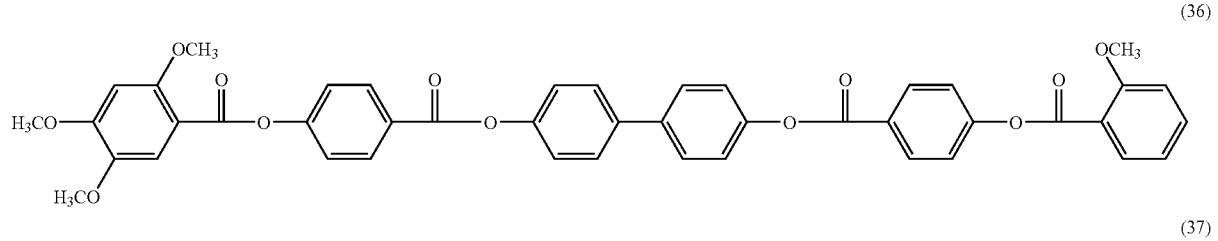
(37)
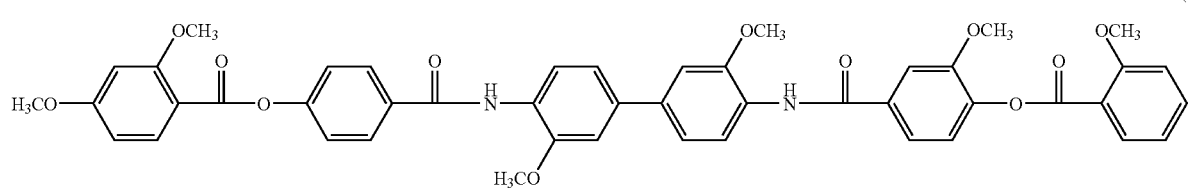

-continued

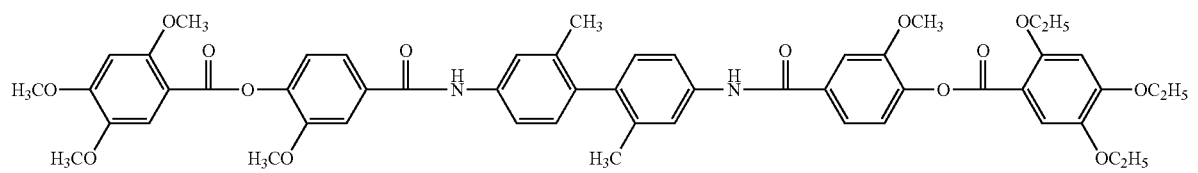
(38)

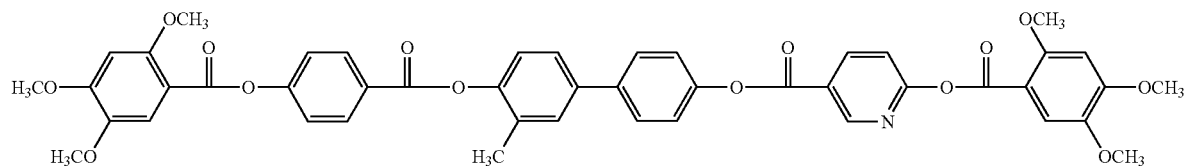
(39)

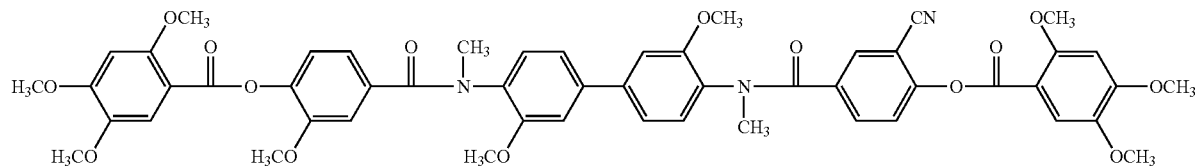
(40)

Incorporation of these compounds can inhibit variation of Re and Rth values in the longitudinal direction and the transverse direction. The amount of these compounds is preferably 1 to 20% by weight, more preferably 2 to 15% by weight, still more preferably 3 to 10% by weight with respect to the weight of the cellulose acylate.

These cellulose acylate resins can be made into a film by either the solution film formation or the melt film formation.

(Solution Film Formation)

As the solvent used for the solution film formation of the cellulose acylate resin, both of the following chlorine-containing solvents and chlorine-free solvents can be used.

(1) Chlorine-Containing Solvent

The chlorine-containing organic solvent is preferably dichloromethane or chloroform. Dichloromethane is particularly preferred. Any organic solvent other than chlorine-containing organic solvent may be incorporated into the chlorine-containing organic solvent without particular problems. In this case, it is necessary to use dichloromethane in an amount of at least 50 weight %.

Chlorine-free solvents used in combination with the chlorine-containing solvent used in the present invention will be described below. Preferred examples of the chlorine-free solvent include esters, ketones, others, alcohols and hydrocarbons each having 3 to 12 carbon atoms. The esters, ketones, ethers and alcohols may have a cyclic structure. Compounds having two or more functional groups of ester, ketone or ether (i.e., —O—, —CO— or —COO—) may also be used as the solvent, and the organic solvents may also have other functional groups such as alcoholic hydroxyl group. Such solvents having two or more functional groups preferably have carbon atoms in a number within the range defined above for the compounds having any one of the functional groups. Examples of the enters having 3 to 12 carbon atoms include ethyl formats, propyl formats, pentyl formate, methyl acetate, ethyl acetate and pentyl acetate. Examples of the ketones having 3 to 12 carbon atoms include acetone, methyl ethyl ketone, diethyl ketone, diisobutyl ketone, cyclopentanone, cyclohexanone and methylcyclohexanone. Examples of the ethers having 3 to 12 carbon atoms include diisopropyl ether, dimethoxymethane, dimethoxyethane, 1,4-dioxane, 1,3-dioxolane, tetrahydrofuran, anisole and phenetole. Examples of the organic solvents having two or more functional groups include 2-ethoxyethyl acetate, 2-methoxyethanol and 2-butoxyethanol.

The alcohols used in combination with the chlorine-containing organic solvents may have a straight, branched or cyclic structure. The alcohol is particularly preferably a saturated aliphatic hydrocarbon. The alcohols may be any of primary, secondary and tertiary alcohols. Examples of the alcohols include methanol, ethanol, 1-propanol, 2-propanol, 1-butanol, 2-butanol, tert-butanol, 1-pentanol, 2-methyl-2-butanol and cyclohexanol. As the alcohol, a fluorine-containing alcohol may also be used. Examples include 2-fluoroethanol, 2,2,2-trifluoroethanol, 2,2,3,3-tetrafluoro-1-propanol and so forth. The hydrocarbons may have a straight, branched or cyclic structure. Either aromatic hydrocarbons or aliphatic hydrocarbons may be used. The aliphatic hydrocarbons may be saturated or unsaturated. Examples of the hydrocarbons include cyclohexane, hexane, benzene, toluene and xylene.

Although the chlorine-free organic solvent used together with the chlorine-containing organic solvent is are not particularly limited, it may be selected from methyl acetate, ethyl acetate, methyl formats, ethyl formate, acetone, dioxolane, dioxane, ketones and acetoacetic acid esters having 4 to 7 carbon atoms, and alcohols and hydrocarbons having 1 to 10 carbon atoms. Preferred examples of the chlorine-free organic solvent used together include methyl acetate, acetone, methyl formate, ethyl formate, methyl ethyl ketone, cyclopentanone, cyclohexanone, methyl acetylacetate, methanol, ethanol, 1-propanol, 2-propanol, 1-butanol, 2-butanol, cyclohexanol, cyclohexane and hexane.

Examples of the combination of the chlorine-containing organic solvents used as a preferred main solvent in the present invention include the following combinations, However, the combination is not limited to these examples (the numerals in the parentheses mentioned below means parts by weight).

Dichloromethane/methanol/ethanol/butanol (80/10/5/5)

Dichloromethane/acetone/methanol/propanol (80/10/5/5)

Dichloromethane/methanol/butanol/cyclohexane (80/10/5/5)

Dichloromethane/methyl ethyl ketone/methanol/butanol (80/10/5/5)

Dichloromethane/acetone/methyl ethyl ketone/ethanol/isopropanol (72/9/9/4/6)

Dichloromethane/cyclopentanone/methanol/isopropanol (80/10/5/5)

Dichloromethane/methyl acetate/butanol (80/10/10)

Dichloromethane/cyclohexanone/methanol/hexane (70/20/5/5)

Dichloromethane/methyl ethyl ketone/acetone/methanol/ethanol (50/20/20/5/5),

Dichloromethane/1,3-dioxolane/methanol/ethanol (70/20/5/5)

Dichloromethane/dioxane/acetone/methanol/ethanol (60/20/10/5/5)

Dichloromethane/acetone/cyclopentanone/ethanol/isobutanol/cyclohexane (65/10/10/5/5/5)

Dichloromethane/methyl ethyl ketone/acetone/methanol/ethanol (70/10/10/5/5)

Dichloromethane/acetone/ethyl acetate/ethanol/butanol/hexane (65/10/10/5/5/5)

Dichloromethane/methyl acetoacetate/methanol/ethanol (65/20/10/5)

Dichloromethane/cyclopentanone/ethanol/butanol (65/20/10/5)

(1) Chlorine-Free Solvent

Preferred examples of the chlorine-free solvent include esters, ketones and ethers each having 3 to 12 carbon atoms. The esters, ketones and ethers may have a cyclic structure. Compounds having two or more functional groups of eater, ketone or ether (i.e., —O—, —CO— or —COO—) may also be used as the main solvent, and the organic solvents may have other functional groups such as alcoholic hydroxyl group. Such solvents having two or more functional groups preferably have carbon atoms in a number within the range defined above for the compounds having any one of the functional groups. Examples of the esters having 3 to 12 carbon atoms include ethyl formate, propyl formate, pentyl formate, methyl acetate, ethyl acetate and pentyl acetate. Examples of the ketones having 3 to 12 carbon atoms include acetone, methyl ethyl ketone, diethyl ketone, diisobutyl ketone, cyclopentanone, cyclohexanone and methylcyclohexanone. Examples of the ethers having 3 to 12 carbon atoms include diisopropyl ether, dimethoxymethane, dimethoxyethane, 1,4-dioxane, 1,3-dioxolane, tetrahydrofuran, anisole and phenetole. Examples of the organic solvents having two or more functional groups include 2-ethoxyethyl acetate, 2-methoxyethanol and 2-butoxyethanol.

Further examples of the solvent preferred for the cellulose acylate used in the present invention include a mixed solvent composed of three or more kinds of different solvents. The first solvent is one selected from methyl acetate, ethyl acetate, methyl formate, ethyl formate, acetone, dioxolane and dioxane or a mixed solvent of two or more kinds of them. The second solvent is selected from ketones having 4 to 7 carbon atoms and acetoacetic acid enters. The third solvent is selected from alcohols or hydrocarbons having 1 to 10 carbon atoms, preferably alcohols having 1 to 8 carbon atoms. When the first solvent is a mixture of two or more kinds of solvents, the second solvent may not be used. The first solvent is preferably methyl acetate, acetone, methyl formate, ethyl formate or a mixture thereof. The second solvent is preferably methyl ethyl ketone, cyclopentanone, cyclohexanone, methyl acetylacetate or a mixture thereof.

The alcohol as the third solvent may have a straight, branched or cyclic structure. In particular, the third solvent is preferably an alcohol derived from a saturated aliphatic hydrocarbon. The alcohol may be any of primary, secondary and tertiary alcohols. Examples of the alcohol include methanol, ethanol, 1-propanol, 2-propanol, 1-butanol, 2-butanol, tert-butanol, 1-pentanol, 2-methyl-2-butanol and cyclohexanol. As the alcohol, a fluorine-containing alcohol may also be used. Examples thereof include 2-fluoroethanol, 2,2,2-trifluoroethanol and 2,2,3,3-tetrafluoro-1-propanol. The hydrocarbon may have a straight, branched or cyclic structure. Either an aromatic hydrocarbon or an aliphatic hydrocarbon may be used. The aliphatic hydrocarbon may be saturated or unsaturated. Examples of the hydrocarbon include cyclohexane, hexane, benzene, toluene, xylene and so forth. The alcohols and the hydrocarbons as the third solvent may be used independently or as a mixture of two or more kinds of them. Specific examples of compounds as the third solvent include alcohols such as methanol, ethanol, 1-propanol, 2-propanol, 1-butanol, 2-butanol and cyclohexanol, cyclohexane and hexane. Among these, methanol, ethanol, 1-propanol, 2-propanol and 1-butanol are particularly preferred.

The aforementioned mixed solvent of three kinds of solvents preferably contains the first, second and third solvents at proportions of 20 to 95 weight %, 2 to 60 weight % and 2 to 30 weight %, respectively, more preferably 30 to 90 weight %, 3 to 50 weight % and 3 to 25 weight %, respectively. Still more preferably, the mixed solvent contains 30 to 90 weight % of the first solvent, 3 to 30 weight % of the second solvent and 3 to 15 weight % of an alcohol as the third solvent. When the first solvent is a mixture, and the second solvent is not used, the first and third solvent are preferably contained at proportions of 20 to 90 weight % and 5 to 30 weight %, respectively, more preferably 30 to 86 weight % and 7 to 25 weight %, respectively. The aforementioned chlorine-free organic solvents used in the present invention are described in more detail in Kokai Giho of Japan Institute of Invention and Innovation, Kogi No. 2001-1745, published on Mar. 15, 2001, pp. 12-16.

Preferred examples of the combination of the chlorine-free organic solvents used for the present invention are described below. However, the combination is not limited to these examples (the numerals in the parentheses mentioned below means parts by weight).

Methyl acetate/acetone/methanol/ethanol/butanol (75/10/5/5/5)

Methyl acetate/acetone/methanol/ethanol/propanol (75/10/5/5/5)

Methyl acetate/acetone/methanol/butanol/cyclohexane (75/10/5/5/5)

Methyl acetate/acetone/ethanol/butanol (81/8/7/4)

Methyl acetate/acetone/ethanol/butanol (82/10/4/4)

Methyl acetate/acetone/ethanol/butanol (80/10/4/6)

Methyl acetate/methyl ethyl ketone/methanol/butanol (80/10/5/5)

Methyl acetate/acetone/methyl ethyl ketone/ethanol/isopropanol (75/8/8/4/5)

Methyl acetate/cyclopentanone/methanol/isopropanol (80/10/5/5)

Methyl acetate/acetone/butanol (85/10/5)

Methyl acetate/cyclopentanone/acetone/methanol/butanol (60/15/15/5/5)

Methyl acetate/cyclohexanone/methanol/hexane (70/20/5/5)

Methyl acetate/methyl ethyl ketone/acetone/methanol/ethanol (50/20/20/5/5)

Methyl acetate/1,3-dioxolane/methanol/ethanol (70/20/5/5)

Methyl acetate/dioxane/acetone/methanol/ethanol (60/20/10/5/5)

Methyl acetate/acetone/cyclopentanone/ethanol/isobutanol/cyclohexane (65/10/10/5/5/5)

Methyl formate/methyl ethyl ketone/acetone/methanol/ethanol (50/20/20/5/5)

Methyl formate/acetone/ethyl acetate/ethanol/butanol/hexane (65/10/10/5/5/5)

Acetone/methyl acetoacetate/methanol/ethanol (65/20/10/5)

Acetone/cyclopentanone/ethanol/butanol (65/20/10/5)

Acetone/1,3-dioxolane/ethanol/butanol (65/20/10/5)

1,3-Dioxolane/cyclohexanone/methyl ethyl ketone/methanol/butanol (55/20/10/5/5/5)

Further, it is also preferable to dissolve the resin in multiple steps by, after dissolution, further adding a part of the solvents, as summarized below (the numerals in the parentheses mentioned below means parts by weight).

Preparation of a cellulose acylate resin solution with methyl acetate/acetone/ethanol/butanol (81/8/7/4), filtration, concentration and subsequent further addition of 2 weight parts of butanol Preparation of a cellulose acylate resin solution with methyl acetate/acetone/ethanol/butanol (81/10/4/2), filtration, concentration and subsequent further addition of 4 weight parts of butanol Preparation of a cellulose acylate resin solution with methyl acetate/acetone/ethanol (84/10/6), filtration, concentration and subsequent further addition of 5 weight parts of butanol In the present invention, whether the chlorine-containing solvent or chlorine-free solvent is used, the cellulose acylate resin is preferably dissolved in the solvent preferably in an amount of 10 to 40 weight %, more preferably 13 to 35 weight %, particularly preferably 15 to 30 weight %.

Prior to the dissolution, the resin is preferably swelled with the solvent at a temperature of 0 to 50° C. for 0.1 to 100 hours.

The various additives may be added before, during or after the swelling step, or during or after cooling or dissolution after the swelling.

In the present invention, a cooling and heating method may also be used in order to dissolve the cellulose acylate resin. As the cooling and heating method, the methods described in Japanese Patent Laid-open Publication Nos. 11-323017, 10-67860, 10-95854, 10-324774 and 11-302388 may be used. That is, the cellulose acylate resin swelled by mixing it with the solvent is dissolved by using a screw type kneader provided with a cooling jacket.

In the present invention, the solution (dope) is preferably subjected to concentration and/or filtration, and techniques for these described in detail in Kokai Giho of Japan Institute of Invention and Innovation, Kogi No. 2001-1745, published on Mar. 15, 2001, p. 25 can be used.

(Malt Film Formation)

(1) Drying

Although the cellulose acetate resin may be used as powder, pelletized cellulose acetate is more preferably used in order to reduce fluctuation of thickness caused during the film formation.

The cellulose acetate resin of which moisture content is reduced to 1% or less, more preferably 0.5% or less, is introduced into a hopper of a melt extruder. For this operation, the temperature of the hopper is controlled to a temperature of (Tg−50) to (Tg+30)° C., more preferably (Tg−40) to (Tg+10)° C., still more preferably (Tg−30) to (Tg)° C. By this temperature control, re-adsorption of moisture in the hopper can be suppressed, and thus the effect of the drying can be more easily exerted.

(2) Kneading and Extrusion

The resin is preferably kneaded and melted at 120 to 250° C., more preferably 140 to 220° C., still more preferably 150 to 200° C. In this operation, the melting temperature may be a constant temperature, or may be controlled for divided periods. The kneading time is preferably 2 to 60 minutes, more preferably 3 to 40 minutes, still more preferably 4 to 30 minutes. Furthermore, it is also preferable to carry out the kneading by using a melt extruder provided with a bent with evacuation of the inside of the extruder under an inert gas (nitrogen etc.) flow.

(3) Casting

After the melted resin is passed through a gear pump to eliminate the pulsation imparted by the extruder, the melted resin is filtered through a metal mash filter or the like and extruded from a T die attached behind the filter into the shape of a sheet on a cooling drum. A single layer may be extruded, or multiple layers may be extruded by using a multi-manifold die or food block die. In this operation, the thickness unevenness may be ameliorated by adjusting a gap between lips of the die.

Then, the resin is extruded on a casting drum. In this operation, it is preferable to use the static electricity applying method, air knife method, air chamber method, vacuum nozzle method, touch roll method or the like to enhance adhesion between the casting drum and the melt-extruded sheet. Such a method for enhancing adhesion may be performed for the total area of the melt-extruded sheet or a part of the sheet.

The casting drum is preferably at a temperature of 60 to 160° C., more preferably 70 to 150° C., still more preferably 80 to 150° C. After the casting, the sheet is peeled off from the casting drum, passed through a gap between nip rollers and rolled up. The rolling up speed is preferably 10 to 100 m/minute, more preferably 15 to 80 m/minute, still more preferably 20 to 70 m/minute.

The width of the formed film is preferably 1 to 5 m, more preferably 1.2 to 4 m, still more preferably 1.3 to 3 m. The unstretched film obtained as described above preferably has a thickness of 30 to 400 μm, more preferably 40 to 300 μm, still more preferably 50 to 200 μm.

The sheet obtained as described above is preferably trimmed for the both side ends and then rolled up. The trimmed portions may be roused as a raw material of films of the same type or different type after grinding or processing such as granulation, depolymerization and re-polymerization as required. Further, it is also preferable to provide a laminate film on at least one surface of the film before the rolling up in view of prevention of scratches.

(Processing of Cellulose Acylate Film)

The cellulose acylate resin film formed as described above is monoaxially or biaxially stretched by the aforementioned method to prepare an oriented cellulose acylate film. This film may be used independently, or may be used in combination with a polarizing plate or after providing a liquid crystal layer, refractive index controlled layer (low reflection layer), hard coat layer or the like. These members can be provided by the steps explained below.

(1) Surface Treatment

The cellulose acylate film can be subjected to a surface treatment to improve adhesion to various functional layers (e.g., undercoat layer and back layer). For example, glow discharge treatment, ultraviolet ray irradiation treatment, corona discharge treatment, flame treatment, acid or alkali treatment can be used. The glow discharge treatment referred to heroin may be a treatment with low-temperature plasma generated in a low-pressure gas of $10^{-3}$ to 20 Torr. A plasma treatment under atmospheric pressure is also preferred. Plasma excitable gas is a gas that can be excited into plasma under the conditions described above, and examples thereof include argon, helium, neon, krypton, xenon, nitrogen, carbon dioxide, flons such as tetrafluoromethane, mixtures thereof and so forth. These are described in detail in Kokai Giho of Japan Institute of Invention and Innovation, Kogi No. 2001-1745, published on Mar. 15, 2001, pp. 30-32. In the plasma treatment under atmospheric pressure, which attracts attentions in recent years, for example, an irradiation energy of 20 to 500 Kgy is used under a condition of 10 to 1000 Kev, and preferably an irradiation energy of 20 to 300 Kgy is used under a condition of 30 to 500 Kev.

Among these treatments, alkali saponification treatment is particularly preferred.

The alkali saponification treatment may be conducted by immersing the film into a saponification solution (immersion method) or applying a saponification solution onto the film (application method). In the case of the immersion method, the treatment can be performed by passing the film through an aqueous solution of NaOH, KOH or the like having pH of 10 to 14 and heated to 20 to 80° C. in a tank for 0.1 to 10 minutes, neutralizing the solution on the film, washing the film with water and drying the film.

In the case of the application method, dip coating, curtain coating, extrusion coating, bar coating and type E coating may be used. As the solvent of the application solution for the alkali saponification treatment, it is preferable to employ a solvent having favorable wetting property for application of the saponification solution to a transparent support and capable of maintaining favorable surface conditions without forming any irregularity on the transparent support surface. Specifically, an alcoholic solvent is preferred, and isopropyl alcohol is particularly preferred. Further, it is also possible to employ an aqueous solution of a surfactant as the solvent. As the alkali in the alkali saponification solution, an alkali soluble in the aforementioned solvent is preferred, and KOH and NaOH are more preferred. The saponification application solution preferably has pH of 10 or higher, more preferably 12 or higher. As for the reaction conditions of the alkali saponification, the saponification is preferably performed at room temperature for 1 second to 5 minutes, more preferably 5 seconds to 5 minute, particularly preferably 20 seconds to 3 minutes. After completion of the alkali saponification reaction, the surface applied with the saponification solution is preferably washed with water or an acid and then washed with water. The saponification treatment by application and the application of an alignment layer described later can be continuously performed to reduce the number of steps. These saponification methods are specifically described in, for example, Japanese Patent Laid-open Publication No. 2002-82226 and WO02/46809.

It is also preferable to provide an undercoat layer on the film in order to bond the film to a functional layer. This layer may be applied after the aforementioned surface treatment or without conducting any surface treatment. The details of the undercoat layer are described in Kokai Giho of Japan Institute of Invention and Innovation, Kogi No. 2001-1745, published on Mar. 15, 2001, p. 32.

These surface treatment and undercoating step may be performed as final steps of the film formation process, may be performed independently, or may be performed during the functional layer forming step described later.

(2) Impartation of Functional Layer

It is preferable to combine the cellulose acylate film of the present invention with any of the functional layers detailed in Kokai Giho of Japan Institute of Invention and Innovation, Kogi No. 2001-1745, published on Mar. 15, 2001, pp. 32-45. Particularly preferred are those comprising the cellulose acylate film of the present invention provided with an optical material such as a polarizing film (polarizing plate), an optical compensation layer (optical compensation sheet) or an antireflection layer (antireflection film).

(2-1) Impartation of Polarizing Film (Preparation of Polarizing Plate)

(2-1-1) Material to be Used

Currently, commercially available polarizing films are generally formed by immersing a stretched polymer into a solution of iodine or a dichroic dye in a bath so that iodine or dichroic dye should permeate the binder.

As the polarizing film, an applied type polarizing film, of which typical examples are manufactured by Optiva Inc., can also be used. The iodine or the dichroic dye in the polarizing film is oriented in the binder to exhibit polarizing performance. As the dichroic dye, azo dyes, stilbene dyes, pyrazolone dyes, triphenylmethane dyes, quinoline dyes, oxazine dyes, thiazine dyes and anthraquinone dyes are used. A water-soluble dichroic dye is preferred. The dichroic dyes preferably contain a hydrophilic substituent (e.g., sulfo group, amino group, hydroxyl group). Examples thereof include the compounds described in Kokai Giho of Japan Institute of Invention and Innovation, Kogi No. 2001-1745, published on Mar. 15, 2001, p. 58.

As the binder of the polarizing film, any of polymers capable of being crosslinked by themselves and polymers capable of being crosslinked with a crosslinking agent may be used, and combinations of two or more kinds of them may also be used. Examples of the binder include methacrylate copolymers, styrene copolymers, polyolefins, polyvinyl alcohols, modified polyvinyl alcohols, poly(N-methylolacrylamides), polyesters, polyimides, vinyl acetate copolymers, carboxymethylcelluloses, polycarbonates and so forth described in Japanese Patent Laid-open Publication No. 8-338913, paragraph [0022]. Silane coupling agents can also be used as the polymer. Among theme binders, water-soluble polymers (e.g., poly(N-methylolacrylamides), carboxymethylcelluloses, gelatin, polyvinyl alcohols and modified polyvinyl alcohols) are preferred. Further, gelatin, polyvinyl alcohols and modified polyvinyl alcohols are more preferred, and polyvinyl alcohols and modified polyvinyl alcohols are most preferred. It is particularly preferable to use two kinds of polyvinyl alcohols or modified polyvinyl alcohols having different polymerization degrees in combination. The polyvinyl alcohols preferably have a saponification degree of 70 to 100%, more preferably 30 to 100%. The polymerization degree of the polyvinyl alcohols is preferably 100 to 5,000. The modified polyvinyl alcohols are described in Japanese Patent Laid-open Publication Nos. 6-338913, 9-152509 and 9-316127. Two or more kinds of polyvinyl alcohols or modified polyvinyl alcohols may be used together.

The lower limit of the thickness of the binder is preferably 10 μm. As for the upper limit, the thickness is preferably as thin as possible from the viewpoint of light leakage from the liquid crystal display device. The thickness is preferably smaller than the thickness of currently commercially available polarizing films (about 30 μm), more preferably 25 μm or less, still more preferably 20 μm or less.

The binder in the polarizing film may be crosslinked. A polymer or monomer having a crosslinkable functional group may be incorporated into the binder, or a crosslinkable functional group may be imparted to the binder polymer itself. The crosslinking may be attained by light, heat, or pH change to form a binder having a crosslinked structure. The crosslinking agent is described in U.S. Reissued Pat. No. 23,297. Boron compounds (e.g. boric acid, borax) may also be used as the crosslinking agent. The amount of the crosslinking agent added to the binder is preferably 0.1 to 20 weight % of the binder. Such an amount provides favorable orientation of the polarizing device and favorable moisture and heat resistance of the polarizing film.

The amount of unreacted crosslinking agent is preferably 1.0 weight % or less, more preferably 0.5 weight % or less, even after completion of the crosslinking reaction. Such an amount provides more improved weather resistance of the film.

(2-1-1) Stretching of Polarizing Film

The polarizing film is preferably dyed with iodine or a dichroic dye after it is stretched (stretching method) or rubbed (rubbing method).

In the case of the stretching method, the stretching ratio is preferably 2.5 to 30.0 times, more preferably 3.0 to 10.0 times. The stretching can be carried out as dry stretching in the air or wet stretching in the state that the film is immersed in water. The stretching ratio in the dry stretching is preferably 2.5 to 5.0 times, and the stretching ratio in the wet stretching is preferably 3.0 to 10.0 times. The stretching may be performed in a direction parallel to the machine direction (parallel stretching) or in an oblique direction (oblique stretching). These stretching operations may be performed as one stretching operation or multiple stretching operations. The stretching based on multiple stretching operations enables uniform stretching even for stretching of high stretching ratio.

a) Parallel Stretching Method

Prior to the stretching of the film, the PVA film Is swelled. The swelling degree (weight ratio of the film after swelling to weight ratio of the film before swelling) is 1.2 to 2.0. Then, during continuous transportation of the film using guide rollers or the like, the film is stretched in an aqueous medium bath or a dyeing bath dissolving a dichroic substance at a bath temperature of 15 to 50° C., particularly 17 to 40° C. The stretching can be performed by holding the film with two pairs of nip rollers and using a transportation speed of the forward nip rollers larger than that of the backward nip rollers. The stretching ratio is defined as a ratio of the length of the stretched film to that of the film in the initial state (the same shall apply hereinafter), and it is preferably 1.2 to 3.5, more preferably 1.5 to 3.0, from the viewpoint of the aforementioned effects and advantages. Thereafter, the film is dried at 50 to 90° C. to obtain a polarizing film.

b) Oblique Stretching Method

For this method, the method described in Japanese Patent Laid-open Publication No. 2002-96554 can be used, in which stretching is performed by using an obliquely projecting tenter. Because this stretching is performed in the air, it is necessary to hydrate the film beforehand so as to be easily stretched. The water content in the film is preferably 5 to 100%, more preferably 10 to 100%.

The temperature during the stretching is preferably 40 to 90° C., more preferably 50 to 80° C. The humidity is preferably 50 to 100% RH, more preferably 70 to 100% RH, still more preferably 80 to 100% RH. The advancing speed along the longitudinal direction is preferably 1 m/minute or more, more preferably 3 m/minute or more.

After completion of the stretching, the film is preferably dried at 50 to 100° C., more preferably at 60 to 90° C., preferably for 0.5 to 10 minutes, more preferably for 1 to 5 minutes.

The polarizing film obtained as described above preferably has an absorption axis angle of 10 to 80°, more preferably 30 to 60°, still more preferably substantially 45° (40 to 50°).

(2-1-3) Adhesion

The aforementioned saponified cellulose acylate film and the polarizing film prepared by the stretching are adhered to each other to prepare a polarizing plate. As for the direction of the members, adhesion is preferably performed so that the casting axis of the cellulose acylate film and the stretching axis of the polarizing film should make an angle of 45°.

The adhesive used for the adhesion is not particularly limited. Examples thereof include PVA resins (including modified PVAs modified with acetoacetyl group, sulfonic acid group, carboxyl group, oxyalkylene group or the like), aqueous solutions of boron compound and so forth. The PVA resins are particularly preferred. The thickness of the adhesive layer is preferably 0.01 to 10 μm, more preferably 0.05 to 5 μm, after drying.

It is more preferred that the polarizing plate obtained as described above should show a higher light transmission and a higher polarization degree. The light transmission of the polarizing plate for light having a wavelength of 550 nm is preferably 30 to 50%, more preferably 35 to 50%, most preferably 40 to 50%. The polarization degree for light having a wavelength of 550 nm is preferably 90 to 100%, more preferably 93 to 100%, most preferably 99 to 100%.

The polarizing plate obtained as described above can be laminated on a λ/4 plate to prepare a circularly polarizing plate. In this case, they are laminated so that the slow axis of the λ/4 plate and the absorption axis of the polarizing plate should make an angle of 45°. The λ/4 plate used in this case is not particularly limited, and it is preferably a λ/4 plate having such wavelength dependency that the retardation value thereof should become smaller for a shorter wavelength. It is also preferable to use a polarizing plate having an absorption axis tilting at an angle of 20 to 70° to the longitudinal direction and a λ/4 plate composed of an optically anisotropic layer comprising a liquid crystal compound.

(2-2) Impartation of Optical Compensation Layer (Preparation of Optical Compensation Sheet)

The optically anisotropic layer is for compensating a liquid crystal compound in a liquid crystal cell of a liquid crystal display device displaying a black color, and an optical compensation layer is formed by forming an alignment layer on the cellulose acylate film of the present invention and further imparting an optically anisotropic layer.

(2-2-1) Alignment Layer

An alignment layer is formed on the aforementioned cellulose acylate film subjected to the surface treatment. This film ham a function of determining the orientation direction of liquid crystal molecules. However, if a liquid crystal compound is oriented, and then the oriented state is fixed, the function of the alignment layer is already attained, and it is not necessarily essential as a constituent of the present invention. That is, only the optically anisotropic layer on the alignment layer in which oriented state is fixed can be transferred on a polarizer to produce the polarizing plate of the present invention.

The alignment layer can be provided by rubbing an organic compound (preferably a polymer), oblique vapor deposition of an inorganic compound, formation of a layer having micro grooves, accumulation of an organic compound (e.g., ω-tricosanoic acid, dioctadecylmethylammonium chloride, methyl stearate) by the Langmuir-Blodgett method (LB film). Furthermore, alignment layers in which an orienting function is imparted by applying an electrical field, applying a magnetic field or light irradiation are also known.

The alignment layer in preferably formed by subjecting a polymer to a rubbing treatment. In principle, the polymer used for the alignment layer should have has a molecular structure having a function of orienting liquid crystal molecules.

In the present invention, in addition to the impartation of the function of orienting liquid crystal molecules, it is preferable to introduce a side chain having a crosslinkable functional group (e.g., double bond) into the main chain of the polymer, or a crosslinkable functional group having a function of orienting liquid crystal molecules into a side chain of the polymer.

As the polymer used for the alignment layer, any of a polymer that can be crosslinked by itself, a polymer that can be crosslinked with a crosslinking agent, and a combination of two or more kinds of such polymers can be used. Examples of the polymers include methacrylate copolymers, styrene copolymers, polyolefins, polyvinyl alcohols and modified polyvinyl alcohols, poly(N-methylolacrylamides), polyesters, polyimides, vinyl acetate copolymers, carboxymethylcelluloses, polycarbonates described in Japanese Patent Laid-open Publication No. 8-338913, paragraph [0022] and so forth. Silane coupling agents can also be used as the polymer. Among these polymers, water-soluble polymers (e.g., poly (N-methylolacrylamides), carboxymethylcelluloses, gelatin, polyvinyl alcohols and modified polyvinyl alcohols are preferred, gelatin, polyvinyl alcohols and modified polyvinyl alcohols) are preferred, gelatin, polyvinyl alcohols and modified polyvinyl alcohols are more preferred, and polyvinyl alcohols and modified polyvinyl alcohols are most preferred. It is particularly preferable to use two kinds of polyvinyl alcohols or modified polyvinyl alcohols having different polymerization degrees in combination. The polyvinyl alcohols preferably have a saponification degree of 70 to 100%, more preferably 80 to 100%. The polymerization degree of the polyvinyl alcohols is preferably 100 to 5,000.

The side chain having a function of orienting liquid crystal molecules generally has a hydrophobic group as a functional group. The specific type of the functional group is decided depending on the type of the liquid crystal molecules and a required oriented state.

For example, modification groups of the modified polyvinyl alcohol can be introduced by copolymerization modification, chain transfer modification or block polymerization modification. Examples of the modification group include a hydrophilic group (e.g., carboxylic acid group, sulfonic acid group, phosphonic acid group, amino group, ammonium group, amido group, thiol group etc.), a hydrocarbon group having 10 to 100 carbon atoms, a fluorine-substituted hydrocarbon group, a thioether group, a polymerizable group (unsaturated polymerizable group, epoxy group, aziridinyl group etc.), an alkoxysilyl group (trialkoxysilyl group, dialkoxysilyl group, monoalkoxysilyl group) and so forth. Specific examples of the modified polyvinyl alcohols include those described in Japanese Patent Laid-open Publication No. 2000-155216, paragraphs [0022] to [0145], Japanese Patent Laid-open Publication No. 2002-62426, paragraphs [0018] to [0022] and so forth.

If a side chain having a crosslinkable functional group is bonded to the main chain of the alignment layer polymer or a crosslinkable functional group is introduced into a side chain of the polymer having a function of orienting liquid crystal molecules, the alignment layer polymer can be copolymerized with a polyfunctional monomer contained in the optically anisotropic layer. As a result, strong bonding based on covalent bonds is attained not only between the polyfunctional monomers, but also between the alignment layer polymers and between the polyfunctional monomer and the alignment layer polymer. Therefore, the introduction of the crosslinkable functional groups into the alignment layer polymer can markedly improve the strength of the optical compensation sheet.

The crosslinkable functional groups of the alignment layer polymer preferably contain a polymerizable group like the polyfunctional monomer. Specific examples thereof are described in Japanese Patent Laid-open Publication No. 2000-155216, paragraphs [0080] to [0100]. The alignment layer polymer can be crosslinked with a crosslinking agent, separately from the aforementioned crosslinkable functional group.

Examples of the crosslinking agent include aldehydes, N-methylol compounds, dioxane derivatives, compounds that act when the carboxylic group is activated, active vinyl compounds, active halogen compounds, isooxazoles and dialdehyde starch. Two or more kinds of crosslinking agents may be used in combination. Specific examples include the compounds described in Japanese Patent Laid-open Publication No. 2002-62426, paragraphs [0023] to [0024]. Highly reactive aldehydes are preferred, and glutaraldehyde is particularly preferred, The amount of the crosslinking agent is preferably 0.1 to 20 weight %, more preferably 0.5 to 15 weight %, based on the weight of the polymer. The amount of non-reacted crosslinking agent remaining in the alignment layer is preferably 1.0 weight % or less, more preferably 0.5 weight % or less. By adjusting the amount of remaining non-reacted crosslinking agent, sufficient durability of the alignment layer not generating any reticulation can be obtained even if the alignment layer is used in a liquid crystal display device for a long period of time or is left in a high temperature and high humidity atmosphere for a long period of time.

The alignment layer can be basically formed by coating a solution containing the aforementioned polymer as the alignment layer forming material and the crosslinking agent on a transparent support, drying (crosslinking) the coated layer by heating and rubbing the coated surface. The crosslinking reaction may be carried out in an arbitrary stage after applying the solution on the transparent support as described above. When a water-soluble polymer such as polyvinyl alcohol in used as the alignment layer forming material, a mixed solvent of an organic solvent having a defoaming action (e.g., methanol) and water is preferably employed as the solvent of the application solution. The suitable ratio of water and the organic solvent is preferably 0:100 to 99:1, more preferably 0:100 to 91:9, in terms of weight ratio. By the use of such a mixed solvent, the generation of foams can be suppressed to markedly decrease defeats in the alignment layer, especially the surface of the optically anisotropic layer.

As the application method for the alignment layer, the spin coating method, dip coating method, curtain coating method, extrusion coating method, rod coating method and roller coating method are preferred, and the rod coating method is particularly preferred. The thickness of the alignment layer after drying is preferably 0.1 to 10 μm. The drying by heating can be performed at a temperature of 20 to 110° C. In order to form sufficient crosslinkings, the drying temperature is preferably 60 to 100° C., particularly preferably 80 to 100° C. The drying time is generally 1 minute to 36 hours, preferably 1 to 30 minutes. Further, it is also preferable to adjust pH to an optimum value for the crosslinking agent used. When glutaraldehyde is used as the crosslinking agent, pH is preferably 4.5 to 5.5, particularly preferably 5.

The alignment layer is provided on the aforementioned cellulose acylate film or an undercoating layer coated on the cellulose acylate film. The alignment layer can be obtained by crosslinking the polymer layer as described above and then rubbing the surface of the layer.

As the aforementioned rubbing treatment, the treatment methods widely used for a step of orientating liquid crystals of LCD can be adopted. That is, a method of rubbing a surface of an alignment layer along a certain direction with paper, gauze, felt, rubber, nylon, polyester fibers or the like to obtain orientation can be employed. In general, the rubbing treatment is performed by rubbing the surface several times with cloth to which fibers having the same length and the same diameter are evenly transplanted.

When the rubbing treatment is carries out in an industrial scale, it can be performed by contacting a rotating rubbing roller with a transported film provided with a polarizing film. All of the roundness, cylindricality and deflection (eccentricity) of the roller are preferably 30 μm or less. The wrapping angle of the film with respect to the rubbing roll is preferably 0.1 to 90°. However, as disclosed in Japanese Patent Laid-open Publication No. 8-160430, a stable rubbing treatment may be performed by winding a film around the roller for 360° or more. The transportation speed of the film is preferably 1 to 100 m/minute. An appropriate rubbing angle is preferably selected from the range of 0 to 60°. When the film is used in a liquid crystal display device, the rubbing angle is preferably 40 to 50°, particularly preferably 45°.

The alignment layer prepared as described above preferably has a thickness of 0.1 to 10 μm.

Then, liquid crystal molecules of the optically anisotropic layer are oriented on the alignment layer. Thereafter, the alignment layer polymer is reacted with the polyfunctional monomers contained in the optically anisotropic layer, or a crosslinking agent is used to crosslink the alignment layer polymer, as required.

The liquid crystal molecules used for the optically anisotropic layer may be rod-like liquid crystal molecules or disk-like liquid crystal molecules. The rod-like liquid crystal molecule and the disk-like liquid crystal molecule each may be high molecular weight liquid crystal or low molecular weight liquid crystal. Furthermore, crosslinked low molecular weight liquid no longer exhibiting liquid crystallinity may also be used.

(2-2-2) Rod-Like Liquid Crystal Molecule

As the rod-like liquid crystal molecules, azomethines, azoxy compounds, cyanobiphenyls, cyanophenyl esters, benzoic acid esters, cyclohexanecarboxylic acid phenyl esters, cyanophenylcyclohexane compounds, cyano-substituted phenylpyrimidines, alkoxy-substituted phenylpyrimidines, phenyldioxanes, tolans and alkenylcyclohexylbenzonitriles are preferably used.

The rod-like liquid crystal molecules include metal complexes. Liquid crystal polymers containing rod-like liquid crystal molecules in repeating units can also be used as the rod-like liquid crystal molecule. In other words, the rod-like liquid crystal molecule may be bonded to a (liquid crystal) polymer.

The rod-like liquid crystal molecules are described in Kikan Kagaku Sosetsu (Quarterly Chemical Review), vol. 22, "Chemistry of Liquid Crystal", edited by the Chemical Society of Japan (1994), Chapters 4, 7, and 11, and "Liquid Crystal Device Handbook", edited by Japan Society for the Promotion of Science, 142nd Committee, Chapter 3.

The rod-like liquid crystal molecule preferably has a birefringence in the range of 0.001 to 0.7.

The rod-like liquid crystal molecule preferably has a polymerizable group in order to fix the oriented state thereof. The polymerizable group is preferably a radically polymerizable unsaturated group or a cationic polymerizable group. Specific examples include the polymerizable groups and polymerizable liquid crystal compounds described in Japanese Patent Laid-open Publication No. 2002-62427, paragraphs [0064] to [0086].

(2-2-3) Disk-Like Liquid Crystal Molecule

Examples of the disk-like (discotic) liquid crystal molecule include benzene derivatives disclosed in the research report of C. Destrade et al., Mol. Cryst., vol. 71, p. 111 (1981); truxene derivatives disclosed in the research report of C. Destrade at al., Mol. Cryst., vol. 122, p. 141 (1985) and Phyics. Lett., A, vol. 79, p. 82 (1990); cyclohexane derivatives disclosed in the research report of B. Kohne at al., Angew. Chem. Soc., vol. 96, p. 70 (1984); and azacrown and phenylacetylene macrocycles disclosed in the research report of J. M. Lehn et al., J. Chem. Commun. p. 1794 (1985), and the research report of J. Zhang et al., J. Am. Chem. Soc. vol. 116, p. 2655 (1994).

The disk-like liquid crystal molecules include those having a structure in which linear alkyl groups, alkoxy groups or substituted benzoyloxy group radially substitute on a base nucleus locating at the center of the molecule and showing liquid crystallinity. Compounds of which molecule or cluster of molecules shows rotational symmetry and can be given a certain orientation are preferred. As for the optically anisotropic layer formed with disk-like liquid crystal molecules, the compound finally contained in the optically anisotropic layer does not need to be consisted of disk-like liquid crystal molecules, and for example, compounds obtained by polymerization or crosslinking of low molecular weight disk-like liquid crystal molecules having a thermo- or photo-reactive group with heat or light to form a polymer and thus no longer exhibiting liquid crystallinity are also included. Preferred examples of the disk-like liquid crystal molecule are described in Japanese Patent Laid-open Publication No.

8-50206. Polymerization of disk-like liquid crystal molecules is disclosed in Japanese Patent Laid-open Publication No. 8-27284.

In order to fix the disk-like liquid crystal molecules by polymerization, it is necessary to bond a polymerizable group as a substituent to the disk-like core of the disk-like liquid crystal molecule. A compound in which the disk-like core and the polymerizable group are bonded through a bridging group is preferred. By such a structure, the orientation state of the compound can be kept in the polymerization reaction. Examples of such a compound include the compounds described in Japanese Patent Laid-open Publication No. 2000-155216, paragraphs [0151] to [0168].

In the hybrid orientation, the angle formed by the long axis (disc plane) of disk-like liquid crystal molecule and plane of polarizing plate increases or decreases with increase of distance from the plane of polarizing plate along the depth direction of the optically anisotropic layer. The angle preferably decreases with increase of the distance. Further, variation of the angle may be continuous increase, continuous decrease, intermittent increase, intermittent decrease, variation including continuous increase and decrease or intermittent variation including increase or decrease. The intermittent variation includes a region during which the tilt angle does not change in the middle of the thickness along the thickness direction of the layer. Even if such a region in which the angle does not change is included, it is sufficient that the angle should increase or decrease as a whole. It is more preferred that the angle should continuously change.

The average direction of the long axis of the disk-like liquid crystal molecule on the polarizing plate side can be generally controlled by selecting the disk-like liquid crystal molecule or the material of the alignment layer, or by selecting the method for the rubbing treatment. The direction of the long axis (disc plane) of disk-like liquid crystal molecule on the surface side (air side) can be generally controlled by selecting type of the disk-like liquid crystal molecule or type of additive used together with the disk-like liquid crystal molecule. Examples of the additive used together with the disk-like liquid crystal molecule include plasticizer, surfactant, polymerizable monomer and polymer and so forth. Further, degree of the variation of the orientation angle can also be controlled by selection of the liquid crystal molecule and additive like the aforementioned control.

(2-2-4) Other Components of Optically Anisotropic Layer

By using a plasticizer, surfactant, polymerizable monomer and so forth together with the aforementioned liquid crystal molecules, uniformity of the coated film, strength of the film, orientation state of the liquid crystal molecules and so forth can be improved. Those components are preferably substances that are compatible with the liquid crystal molecules and can change the tilt angle of the liquid crystal molecules or do not inhibit the orientation.

Examples of the polymerizable monomer include radically polymerizable compounds and cationic polymerizable compounds. The polymerizable monomer is preferably a polyfunctional radically polymerizable monomer, and such a monomer copolymerizable with the aforementioned liquid crystal compound having the polymerizable group is preferred. Examples include those described in Japanese Patent Laid-open Publication No. 2002-296423, paragraphs [0018] to [0020]. The amount of the compound is generally 1 to 50%, preferably 5 to 30 weight %, of the disk-like liquid crystal molecules.

Although the surfactant may be a conventionally known compound, a fluorine-containing compound is particularly preferred. Specific examples thereof include the compounds described in Japanese Patent Laid-open Publication No. 2061-330725, paragraphs [0028] to [0056].

It is preferred that the polymer used together with the disk-like liquid crystal molecules can change the tilt angle of the disk-like liquid crystal molecules.

Examples of the polymer include cellulose esters. Preferred examples of the cellulose esters include those described in Japanese Patent Laid-open Publication No. 2000-155216, paragraph [0178]. In order not to inhibit the orientation of the liquid crystal molecules, the amount of the polymer is preferably in the range of 0.1 to 10%, more preferably in the range of 0.1 to 8 weight %, with respect to the liquid crystal molecules.

The discotic nematic liquid crystal phase/solid phase transition temperature of the disk-like liquid crystal molecule is preferably 70 to 300° C., more preferably 70 to 170° C.

(2-2-5) Formation of Optically Anisotropic Layer

The optically anisotropic layer can be formed by applying an application solution containing liquid crystal molecules as well as a polymerization initiator described later and arbitrary components an required on the alignment layer.

As the solvent used in the preparation of the application solution, an organic solvent is preferably used. Examples of the organic solvent include amides (e.g., N,N-dimethylformamide), sulfoxides (e.g., dimethyl sulfoxide), heterocyclic compounds (e.g., pyridine), hydrocarbons (e.g., benzene, hexane), alkyl halides (e.g., chloroform, dichloromethane, tetrachloroethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. It is also possible to use two or more kinds of organic solvents together.

The application solution can be applied by a known method (e.g., wire bar coating method, extrusion coating method, direct gravure coating method, reverse gravure coating method, die coating method).

The thickness of the optically anisotropic layer is preferably 0.1 to 20 µm, more preferably 0.5 to 15 µm, most preferably 1 to 10 µm.

(2-2-6) Fixation of Oriented State of Liquid Crystal Molecules

The oriented liquid crystal molecules can be fixed with maintaining the oriented state. The fixation is preferably carried out by a polymerization reaction. The polymerization reaction includes a thermal polymerization reaction using a thermal polymerization initiator and a photopolymerization reaction using a photopolymerization initiator. The photopolymerization reaction is preferred.

Examples of the photopolymerization initiator include α-carbonyl compounds (described in U.S. Pat. Nos. 2,367,661 and 2,367,670), acyloin ethers (described in U.S. Pat. No. 2,448,828), α-hydrocarbon-substituted acyloin compounds (described in U.S. Pat. No. 2,722,512), polynuclear quinone compounds (described in U.S. Pat. Nos. 3,046,127 and 2,951,758), combinations of triarylimidazole dimer with p-aminophenyl ketone (described in U.S. Pat. No. 3,549,367), acridine and phenazine compounds (described in Japanese Patent Laid-open Publication No. 60-105667 and U.S. Pat. No. 4,239,850) and oxadiazol compounds (described in U.S. Pat. No. 4,212,970).

The photopolymerization initiator is preferably used in an amount of 0.01 to 20 weight %, more preferably 0.5 to 5 weight %, based on the solid matter in the application solution.

Light irradiation for polymerizing the liquid crystal molecules is preferably performed by using an ultraviolet ray.

The irradiation energy is preferably in the range of 20 mJ/=m² to 50 J/cm², more preferably 20 to 5,000 mJ/cm², still more preferably 100 to, 800 mJ/cm². For promoting the photopolymerization reaction, the light irradiation may be carried out with heating. Further, a protective layer may be provided on the optically anisotropic layer an required.

It is also preferable to combine this optical compensation film with a polarizing film. Specifically, such an application solution for forming the optically anisotropic layer as described above is applied on a surface of a polarizing plate to form an optically anisotropic layer. As a result, produced is a thin polarizing plate giving only a small stress (strain×sectional area×elastic modulus) generated in connection with dimensional change of the polarizing film without using any polymer film between the polarizing plate and the optically anisotropic layer. By disposing a polarizing plate according to the present invention in a large-sized liquid crystal display device, images of high display quality can be displayed without causing problems such as light leakage.

The tilt angle between the polarizing film and the optical compensation layer is preferably adjusted by stretching the layers so that the angle should match the angle between the transmission axis of two polarizing plates adhered onto both surfaces of & liquid crystal cell constituting a LCD and the longitudinal or transverse direction of the liquid crystal cell. The tilt angle is generally 45°. However, transmission, reflection and semi-transmission type LCDs in which the angle is not necessarily 45° have recently been developed, and therefore it is preferred that the stretching direction can be arbitrarily adjusted depending on the design of LCD.

(2-2-7) Liquid Crystal Display Device

Each of liquid crystal modes in which such an optical compensation film is used will be explained hereinafter.

(TN Mode Liquid Crystal Display Device)

Liquid crystal cells of TN mode are most widely used in color TFT liquid crystal displays and described in many references. In a liquid crystal cell of the TN mode displaying a black color, orientation state of the liquid crystal is that rod-like liquid crystal molecules in the central portion of the cell stand up, and the molecules lie down in portions near the substrate of the cell.

(OCB Mode Liquid Crystal Display Device)

A liquid crystal cell of OCB mode is a liquid crystal cell of bend orientation mods in which rod-like liquid crystal molecules in the upper part and lower part of the liquid crystal cell are essentially inversely (symmetrically) oriented. Liquid crystal display devices utilizing liquid crystal cells of the bend orientation mode are disclosed in U.S. Pat. Nos. 4,583, 825 and 5,410,422. Because the rod-like liquid crystal molecules in the upper part and lower part of the liquid crystal cell are symmetrically oriented, a liquid crystal cell of bend orientation mode has an optically self-compensating function. Therefore, this mode of liquid crystal is referred to as OCB (optically compensatory bend) mode of liquid crystal.

In a liquid crystal cell of the OCB mode, like that of the TN mode, the orientation state of liquid crystal in the cell displaying a black color is that rod-like liquid crystal molecules in the central portion of the cell stand up, and the molecules lie down in portions near substrate of the cell.

(VA Mode Liquid Crystal Display Device)

A liquid crystal cell of the VA mode is characterized by substantially longitudinally aligning rod-like liquid crystal molecules when voltage is not applied, and liquid crystal cells of the VA mode include, in addition to (1) a liquid crystal cell of VA mode in a narrow sense in which rod-like liquid crystal molecules are substantially longitudinally aligned when voltage is not applied, and the molecules are essentially horizontally aligned while voltage is applied (described in Japanese Patent Laid-open Publication No. 2-176625), (2) a liquid crystal cell of MVA mode in which the VA mode is modified to be multi-domain type in order to enlarge the viewing angle (described in SID97, Digest of tech. Papers, 28 (1997), 845), (3) a liquid crystal cell of n-ASM mode in which rod-like liquid crystal molecules are substantially longitudinally aligned while voltage is not applied, and the molecules are essentially oriented in twisted multi-domain alignment while voltage is applied (described in the proceedings of Nippon Ekisho Toronkai (Liquid Crystal Forum of Japan), 58-59 (1998)), and (4) a liquid crystal cell of SURVIVAL mode (published in LCD International '98).

(Other Liquid Crystal Display Devices)

Liquid crystal display devices of the ECB and STN mode can be optically compensated on the basis of the same approach as described above.

(2-3) Impartation of Antireflection Layer (Antireflection Film)

An antireflection film is generally formed by providing a low refractive index layer, which also serves as an antifouling layer, and at least one layer having a refractive index higher than that of the low refractive index layer (i.e., a high refractive index layer and/or medium refractive index layer) on a substrate consisting of the cellulose acylate film of the present invention.

Examples of the method for forming a multi-layered film comprising laminated transparent thin films of inorganic compounds (metal oxides etc.) having different refractive indexes include the chemical vapor deposition (CVD) method, physical vapor deposition (PVD) method and a method of forming a coated film of colloidal metal oxide particles by a sol-gel method from a metal compound such as metal alkoxides and subjecting the film to a post-treatment (such as ultraviolet radiation described in Japanese Patent Laid-open Publication No. 9-157855, or plasma treatment described in Japanese Patent Laid-open Publication No. 2002-327310) to form a thin film.

Further, as antireflection films showing high productivity, various antireflection films prepared by laminating thin films of inorganic particles dispersed in a matrix by coating have been proposed.

Examples of the antireflection film also include antireflection films comprising an antireflection layer prepared by forming fine unevenness on the uppermost surface of such an antireflection film formed by application as described above to impart antiglare property to the surface.

Although any of the aforementioned methods can be used for the cellulose acylate film of the present invention, the application method (applied type) is particularly preferred.

(2-3-1) Layer Structure of Applied Type Antireflection Film

An antireflection film having a layer structure comprising at least a medium refractive index layer, high refractive index layer and low refractive index layer (the outermost layer) in this order on the cellulose acylate film of the present invention as a substrate is designed so that the layers should have refractive indexes satisfying the following relationship.

Refractive index of high refractive index
layer>Refractive index of medium refractive
index layer>Refractive index of transparent
substrate>Refractive index of low refractive
index layer Further, a hard coat layer may be formed between the transparent support and the medium refractive index layer. The antireflection film may be composed of a medium refractive index hard coat layer, a high refractive index layer and a low refractive index layer.

Examples thereof include those described in Japanese Patent Laid-open Publication Nos. 8-122504, 8-110401, 10-300902, 2002-243906 and 2000-111706. Further, another function may be imparted to each of the layers. Examples include a low refractive index layer having antifouling property, high refractive index antistatic layer (e.g., those described in Japanese Patent Laid-open Publication Nos. 10-206603, 2002-243906 etc.) and so forth.

The antireflection film preferably has a haze of 5% or less, more preferably 3% or lose. Further, the film preferably has mechanical strength of H or more, more preferably 2H or more, most preferably 3H or more, in term of hardness determined by the pensile hardness test according to JIS K5400.

(2-3-2) High Refractive Index Layer and Medium Refractive Index Layer

The layer having a high refractive index of the antireflection film is a curable film containing at least inorganic compound supermicroparticles having a high refractive index and an average particle size of 100 nm or less and a matrix binder.

Examples of the inorganic compound supermicroparticles having a high refractive index include those of an inorganic compound having a refractive index of 1.65 or more, preferably 1.9 or more. Examples of the inorganic compound include oxides of Ti, Zn, Sb, Sn, Zr, Ce, Ta, La, In and so forth and complex oxides containing two or more kinds of these metal atoms. Examples of the method of preparing such supermicroparticles include treatment of particles surfaces with a surface treating agent (e.g., silane coupling agents etc. described in Japanese Patent Laid-open Publication Nos. 11-295503, 11-153703 and 2000-9908, anionic compounds or organic metal coupling agents described in Japanese Patent Laid-open Publication No. 2001-310432 etc.), formation of a core-shell structure containing a core of high refractive index particle (e.g., those described in Japanese Patent Laid-open Publication No. 2001-166104 etc.), use of a particular dispersing agent (described in Japanese Patent Laid-open Publication Nos. 11-153703, U.S. Pat. No. 6,210,858B1, Japanese Patent Laid-open Publication No. 2002-2776069 etc.) and so forth.

Examples of the material for forming the matrix include conventionally known thermoplastic resins and thermosetting resins.

Further, at least one kind of composition selected from a composition comprising a polyfunctional compound containing at least two radically polymerizable groups and/or cationic polymerizable groups, a composition comprising an organic metal compound containing a hydrolyzable group and a composition comprising a partial condensate thereof. Examples of the compound include the compounds described in Japanese Patent Laid-open Publication Nos. 2000-47004, 2001-315242, 2001-31871, 2001-296401 and so forth.

Further, a curable film obtainable from a colloidal metal oxide obtained from a metal alkoxide by hydrolysis and condensation and a metal alkoxide composition is also preferred. Examples thereof include those described in Japanese Patent Laid-open Publication No. 2001-293818.

The high refractive index layer generally has a refractive index of 1.70 to 2.20. The high refractive index layer preferably has a thickness of 5 nm to 10 μm, more preferably 10 nm to 1 μm.

The refractive index of the medium refractive index layer is adjusted so as to be a value between the refractive index of the low refractive index layer and the refractive index of the high refractive index layer. The refractive index of the medium refractive index layer is preferably 1.50 to 1.70.

(2-3-3) Low Refractive Index Layer

The low refractive index layer is laminated on the high refractive index layer. The low refractive index layer preferably has a refractive index of 1.20 to 1.55, more preferably 1.30 to 1.50.

This layer in preferably formed as an outermost layer having scratch resistance and antifouling property. As a means for markedly improving the scratch resistance, it is effective to give lubricity to the surface, and a thin film introduced with conventionally known silicone or fluorine can be used.

The fluorine-containing compound preferably has a refractive index of 1.35 to 1.50, more preferably 1.36 to 1.47. The fluorine-containing compound is preferably a compound containing 35 to 80 weight % of fluorine atoms and having a crosslinkable or polymerizable functional group.

Examples include, for example, the compounds described in Japanese Patent Laid-open Publication No. 9-222503, paragraphs [0018] to [0026], Japanese Patent Laid-open Publication No. 11-38202, paragraphs [0019] to [0030], Japanese Patent Laid-open Publication No. 2001-40284, paragraphs [0027] to [0028], Japanese Patent Laid-open Publication No. 2000-284102 and so forth.

As the silicone compound, preferred is a compound having a polysiloxane structure and containing a curable functional group or polymerizable functional group in the polymer chain so as to provide a crosslinked structure in the film to be formed. Examples thereof include reactive silicones (such as "Silaplane" (trade name), produced by Chisso Corporation etc., polysiloxanes containing silanol groups at the both ends (described in Japanese Patent Laid-open Publication No. 11-258403 etc.) and so forth.

The crosslinking or polymerization reaction of the fluorine-containing polymer and/or the siloxane polymer having a crosslinkable or polymerizable group is preferably performed by light radiation of heating of an application solution for forming an outermost layer containing a polymerization initiator, sensitizer etc. during or after the application.

A sol-gel cured film obtained by curing an organic metal compound such as a silane coupling agent and a silane coupling agent containing a particular fluorine-containing hydrocarbon group in the presence of a catalyst by a condensation reaction is also preferred.

Examples thereof include silane compounds containing a polyfluoroalkyl group or partially-hydrolyzed condensates thereof (e.g., the compounds described in Japanese Patent Laid-open Publication Nos. 58-142958, 58-147493, 58-147484, 9-157582 and 11-106704), silyl compounds containing a (poly)perfluoroalkyl other group, which is a fluorine-containing long chain group (e.g., the compounds described in Japanese Patent Laid-open Publication Nos. 2000-117902, 2001-48590, 2002-53804 etc.) and so forth.

The low refractive index layer may contain, as additives other than the aforementioned components, a filler (e.g., silicon dioxide (silica), low refractive index inorganic compound particles having a primary average particle size of 1 to 150 nm such as fluorine-containing particles (those of magnesium fluoride, calcium fluoride or barium fluoride), organic microparticles described in Japanese Patent Laid-open Publication No. 11-3820, paragraphs [0020] to [0038]), silane coupling agent, lubricant, surfactant and so forth.

When the low refractive index layer is positioned beneath the outermost layer, the low refractive index layer may be formed by a gas phase method (e.g., vacuum vapor deposition method, sputtering method, ion plating method, plasma CVD method etc.). The low refractive index layer is preferably formed by an application method, because the layer can be formed at a low cost.

The low refractive index layer preferably has a film thickness of 30 to 200 nm, more preferably 50 to 150 nm, most preferably 60 to 120 nm.

(2-3-4) Hard Coat Layer

The hard coat layer is formed on the surface of the support in order to give mechanical strength to the antireflection film, It is particularly preferably formed between the support and the high refractive index layer.

The hard coat layer is preferably formed by a crosslinking reaction or polymerization reaction of a photosetting and/or thermosetting compound. The curable functional group thereof is preferably a photopolymerizable functional group. The organic metal compound containing a hydrolyzable functional group is preferably an organic alkoxysilyl compound.

Specific examples of these compounds are the same as those exemplified for the high refractive index layer. Specific examples of the composition constituting the hard coat layer include those described in Japanese Patent Laid-open Publication Non. 2002-144913, 2000-9908 and WO02/46617, The high refractive index layer can also function as a hard coat layer. In this case, the layer is preferably formed by finely dispersing the microparticles in a hard coat layer using the method described for the high refractive index layer.

The hard coat layer may contain particles having an average particle size of 0.2 to 10 μm so as to also function as an antiglare layer imparted with antiglare function (described later).

The hard coat layer can be designed to have a film thickness suitable for use. The thickness of the hard coat layer is preferably 0.2 to 10 μm, more preferably 0.5 to 7 μm.

The hard coat layer preferably has a mechanical strength of H or more, more preferably 2H or more, most preferably 3H or more, in term of hardness determined by the pensile hardness test according to JIS K5400. The hard coat layer showing smaller abrasion as a test piece in the taber test according to JIS K5400 is more preferred.

(2-3-5) Forward Scattering Layer

When the cellulose acylate film of the present invention is used in a liquid crystal display device, a forward scattering layer is provided in order to impart a viewing angle improving effect for the case of tilting the viewing angle up and down or right and left. The hard coat layer can be made to also serve as this layer by dispersing microparticles having different refractive indexes in the hard coat layer.

Examples include the one described in Japanese Patent Laid-open Publication No. 11-38208, in which the forward scattering coefficient of the forward scattering layer is particularly defined, the one described in Japanese Patent Laid-open Publication No. 2000-199809, in which the relative refractive index of transparent resin and microparticles is defined to be within a particular range, the one described in Japanese Patent Laid-open Publication No. 2002-107512, in which the haze value of the forward scattering layer is defined to be 40% or more, and so forth.

(2-3-6) Other Layers

Besides the aforementioned layers, a primer layer, antistatic layer, undercoat layer, protective layer etc. may also be provided.

(2-3-7) Coating Method

The layers constituting the antireflection film can be formed by application using any of dip coating, air knife coating, curtain coating, roller coating, wire bar coating, gravure coating, microgravure coating, and extrusion coating (U.S. Pat. No. 2,681,294) methods.

(2-3-8) Antiglare Function

The antireflection film may have an antiglare function for scattering light from the outside. The antiglare function can be obtained by making unevenness on the surface of the antireflection film. When the antireflection film has the antiglare function, the antireflection film preferably has a haze of 3 to 30%, more preferably 5 to 20%, most preferably 7 to 20%.

As the method for forming unevenness on the surface of the antireflection film, any method capable of sufficiently maintaining such surface shape can be used. Examples of the method include a method of using microparticles in the low refractive index layer to form unevenness on the surface of the film (for example, Japanese Patent Laid-open Publication No. 2000-271878), a method of adding a small amount (0.1 to 50 weight %) of relatively large particles (particle size: 0.05 to 2 μm) to the layer under the low refractive index layer (high refractive index layer, medium refractive index layer or hard coat layer) to form a film having an uneven surface and then forming the low refractive index layer thereon while keeping the uneven shape (for example, Japanese Patent Laid-open Publication Nos. 2000-281410, 2000-95893, 2001-100004 and 2001-281407), a method of physically transferring uneven shape onto a surface of a coated uppermost layer (antifouling layer) (for example, those described in Japanese Patent Laid-open Publication Nos. 63-278839, 11-133710 and 2000-275401 as methods using embossing) and so forth.

EXAMPLES

Hereafter, the present invention will be further specifically explained by referring to examples. However, the materials, amounts used, ratios, types of processes procedures of processes and so forth mentioned in the examples may be optionally changed without departing from the spirit of the present invention. Therefore, the scope of the present invention is not limited to the specific examples described below.

Examples 1 and 2

1. Cellulose Acylate Resin

Cellulose acylate resins having different acyl groups in different substitution degrees mentioned in Table 1 were prepared. In the preparation, sulfuric acid as a catalyst was added (7.8 parts by weight to 100 parts by weight of cellulose), and a carboxylic acid as a raw material of the acyl substituents was added to perform an acylation reaction at 40° C. In this acylation reaction, the type and/or substitution degree of the acyl group were controlled by changing the type and/or amount of the carboxylic acid. After the acylation, ripening was performed at 40° C. Polymerization degrees of the cellulose acylates obtained as described above were obtained by the following method and mentioned in Tables 1 and 2.

(Measurement Method for Polymerization Degree)

About 0.2 g of an absolutely dried cellulose acylate resin was precisely weighed and dissolved in 100 mL of a mixed solvent of methylene chloride and ethanol (9/1, weight ratio). Drop second number of the solution was measured at 25° C. by using an Ostwald's viscometer, and degree of polymerization was obtained according to the following equations.

$$\eta rel = T/TO$$

$$[\eta] = (1n\eta rel)/C$$

$$DP = [\eta]/Km$$

In the equations, T is a drop second number of measurement sample, TO is drop second number of solvent alone, C is concentration (g/l), and Km is $6 \times 10^{-4}$.

(Measurement Method for Tg)

Tg was measured by the following method. As for the samples added with a plasticizer, Tg was measured after addition of the plasticizer. The results are shown in Tables 1 and 2.

A sample in an amount of 20 mg was put into a measurement pan of DSC. The sample contained in the pan was heated from 30° C. to 250° C. at a rate of 10° C./minute (1st run) and then cooled to 30° C. at a rate of −10° C./minute under a nitrogen flow. Then, the temperature was increased again from 30 to 250° C. (2nd run). The temperature at which the baseline started to deviate from the low temperature side during the 2nd run was considered as Tg and indicated in Tables 1 and 2.

2. Film Formation

Cellulose acylate films were formed by the following melt film formation or solution film formation. Which method was adopted is indicated in Tables 1 and 2.

(1) Melt Film Formation [Example 1]

Each of the aforementioned cellulose acylate resins was molded into cylindrical pellets having a diameter of 3 mm and a length of 5 mm. Silicon dioxide microparticles (0.05% by weight) (Aerosil R972V) was added for all the levels. During this molding of pellets, a plasticizer selected from the followings (indicated in Table 1) was kneaded in the pellets. The pellets were dried in a vacuum drier at 110° C. so as to have a moisture content of 0.1% or less and then put into a hopper of which temperature was adjusted to (Tg−10)° C.

TPP: Triphenyl phosphate
BDP: Biphenyldiphenyl phosphate
DOA: Bis(2-ethylhexyl) adipate
PTP: 1,4-Phenylene-tetraphenyl phosphate The melting temperature was adjusted so that the melt viscosity should become 5000 Pa·s, and the resin was melted at this temperature in a single screw kneader over 5 minutes, then cast from a T die set at a temperature 10° C. higher than the melting temperature of the resin onto a casting drum set at a temperature of (Tg−5)° C., and thereby solidified to form a film. For this operation, a static electricity impressing method for each level was used (a wire applied with a voltage of 10 kV was disposed at a position 10 cm apart from the landing site of the melt on the casting drum). The solidified melt was stripped off and rolled up. Immediately before the rolling up, the both side ends of the film were trimmed (for 3% each of the total width) and subjected to a thickness imparting process (knurling) for a width of 10 mm to be imparted a thickness of 50 μm. The film had a width of 1.5 m and rolled up for 3000 m at a rate of 30 m/minute.

(2) Solution Film Formation [Example 2]

(2-1) Preparation of Cellulose Acylate Resin

Each of the aforementioned cellulose acylate resins was dried until the moisture content should become 0.1 weight % or lens, then added with a plasticizer mentioned in Table 1, dissolved with a solvent selected from the followings, and then further diluted to a cellulose acylate concentration of 25 weight %.

Chlorine-free solvent: methyl acetate/acetone/methanol/ethanol/butanol (80/5/7/5/3, weight parts)

Chlorine containing solvent: dichloromethane/methanol/ethanol/butanol (85/6/5/4, weight parts)

The plasticizer was selected from TPP, BDP, DOA and PTP, and indicated in Table 2. Besides this, the following additives were added for each level.

Optical anisotropy controlling agent: a plate-like compound mentioned below (3 weight %)

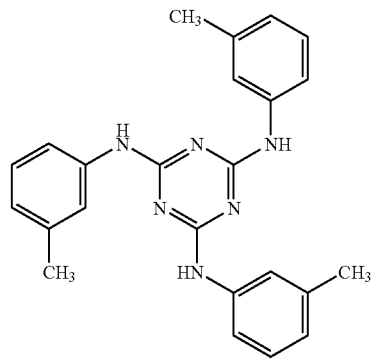

UV absorbing agent a: 2,4-bis(n-octylthio)-6-(4-hydroxy-3,5-di-tert-butylanilino)-1,3,5-triazine (0.5 weight %)
UV absorbing agent b: 2-(2'-hydroxy-3',5'-di-tert-butylphenyl)-5-chlorobenzotriazole (0.2 weight %)
UV absorbing agent c: 2-(2'-hydroxy-3',5'-di-tert-aminophenyl)-5-chlorobenzotriazole (0.1 weight %)
Microparticles: silicon dioxide (particle size: 20 nm, Mohs hardness: about 7, 0.25 weight %)
Citric acid ethyl aster (1:1 mixture of monoester and diester, 0.2 weight %)

All of the amounts mentioned above (weight %) are ratios based on the cellulose acylate.

(2-2) Swelling and Dissolution

The cellulose acylate resin and these additives were added to the solvent with stirring. After completion of the addition, the stirring was terminated, and the resin was allowed to swell at 25° C. for 3 hours to form slurry. The slurry was stirred again to completely dissolve the cellulose acylate resin.

(2-3) Filtration and Concentration

After the above procedure, the solution was filtered through a filter having an absolute filtration accuracy of 0.01 mm (#63, produced by ToyoRoshi Kaisha, Ltd.) and then through a filter having an absolute filtration accuracy of 2.5 μm (FH025, produced by Pall Corporation).

(2-4) Film Formation

The dope was warmed to 35° C. and cast by either one of the following methods.

(2-5) Band Method

The dope was cast via a geezer on a mirror-surface stainless steel support having a band length of 60 m and set at 15° C. As for the geezer used, one having a shape similar to that described in Japanese Patent Laid-open Publication No. 11-314233 was used. The casting speed was 60 m/minute, and the casting width was 250 cm.

The cast film was stripped off when the residual solvent content became 100 weight %, then dried at 130° C. and rolled up when the residual solvent content indicated in Table 2 was attained to obtain a cellulose acylate film. The both side ends of the obtained film was trimmed for 3 cm each, then subjected to knurling for a width of 2 to 10 mm to impart a thickness of 100 μm and rolled up into a roll with a length of 3000 m.

(2-6) Drum Method

The dope was cast via a geezer on a mirror-surface stainless drum having a diameter of 3 m and set at −15° C. As for the geezer used, one having a shape similar to that described in Japanese Patent Laid-open Publication No. 11-314233 was used. The casting speed was 100 m/minute, and the casting width was 250 cm.

The cast film was stripped off when the residual solvent content became 200 weight %, then dried at 130° C. and rolled up when the residual solvent content indicated in Table 1 was attained to obtain a cellulose acylate film. The both side ends of the obtained film was trimmed for 3 cm each, then subjected to knurling for a width of 2 to 10 mm to impart a thickness of 100 μm and rolled up into a roll with a length of 3000 m.

3. Stretching

Each of the cellulose acylate films obtained by the aforementioned melt film formation or solution film formation was stretched under the conditions indicated in Table 1 or 2 in the state that the film contained the aforementioned residual volatile matter. How many degrees the Stretching temperature was higher or lower than Tg of the material at each level (for samples containing a plasticizer, measured in the state of containing the plasticizer) is indicated with a numeral and a symbol of + or − in the column of "Temperature difference from Tg" in Table 1. The stretching ratios shown in Tables 1 and 2 were obtained by the following method. Marked lines are drawn in the longitudinal direction and in the transverse direction. The length of these marked lines were measured before and after the stretching and the stretching ratio was calculated by the following equation:

Stretching ratio=(length of the marked line after the stretching)/(length of the marked line before the stretching)

The evaluation results of the stretched films obtained as described above are shown in Tables 1 and 2. The longitudinal stretching was performed by using different transportation speeds of nip rollers. Further, when the nip rollers used for the stretching were disposed in the stretching zone, an indication of "Inside" was indicated in Tables 1 and 2, and when they were disposed outside the stretching zone, an indication of "Outside" was indicated in Tables 1 and 2. The transverse stretching was performed by a method of using a tenter at (Tg+10)° C. for all the samples.

The Re values, Rth values (averages) and variation ratios of these values were measured and are shown in Tables 1 and 2. Adhesion unevenness was also measured and is shown in Tables 1 and 2.

Hereafter, the measurement methods used in the present invention will be described.

(1) Adhesion Mark

A sample film was placed on flat black cloth and observed by visual inspection under reflected light of a tungsten lamp. The surface was observed for an area of 20 m² to confirm marks in the shape of two of unparallel short lines (bird footprint marks) in a length of several millimeters or so, and the number of the marks was counted and represented as an average number for 1 m². The adhesion marks in the shape of two of unparallel short lines are generated by radially proceeding peeling of a film adhered on a stretching roller upon contact with the roller when it is separated from the roller.

(2) Re value, Rth value and variation of Re value and Rth value for transverse direction and longitudinal direction (2-1) Sampling in MD Direction Samples are cut in a size of 1 cm² at 100 points with intervals of 0.5 m along the longitudinal direction.

(2-2) Sampling in TD Direction

Samples are cut in a size of 1 cm² at 50 points with equal intervals for the whole width of the formed film.

(2-3) Measurement of Re Value and Rth Value

Each of the samples obtained above was conditioned for moisture content at 25° C. and 60% RH for 3 hours or longer, and then retardation values (Rth values) of the sample were measured at a wavelength of 550 nm and at 25° C. and 60% RH for a direction perpendicular to the sample film surface and a direction tilted by ±40° C. from the normal of the film surface by using an automatic birefringence analyzer (KOBRA-21ADH/PR, produced by Oji Scientific Instruments). The in-plane retardation value (Re value) was calculated from the measured values for the perpendicular direction and the ±40° C. direction. Averages of the measured values for all of the sampling points were used as the Re value and Rth value.

(2-4) Variation of Re Value and Rth Value

Difference of the maximum value and minimum value among the values obtained for 100 points for the MD direction or 50 points for the TD direction was divided with the average and represented in terms of percentage as variation of the Re value or Rth value.

(3) Length/Width Ratio

A value (L/W) obtained by dividing the interval between the nip rollers used for the stretching (L, distance between the cores of 2 pairs of nip rollers) with the width of the cellulose acylate film before stretching (W) was indicated. When three or more pairs of nip rollers were used, the largest L/W value was used as the length/width ratio.

The Re values, Rth values (averages) and variation ratio of these of the alignment layers obtained as described above were measured by the aforementioned methods and indicated in Table 1 and 2. Adhesion unevenness was also measured by the aforementioned method and is shown in Tables 1 and 2.

(4) Substitution Degree of Cellulose Acylate

Acyl substitution degree of the cellulose acylate films was obtained by $^{13}$C-NMR according to the method of Tezuka at al., Carbohydr. Res., 273 (1995) 83-91.

(5) Method for Measuring Tg

Tg was measured by the following method. For the samples added with a plasticizer, Tg was measured after the addition of the plasticizer. The results are shown in Table 1 and 2.

A sample in an amount of 20 mg was put into a measurement pan of DSC. The sample contained in the pan was heated from 30° C. to 250° C. at a rate of 10° C./minute (1st run) and then cooled to 30° C. at a rate of −10° C./minute under a nitrogen flow. Than, the temperature was increased again from 30 to 250° C. (2nd run). The temperature at which the baseline started to deviate from the low temperature side during the 2nd run was considered as Tg and indicated in Tables 1 and 2. Further, 0.05 weight % of silicon dioxide microparticles (Aerosil R972V) was added for all the levels.

(6) Cooling Rate After Stretching

Temperatures at the exit of the stretching zone and in the center in the width direction of the cellulose acylate film just before the nip rollers in the exit side were measured, and a temperature difference ($\Delta T$) between the both was then determined. The time of transportation of the film between these two points was divided by $\Delta T$, and the obtained value was defined as a cooling rate after stretching.

(7) Slack in the Width Direction (TD Slack)

From a total width (W) of the cellulose acylate film in the stretching zone and a linear distance (L) between a straight line linking the both ends during stretching and the most slack portion, the slack was determined by the expression: [slack (%)=100×(L/W)]. This measurement was carried out at ten points of the stretching zone having been divided equally in the longitudinal direction (LD) and the maximum value was defined as slack in the width direction.

4. Preparation of Polarizing Plate (1) Surface Treatment

The stretched cellulose acylate films were subjected to saponification according to either one of the following methods, and the type of the method is indicated in Tables 1 and 2.

(1-1) Application Saponification

To 80 parts by weight of isopropanol, 20 parts by, weight of water was added, and KOH was dissolved in the mixture at a concentration of 1.5 mol/L. The solution of which temperature was adjusted to 60° C. was used as a saponification solution. The saponification solution was applied on each of the cellulose acylate films of 60° C. in an amount of 10 g/m$^2$, and saponification was performed for 1 minute. Then, warm water of 50° C. was sprayed on the film at a rate of 10 L/m$^2$·min for 1 minute to wash the film.

(1-2) Immersion Saponification

A 1.5 mol/L NaOH aqueous solution was used as a saponification solution. The solution was adjusted to 60° C., and each of the cellulose acylate films was immersed in the solution for 2 minutes. Then, the film was immersed in a 0.05 mol/L sulfuric acid aqueous solution for 30 seconds and then passed through a bath for washing with water.

(2) Preparation of Polarizing Film

A polarizing film having a thickness of 20 μm was prepared according to either one of the methods described below (indicated in Tables 1 and 2). In the present invention, a film imparted with polarizing ability by stretching is referred to as a polarizing film, and such a layer held between two of protective films or phase difference films is referred to as a polarizing plate for distinction from the polarizing film.

(2-1) Oblique Stretching Method

Each of the films was stretched so that the stretching axis should be oblique by 45° by using a tenter according to Japanese Patent Laid-open Publication No. 2002-086554, Example 1.

(2-2) Parallel Stretching Method

Each of the films was stretched in the longitudinal direction by using different peripheral speeds of two pairs of nip rollers according to Japanese Patent Laid-open Publication No. 2001-141926, Example 1.

(3) Lamination

The polarizing film obtained as described above was held between each of the aforementioned saponified cellulose acylate films (phase difference plates) and a saponified protective layer for polarizing plate (Fuji Tack, trade name, produced by Fuji Photo Film CO. LTD). The phase difference plate and the polarizing film were bonded with a 3% aqueous solution of PVA (PVA-117H produced by KURRAY CO. LTD) as an adhesive. Fuji Tack and the polarizing film were also bonded with the aforementioned PVA aqueous solution as an adhesive. As for the direction of the films, they were bonded so that the polarization axis and the longitudinal direction of the phase difference plate should form an angle of 45°. Each of the polarizing plates obtained as described above was attached to the 20-inch VA type liquid crystal display described in Japanese Patent Laid-open Publication No. 2000-154261, FIGS. 2 to 9 and evaluated by visual inspection. Occurrences of display unevenness per unit area were indicated in Tables 1 and 2. Superior performance was obtained for the displays prepared by using the cellulose acylate films according to the present invention.

5. Preparation of Optical Compensation Film

The cellulose acylate film applied with a liquid crystal layer described in Japanese Patent Laid-open Publication No. 11-316378, Example 1 was replaced with the cellulose acylate films of the present invention. As a result, favorable optical compensation films could be prepared as shown in Table 2 (indicated as "Optical compensation film A").

The cellulose acylate film applied with a liquid crystal layer described in Japanese Patent Laid-open Publication No. 7-333433, Example 1 was replaced with the stretched cellulose acylate films of the present invention to prepare optical compensation filter films. As a result, favorable optical compensation films could be prepared (indicated as "Optical compensation film B").

On the other hand, optical characteristics of those not using the cellulose acylate films of the present invention wore degraded. In particular, those prepared according to Japanese Patent Laid-open Publication No. 2002-31124, Example 1 (Table 1, Comparative Example 1-4) and Sample No. S-11 described in Japanese Patent Laid-open Publication No. 2003-315551, Examples (Table 2, Comparative Example 2-4) showed marked degradation.

6. Preparation of Low Reflective Films

Low reflective films were prepared by using the cellulose acylate films of the present invention according to Kokai Giho of Japan Institute of Invention and Innovation, Kogi No. 2001-1745, published on Mar. 15, 2001, Example 47. As a result, superior optical performance could be obtained.

7. Preparation of Liquid Crystal Display Devices

The aforementioned polarizing plates of the present invention were used in the liquid crystal display device described in Japanese Patent Laid-open Publication No. 10-48420, Example 1, optically anisotropic layer containing discotic liquid crystal molecules and alignment layer applied with polyvinyl alcohol described in Japanese Patent Laid-open Publication No. 9-26572, Example 1, 20-inch VA type liquid crystal display device described in Japanese Patent Laid-open Publication No. 2000-154261, FIGS. 2 to 9, and 20-inch OCB type liquid crystal display device described in Japanese Patent Laid-open Publication No. 2000-154261, FIGS. 10 to 15. Further, the low reflective films of the present invention were adhered to the outermost layers of these liquid crystal display devices and evaluated. As a result, favorable liquid crystal display devices showing no display unevenness originated in the adhesion marks could be obtained as shown in Tables 1 and 2.

Here, the stretching ratio was expressed by the following two methods.

(1) Stretching Ratio (%):

This stretching ratio is one determined according to the definition expressed by the following expression (A).

[Stretching ratio (%)]=(100×[(length after stretching)−(length before stretching)]/(length before stretching))  Expression (A)

(2) Stretching Ratio (times):

This stretching ratio is one determined according to (length after stretching)/(length before stretching).

Also, the "ratio of longitudinal stretching to transverse stretching" as referred to in the present invention is a ratio of the longitudinal stretching ratio to the transverse stretching ratio and is a value obtained by dividing the longitudinal stretching ratio by the transverse stretching ratio, which are obtained by (1) above.

TABLE 1

| | cellulose acylate | | | | | | | | plasticizer | | | film formation method |
|---|---|---|---|---|---|---|---|---|---|---|---|---|
| | substitution degree | | | | | | polymerization degree | | | | | |
| | acetyl group (A) | propionyl group (B1) | butyryl group (B2) | pentanoyl group (B3) | hexanoyl group (B4) | B (sum of B1-B4) | A + B | | material | amount (wt %) | Tg (° C.) | |
| Example 1-1 | 1.0 | | 1.7 | | | 1.7 | 2.7 | 300 | TPP | 6 | 105 | melt |
| Example 1-2 | 1.0 | | 1.7 | | | 1.7 | 2.7 | 300 | TPP | 6 | 105 | melt |
| Example 1-3 | 1.0 | | 1.7 | | | 1.7 | 2.7 | 300 | TPP | 6 | 105 | melt |
| Comparative 1-1 | 1.0 | | 1.7 | | | 1.7 | 2.7 | 300 | TPP | 6 | 105 | melt |
| Comparative 1-2 | 1.0 | | 1.7 | | | 1.7 | 2.7 | 300 | TPP | 6 | 105 | melt |
| Example 1-4 | 1.0 | | 1.7 | | | 1.7 | 2.7 | 300 | TPP | 6 | 105 | melt |
| Example 1-5 | 1.0 | | 1.7 | | | 1.7 | 2.7 | 300 | TPP | 6 | 105 | melt |
| Example 1-6 | 1.0 | | 1.7 | | | 1.7 | 2.7 | 300 | TPP | 6 | 105 | melt |
| Comparative 1-3 | 1.0 | | 1.7 | | | 1.7 | 2.7 | 300 | TPP | 6 | 105 | melt |
| Example 1-7 | 1.0 | | 1.7 | | | 1.7 | 2.7 | 300 | TPP | 6 | 105 | melt |
| Example 1-8 | 1.0 | | 1.7 | | | 1.7 | 2.7 | 300 | TPP | 6 | 105 | melt |
| Example 1-9 | 1.0 | | 1.7 | | | 1.7 | 2.7 | 300 | TPP | 6 | 105 | melt |
| Example 1-10 | 1.0 | | 1.7 | | | 1.7 | 2.7 | 300 | TPP | 6 | 105 | melt |
| Example 1-11 | 1.0 | | 1.7 | | | 1.7 | 2.7 | 300 | TPP | 6 | 105 | melt |
| Example 1-12 | 1.0 | | 1.7 | | | 1.7 | 2.7 | 300 | TPP | 6 | 105 | melt |
| Example 1-13 | 1.0 | | 1.7 | | | 1.7 | 2.7 | 300 | TPP | 6 | 105 | melt |
| Example 1-14 | 1.0 | | 1.7 | | | 1.7 | 2.7 | 300 | TPP | 6 | 105 | melt |
| Example 1-15 | 1.0 | | 1.7 | | | 1.7 | 2.7 | 300 | TPP | 6 | 105 | melt |
| Example 1-16 | 1.0 | | 1.7 | | | 1.7 | 2.7 | 300 | TPP | 6 | 105 | melt |
| Example 1-17 | 1.0 | | 1.7 | | | 1.7 | 2.7 | 300 | TPP | 6 | 105 | melt |
| Example 1-18 | 1.0 | | 1.7 | | | 1.7 | 2.7 | 300 | TPP | 6 | 105 | melt |
| Example 1-19 | 1.0 | | 1.7 | | | 1.7 | 2.7 | 300 | TPP | 6 | 105 | melt |
| Example 1-20 | 1.2 | | 1.3 | | | 1.3 | 2.5 | 300 | TPP | 6 | 133 | melt |
| Example 1-21 | 0.4 | | 2.5 | | | 2.5 | 2.9 | 300 | TPP | 6 | 90 | melt |
| Example 1-22 | 1.2 | | 1.2 | | | 1.2 | 2.4 | 300 | TPP | 6 | 145 | melt |
| Example 1-23 | 1.0 | | 1.7 | | | 1.7 | 2.7 | 210 | TPP | 6 | 103 | melt |
| Example 1-24 | 1.0 | | 1.7 | | | 1.7 | 2.7 | 390 | TPP | 6 | 110 | melt |
| Example 1-25 | 1.0 | | 1.7 | | | 1.7 | 2.7 | 190 | TPP | 6 | 100 | melt |
| Example 1-26 | 1.0 | | 1.7 | | | 1.7 | 2.7 | 410 | TPP | 6 | 112 | melt |
| Example 1-27 | 1.0 | | 1.7 | | | 1.7 | 2.7 | 300 | TPP | 0 | 125 | melt |
| Example 1-28 | 1.0 | | 1.7 | | | 1.7 | 2.7 | 300 | TPP | 1 | 122 | melt |
| Example 1-29 | 1.0 | | 1.7 | | | 1.7 | 2.7 | 300 | TPP | 19 | 100 | melt |
| Example 1-30 | 1.0 | | 1.7 | | | 1.7 | 2.7 | 300 | TPP | 21 | 73 | melt |
| Example 1-31 | 0.2 | 2.7 | | | | 2.7 | 2.9 | 300 | PTP | 10 | 110 | melt |
| Example 1-32 | 0.0 | 2.95 | | | | 2.95 | 2.95 | 300 | PTP | 10 | 112 | melt |
| Example 1-33 | 0.5 | 2.0 | | | | 2.0 | 2.5 | 300 | PTP | 10 | 128 | melt |
| Example 1-34 | 0.7 | | 1.0 | 1.0 | | 2.0 | 2.7 | 300 | PTP | 3 | 105 | melt |
| Example 1-35 | 0.2 | 1.5 | | | 1.0 | 2.5 | 0.2 | 300 | DOA | 12 | 100 | melt |

| | stretching | | | | | | | |
|---|---|---|---|---|---|---|---|---|
| | | LD | | | | | TD | |
| | | nip rollers | | stretching zone | | | | |
| | length/width ratio | placement | temperature minus Tg (° C.) | temperature minus Tg (° C.) | number of rollers | stretching ratio | | TD stretching ratio | | LD/TD |
| | | | | | | times | percent | times | percent | |
| Example 1-1 | 10 | outside | −80 | +10 | 0 | 1.8 | 80 | 1.2 | 20 | 4 |
| Example 1-2 | 2.2 | outside | −80 | +10 | 0 | 1.8 | 80 | 1.2 | 20 | 4 |
| Example 1-3 | 49 | outside | −80 | +10 | 0 | 1.8 | 80 | 1.2 | 20 | 4 |
| Comparative 1-1 | 1.8 | outside | −80 | +10 | 0 | 1.8 | 80 | 1.2 | 20 | 4 |

TABLE 1-continued

| | | | | | | | | | | |
|---|---|---|---|---|---|---|---|---|---|---|
| Comparative 1-2 | 62 | outside | −80 | +10 | 0 | 1.8 | 80 | 1.2 | 20 | 4 |
| Example 1-4 | 10 | outside | −140 | +10 | 0 | 1.8 | 80 | 1.2 | 20 | 4 |
| Example 1-5 | 10 | outside | −5 | +10 | 0 | 1.8 | 80 | 1.2 | 20 | 4 |
| Example 1-6 | 10 | outside | −180 | +10 | 0 | 1.8 | 80 | 1.2 | 20 | 4 |
| Comparative 1-3 | 10 | inside | +10 | +10 | 0 | 1.8 | 80 | 1.2 | 20 | 4 |
| Example 1-7 | 10 | outside | −80 | +1 | 0 | 1.8 | 80 | 1.2 | 20 | 4 |
| Example 1-8 | 10 | outside | −80 | +90 | 0 | 1.8 | 80 | 1.2 | 20 | 4 |
| Example 1-9 | 10 | outside | −80 | 0 | 0 | 1.8 | 80 | 1.2 | 20 | 4 |
| Example 1-10 | 10 | outside | −80 | +110 | 0 | 1.8 | 80 | 1.2 | 20 | 4 |
| Example 1-11 | 10 | outside | −80 | +1 | 1 | 1.8 | 80 | 1.2 | 20 | 4 |
| Example 1-12 | 10 | outside | −80 | +10 | 0 | 1.8 | 80 | 1 | 0 | |
| Example 1-13 | 10 | outside | −80 | +10 | 0 | 1.8 | 80 | 1.9 | 60 | 1.333333 |
| Example 1-14 | 10 | outside | −80 | +10 | 0 | 1.8 | 80 | 2.4 | 140 | 0.571429 |
| Example 1-15 | 10 | outside | −80 | +10 | 0 | 1.8 | 80 | 2.5 | 190 | 0.5 |
| Example 1-16 | 10 | outside | −80 | +10 | 0 | 1.1 | 10 | 2.4 | 140 | 0.071429 |
| Example 1-17 | 10 | outside | −80 | +10 | 0 | 1.8 | 80 | 1.4 | 40 | 1.5 |
| Example 1-18 | 10 | outside | −80 | +10 | 0 | 3 | 200 | 1 | 0 | |
| Example 1-19 | 10 | outside | −80 | +10 | 0 | 3.2 | 220 | 1 | 0 | |
| Example 1-20 | 10 | outside | −80 | +10 | 0 | 1.8 | 80 | 1.2 | 20 | 4 |
| Example 1-21 | 10 | outside | −80 | +10 | 0 | 1.8 | 80 | 1.2 | 20 | 4 |
| Example 1-22 | 10 | outside | −80 | +10 | 0 | 1.8 | 80 | 1.2 | 20 | 4 |
| Example 1-23 | 10 | outside | −80 | +10 | 0 | 1.8 | 80 | 1.2 | 20 | 4 |
| Example 1-24 | 10 | outside | −80 | +10 | 0 | 1.8 | 80 | 1.2 | 20 | 4 |
| Example 1-25 | 10 | outside | −80 | +10 | 0 | 1.8 | 80 | 1.2 | 20 | 4 |
| Example 1-26 | 10 | outside | −80 | +10 | 1 | 1.8 | 80 | 1.2 | 20 | 4 |
| Example 1-27 | 10 | outside | −80 | +10 | 0 | 1.8 | 80 | 1.2 | 20 | 4 |
| Example 1-28 | 10 | outside | −80 | +10 | 0 | 1.8 | 80 | 1.2 | 0 | 4 |
| Example 1-29 | 10 | outside | −80 | +10 | 0 | 1.8 | 80 | 1.2 | 20 | 4 |
| Example 1-30 | 10 | outside | −80 | +10 | 0 | 1.8 | 80 | 1.2 | 20 | 4 |
| Example 1-31 | 10 | outside | −80 | +10 | 0 | 1.8 | 80 | 1.2 | 20 | 4 |
| Example 1-32 | 10 | outside | −80 | +10 | 0 | 1.8 | 80 | 1.2 | 20 | 4 |
| Example 1-33 | 10 | outside | −80 | +10 | 0 | 1.8 | 80 | 1.2 | 20 | 4 |
| Example 1-34 | 10 | outside | −80 | +10 | 0 | 1.8 | 80 | 1.2 | 20 | 4 |
| Example 1-35 | 10 | outside | −80 | +10 | 0 | 1.8 | 80 | 1.2 | 20 | 4 |

| | evaluation of stretched film | | | | number of adhesion marks (per m$^3$) | surface treatment method for saponification | polarizing plate | | optional compensation film |
|---|---|---|---|---|---|---|---|---|---|
| | Re | | Rth | | | | | | |
| | average (nm) | variation ratio (%) | average (nm) | variation ratio (%) | | | method for stretching polarizing layer | display unevenness (per m$^3$) | display unevenness (per m$^3$) |
| Example 1-1 | 50 | 1 | 280 | 1 | 0 | immersion | parallel stretching | 0 | 0 |
| Example 1-2 | 50 | 3 | 280 | 3 | 3 | immersion | parallel stretching | 3 | 3 |
| Example 1-3 | 50 | 2 | 280 | 2 | 1 | immersion | parallel stretching | 1 | 1 |
| Comparative 1-1 | 50 | 6 | 280 | 6 | 38 | immersion | parallel stretching | 38 | 38 |
| Comparative 1-2 | 50 | 5 | 280 | 5 | 18 | immersion | parallel stretching | 18 | 18 |
| Example 1-4 | 50 | 1 | 280 | 1 | 0 | immersion | parallel stretching | 0 | 0 |
| Example 1-5 | 50 | 3 | 280 | 3 | 3 | immersion | parallel stretching | 3 | 3 |
| Example 1-6 | 50 | 2 | 280 | 2 | 1 | immersion | parallel stretching | 1 | 1 |
| Comparative 1-3 | 50 | 6 | 280 | 6 | 39 | immersion | parallel stretching | 39 | 39 |
| Example 1-7 | 100 | 1 | 380 | 1 | 0 | immersion | parallel stretching | 0 | 0 |
| Example 1-8 | 30 | 1 | 200 | 1 | 0 | immersion | parallel stretching | 0 | 0 |
| Example 1-9 | 120 | 3 | 410 | 3 | 4 | immersion | parallel stretching | 4 | 4 |
| Example 1-10 | 20 | 4 | 100 | 4 | 8 | immersion | parallel stretching | 8 | 8 |
| Example 1-11 | 55 | 2 | 300 | 2 | 5 | immersion | parallel stretching | 5 | 5 |
| Example 1-12 | 100 | 1 | 240 | 1 | 0 | immersion | parallel stretching | 0 | 0 |
| Example 1-13 | 10 | 1 | 290 | 1 | 0 | immersion | parallel stretching | 0 | 0 |
| Example 1-14 | 160 | 1 | 370 | 1 | 0 | immersion | parallel stretching | 0 | 0 |
| Example 1-15 | 200 | 3 | 500 | 3 | 0 | immersion | parallel stretching | 0 | 0 |
| Example 1-16 | 170 | 1 | 230 | 1 | 0 | immersion | parallel stretching | 0 | 0 |
| Example 1-17 | 20 | 1 | 320 | 1 | 0 | immersion | parallel stretching | 0 | 0 |
| Example 1-18 | 330 | 1 | 290 | 1 | 0 | immersion | parallel stretching | 0 | 0 |
| Example 1-19 | 500 | 3 | 280 | 3 | 3 | immersion | parallel stretching | 3 | 3 |
| Example 1-20 | 30 | 1 | 220 | 1 | 0 | immersion | parallel stretching | 0 | 0 |
| Example 1-21 | 80 | 1 | 350 | 1 | 0 | immersion | parallel stretching | 0 | 0 |
| Example 1-22 | 10 | 3 | 150 | 3 | 8 | immersion | parallel stretching | 8 | 8 |
| Example 1-23 | 40 | 1 | 250 | 1 | 0 | immersion | parallel stretching | 0 | 0 |
| Example 1-24 | 80 | 1 | 380 | 1 | 0 | immersion | parallel stretching | 0 | 0 |
| Example 1-25 | 30 | 2 | 200 | 3 | 5 | immersion | parallel stretching | 5 | 5 |
| Example 1-26 | 80 | 3 | 370 | 2 | 4 | immersion | parallel stretching | 4 | 4 |
| Example 1-27 | 40 | 1 | 260 | 1 | 5 | immersion | parallel stretching | 5 | 5 |

TABLE 1-continued

| Example 1-28 | 45 | 1 | 270 | 1 | 0 | immersion | parallel stretching | 0 | 0 |
|---|---|---|---|---|---|---|---|---|---|
| Example 1-29 | 70 | 1 | 320 | 1 | 0 | immersion | parallel stretching | 0 | 0 |
| Example 1-30 | 80 | 2 | 330 | 3 | 3 | immersion | parallel stretching | 3 | 3 |
| Example 1-31 | 30 | 1 | 220 | 1 | 0 | application | parallel stretching | 0 | 0 |
| Example 1-32 | 50 | 1 | 270 | 2 | 1 | application | parallel stretching | 1 | 1 |
| Example 1-33 | 20 | 1 | 220 | 1 | 0 | application | parallel stretching | 0 | 0 |
| Example 1-34 | 30 | 2 | 270 | 2 | 5 | application | parallel stretching | 5 | 5 |
| Example 1-35 | 20 | 2 | 260 | 2 | 4 | application | parallel stretching | 4 | 4 |

TABLE 2

| | cellulose acrylate | | | | | | | polymerization degree |
|---|---|---|---|---|---|---|---|---|
| | substitution degree | | | | | | | |
| | acetyl group (A) | propionyl group (B1) | butyryl group (B2) | pentanoyl group (B3) | hexanoyl group (B4) | B (sum of B1–B4) | A + B | |
| Example 2-1 | 1.0 | | 1.7 | | | 1.7 | 2.7 | 300 |
| Example 2-2 | 1.0 | | 1.7 | | | 1.7 | 2.7 | 300 |
| Example 2-3 | 1.0 | | 1.7 | | | 1.7 | 2.7 | 300 |
| Comparative 2-1 | 1.0 | | 1.7 | | | 1.7 | 2.7 | 300 |
| Comparative 2-2 | 1.0 | | 1.7 | | | 1.7 | 2.7 | 300 |
| Example 2-4 | 1.0 | | 1.7 | | | 1.7 | 2.7 | 300 |
| Example 2-5 | 1.0 | | 1.7 | | | 1.7 | 2.7 | 300 |
| Example 2-6 | 1.0 | | 1.7 | | | 1.7 | 2.7 | 300 |
| Comparative 2-3 | 1.0 | | 1.7 | | | 1.7 | 2.7 | 300 |
| Example 2-7 | 1.0 | | 1.7 | | | 1.7 | 2.7 | 300 |
| Example 2-8 | 1.0 | | 1.7 | | | 1.7 | 2.7 | 300 |
| Example 2-9 | 1.0 | | 1.7 | | | 1.7 | 2.7 | 300 |
| Example 2-10 | 1.0 | | 1.7 | | | 1.7 | 2.7 | 300 |
| Example 2-11 | 1.0 | | 1.7 | | | 1.7 | 2.7 | 300 |
| Example 2-12 | 1.0 | | 1.7 | | | 1.7 | 2.7 | 300 |
| Example 2-13 | 1.0 | | 1.7 | | | 1.7 | 2.7 | 300 |
| Example 2-14 | 1.0 | | 1.7 | | | 1.7 | 2.7 | 300 |
| Example 2-15 | 1.0 | | 1.7 | | | 1.7 | 2.7 | 300 |
| Example 2-16 | 1.0 | | 1.7 | | | 1.7 | 2.7 | 300 |
| Example 2-17 | 1.0 | | 1.7 | | | 1.7 | 2.7 | 300 |
| Example 2-18 | 1.0 | | 1.7 | | | 1.7 | 2.7 | 300 |
| Example 2-19 | 1.0 | | 1.7 | | | 1.7 | 2.7 | 300 |
| Example 2-20 | 1.2 | | 1.3 | | | 1.3 | 2.5 | 300 |
| Example 2-21 | 0.4 | | 2.5 | | | 2.5 | 2.9 | 300 |
| Example 2-22 | 1.2 | | 1.2 | | | 1.2 | 2.4 | 300 |
| Example 2-23 | 1.0 | | 1.7 | | | 1.7 | 2.7 | 300 |
| Example 2-24 | 1.0 | | 1.7 | | | 1.7 | 2.7 | 300 |
| Example 2-25 | 1.0 | | 1.7 | | | 1.7 | 2.7 | 300 |
| Example 2-26 | 1.0 | | 0.7 | | 1.0 | 1.7 | 2.7 | 300 |
| Example 2-27 | 0.7 | | 1.0 | 1.0 | | 2.0 | 2.7 | 300 |
| Example 2-28 | 0.2 | 1.5 | 1.0 | | | 2.5 | 2.7 | 300 |
| Example 2-29 | 0.0 | 2.7 | | | | 2.7 | 2.7 | 300 |
| Example 2-30 | 0.0 | 2.95 | | | | 2.95 | 2.95 | 300 |
| Example 2-31 | 0.6 | 2.0 | | | | 2.0 | 2.5 | 300 |
| Example 2-32 | 1.95 | 0.7 | | | | 0.7 | 2.65 | 200 |
| Example 2-33 | 1.0 | 1.7 | | | | 1.7 | 2.7 | 300 |
| Comparative 2-4* | 2.9 | | | | | 0.0 | 2.9 | 300 |
| Comparative 2-5** | 1.95 | 0.7 | | | | 0.7 | 2.85 | 250 |

TABLE 2-continued

| | plasticizer | | Tg (°C) | film formation | | | residual amount of solvent (wt %) |
|---|---|---|---|---|---|---|---|
| | material | amount (wt %) | | method | solvent | casting method | |
| Example 2-1 | TPP | 6 | 105 | solution | chlorine-containing | band | 0 |
| Example 2-2 | TPP | 6 | 105 | solution | chlorine-containing | band | 0 |
| Example 2-3 | TPP | 6 | 105 | solution | chlorine-containing | band | 0 |
| Comparative 2-1 | TPP | 6 | 105 | solution | chlorine-containing | band | 0 |
| Comparative 2-2 | TPP | 6 | 105 | solution | chlorine-containing | band | 0 |
| Example 2-4 | TPP | 6 | 105 | solution | chlorine-containing | band | 0 |
| Example 2-5 | TPP | 6 | 105 | solution | chlorine-containing | band | 0 |
| Example 2-6 | TPP | 6 | 105 | solution | chlorine-containing | band | 0 |
| Comparative 2-3 | TPP | 6 | 105 | solution | chlorine-containing | band | 0 |
| Example 2-7 | TPP | 6 | 105 | solution | chlorine-containing | band | 0 |
| Example 2-8 | TPP | 6 | 105 | solution | chlorine-containing | band | 0 |
| Example 2-9 | TPP | 6 | 105 | solution | chlorine-containing | band | 0 |
| Example 2-10 | TPP | 6 | 105 | solution | chlorine-containing | band | 2.5 |
| Example 2-11 | TPP | 6 | 105 | solution | chlorine-containing | band | 3.2 |
| Example 2-12 | TPP | 6 | 105 | solution | chlorine-containing | band | 0 |
| Example 2-13 | TPP | 6 | 105 | solution | chlorine-containing | band | 0 |
| Example 2-14 | TPP | 6 | 105 | solution | chlorine-containing | drum | 0 |
| Example 2-15 | TPP | 6 | 105 | solution | chlorine-containing | drum | 0 |
| Example 2-16 | TPP | 6 | 105 | solution | chlorine-containing | drum | 0 |
| Example 2-17 | TPP | 6 | 105 | solution | chlorine-containing | drum | 0 |
| Example 2-18 | TPP | 6 | 105 | solution | chlorine-containing | band | 0 |
| Example 2-19 | TPP | 6 | 105 | solution | chlorine-containing | band | 0 |
| Example 2-20 | TPP | 6 | 133 | solution | chlorine-containing | band | 0 |
| Example 2-21 | TPP | 6 | 90 | solution | chlorine-containing | band | 0 |
| Example 2-22 | TPP | 6 | 145 | solution | chlorine-containing | band | 0 |
| Example 2-23 | TPP | 0 | 125 | solution | chlorine-containing | band | 0 |
| Example 2-24 | TPP | 1 | 122 | solution | chlorine-containing | band | 0 |
| Example 2-25 | TPP | 19 | 100 | solution | chlorine-containing | band | 0 |
| Example 2-26 | TPP | 21 | 73 | solution | chlorine-containing | band | 0 |
| Example 2-27 | PTP | 3 | 105 | solution | chlorine-containing | band | 0 |
| Example 2-28 | DOA | 12 | 100 | solution | chlorine-free | band | 0 |
| Example 2-29 | BDP | 2 | 155 | solution | chlorine-free | band | 0 |
| Example 2-30 | BDP | 2 | 142 | solution | chlorine-free | band | 0 |
| Example 2-31 | BDP | 2 | 173 | solution | chlorine-free | band | 0 |
| Example 2-32 | BDP | 2 | 115 | solution | chlorine-free | band | 0 |
| Example 2-33 | TPP | 8 | 135 | solution | chlorine-containing | band | 0 |
| Comparative 2-4* | TPP | 12 | 120 | solution | chlorine-free | band | 0 |
| Comparative 2-5** | TPP | 8 | 115 | solution | chlorine-free | band | 0 |

TABLE 2-continued

| | | stretching | | | | | | | | | evaluation of stretched film | |
|---|---|---|---|---|---|---|---|---|---|---|---|---|
| | | LD | | | | | | | TD | | Ra | |
| | | nip rollers | | stretching zone | | stretching ratio | | | stretching ratio | | | |
| | length/ width ratio | placement | temperature minus Tg (° C.) | temperature minus Tg (° C.) | number of rollers | times | percent | | times | percent | LD/TD | average (nm) | variation ratio (%) |
| Example 2-1 | 10 | outside | −80 | +10 | 0 | 1.8 | 80 | | 1.2 | 20 | 4 | 55 | 1 |
| Example 2-2 | 2.2 | outside | −80 | +10 | 0 | 1.8 | 80 | | 1.2 | 20 | 4 | 55 | 3 |
| Example 2-3 | 49 | outside | −80 | +10 | 0 | 1.8 | 80 | | 1.2 | 20 | 4 | 55 | 2 |
| Comparative 2-1 | 1.8 | outside | −40 | +10 | 0 | 1.8 | 80 | | 1.2 | 20 | 4 | 55 | 7 |
| Comparative 2-2 | 52 | outside | −80 | +10 | 0 | 1.8 | 80 | | 1.2 | 20 | 4 | 55 | 5 |
| Example 2-4 | 10 | outside | −140 | +10 | 0 | 1.8 | 80 | | 1.2 | 20 | 4 | 55 | 1 |
| Example 2-5 | 10 | outside | −5 | +10 | 0 | 1.8 | 80 | | 1.2 | 20 | 4 | 55 | 3 |
| Example 2-6 | 10 | outside | −160 | +10 | 0 | 1.8 | 80 | | 1.2 | 20 | 4 | 55 | 2 |
| Comparative 2-3 | 10 | inside | +10 | +10 | 0 | 1.8 | 80 | | 1.2 | 20 | 4 | 55 | 7 |
| Example 2-7 | 10 | outside | −80 | +10 | 0 | 1.8 | 80 | | 1.2 | 20 | 4 | 45 | 1 |
| Example 2-8 | 10 | outside | −80 | +10 | 0 | 1.8 | 80 | | 1.2 | 20 | 4 | 20 | 3 |
| Example 2-9 | 10 | outside | −80 | +10 | 0 | 1.8 | 80 | | 1 | 0 | | 110 | 1 |
| Example 2-10 | 10 | outside | −80 | +10 | 0 | 1.8 | 80 | | 1.6 | 50 | 1.33333 | 10 | 1 |
| Example 2-11 | 10 | outside | −80 | +10 | 0 | 1.8 | 80 | | 2.4 | 140 | 0.57143 | 170 | 1 |
| Example 2-12 | 10 | outside | −80 | +10 | 0 | 1.1 | 10 | | 2.4 | 140 | 0.07143 | 180 | 1 |
| Example 2-13 | 10 | outside | −80 | +10 | 0 | 1.6 | 60 | | 1.4 | 40 | 1.5 | 20 | 1 |
| Example 2-14 | 10 | outside | −80 | +10 | 0 | 3 | 200 | | 1 | 0 | | 340 | 1 |
| Example 2-15 | 10 | outside | −80 | +10 | 0 | 1.8 | 80 | | 1 | 0 | | 60 | 1 |
| Example 2-16 | 2.2 | outside | −80 | +10 | 0 | 1.8 | 80 | | 1 | 0 | | 65 | 3 |
| Example 2-17 | 49 | outside | −80 | +10 | 0 | 1.8 | 80 | | 1 | 0 | | 60 | 2 |
| Example 2-18 | 10 | outside | −140 | +10 | 0 | 1.8 | 80 | | 1 | 0 | | 55 | 1 |
| Example 2-19 | 10 | outside | −5 | +10 | 0 | 1.8 | 80 | | 1 | 0 | | 60 | 3 |
| Example 2-20 | 10 | outside | −80 | +10 | 0 | 1.8 | 80 | | 1.2 | 20 | 4 | 25 | 1 |
| Example 2-21 | 10 | outside | −80 | +10 | 0 | 1.8 | 80 | | 1.2 | 20 | 4 | 75 | 1 |
| Example 2-22 | 10 | outside | −80 | +10 | 0 | 1.8 | 80 | | 1.2 | 20 | 4 | 10 | 3 |
| Example 2-23 | 10 | outside | −80 | +10 | 0 | 1.8 | 80 | | 1.2 | 20 | 4 | 45 | 1 |
| Example 2-24 | 10 | outside | −80 | +10 | 0 | 1.8 | 80 | | 1.2 | 20 | 4 | 40 | 1 |
| Example 2-25 | 10 | outside | −80 | +10 | 0 | 1.8 | 80 | | 1.2 | 20 | 4 | 75 | 1 |
| Example 2-26 | 10 | outside | −80 | +10 | 0 | 1.8 | 80 | | 1.2 | 20 | 4 | 85 | 2 |
| Example 2-27 | 10 | outside | −60 | +10 | 0 | 1.8 | 80 | | 1.2 | 20 | 4 | 35 | 1 |
| Example 2-28 | 10 | outside | −60 | +10 | 0 | 1.8 | 80 | | 1.2 | 20 | 4 | 25 | 1 |
| Example 2-29 | 10 | outside | −60 | +10 | 0 | 1.8 | 80 | | 1.2 | 20 | 4 | 30 | 1 |
| Example 2-30 | 10 | outside | −80 | +10 | 0 | 1.8 | 80 | | 1.2 | 20 | 4 | 45 | 2 |
| Example 2-31 | 10 | outside | −60 | +10 | 0 | 1.8 | 80 | | 1.2 | 20 | 4 | 20 | 1 |
| Example 2-32 | 10 | outside | −80 | +10 | 0 | 1.8 | 80 | | 1.2 | 20 | 4 | 20 | 3 |
| Example 2-33 | 10 | outside | −80 | +10 | 0 | 1.8 | 80 | | 1.2 | 20 | 4 | 45 | 2 |
| Comparative 2-4* | 2 | inside | −30 | −30 | 0 | 1.4 | 40 | | 1 | 0 | | 135 | 10 |
| Comparative 2-5** | 1.5 | inside | +30 | +30 | 1 | 1.5 | 50 | | 1 | 0 | | 250 | 15 |

TABLE 2-continued

| | evaluation of streched film | | number of adhesion marks (per m²) | perface treatment method for tion | polarizing plate method for stretching layer | display unevenness (per m²) | optional compensation film display unevenness (per m²) |
|---|---|---|---|---|---|---|---|
| | Rth average (nm) | variation ratio (%) | | | | | |
| Example 2-1 | 290 | 1 | 0 | application | parallel stretching | 0 | 0 |
| Example 2-2 | 290 | 3 | 4 | application | parallel stretching | 4 | 4 |
| Example 2-3 | 290 | 2 | 1 | application | parallel stretching | 1 | 1 |
| Comparative 2-1 | 290 | 5 | 40 | application | parallel stretching | 40 | 40 |
| Comparative 2-2 | 290 | 5 | 19 | application | parallel stretching | 19 | 19 |
| Example 2-4 | 290 | 1 | 0 | application | parallel stretching | 0 | 0 |
| Example 2-5 | 290 | 3 | 3 | application | parallel stretching | 3 | 3 |
| Example 2-6 | 290 | 2 | 1 | application | parallel stretching | 1 | 1 |
| Comparative 2-3 | 290 | 5 | 40 | application | parallel stretching | 40 | 40 |
| Example 2-7 | 270 | 1 | 0 | application | parallel stretching | 0 | 0 |
| Example 2-8 | 200 | 3 | 6 | application | parallel stretching | 8 | 6 |
| Example 2-9 | 230 | 1 | 0 | application | parallel stretching | 0 | 0 |
| Example 2-10 | 280 | 1 | 0 | application | parallel stretching | 0 | 0 |
| Example 2-11 | 360 | 1 | 0 | application | parallel stretching | 0 | 0 |
| Example 2-12 | 230 | 1 | 0 | application | parallel stretching | 0 | 0 |
| Example 2-13 | 310 | 1 | 0 | application | parallel stretching | 0 | 0 |
| Example 2-14 | 270 | 1 | 0 | application | parallel stretching | 0 | 0 |
| Example 2-15 | 285 | 3 | 3 | application | parallel stretching | 3 | 3 |
| Example 2-16 | 290 | 1 | 1 | application | parallel stretching | 1 | 1 |
| Example 2-17 | 295 | 2 | 0 | application | parallel stretching | 0 | 0 |
| Example 2-18 | 290 | 1 | 0 | application | parallel stretching | 0 | 0 |
| Example 2-19 | 290 | 3 | 4 | application | parallel stretching | 4 | 4 |
| Example 2-20 | 230 | 1 | 0 | application | parallel stretching | 0 | 0 |
| Example 2-21 | 360 | 1 | 0 | application | parallel stretching | 0 | 0 |
| Example 2-22 | 170 | 3 | 8 | application | parallel stretching | 8 | 8 |
| Example 2-23 | 255 | 1 | 5 | application | parallel stretching | 5 | 5 |
| Example 2-24 | 275 | 1 | 0 | application | parallel stretching | 0 | 0 |
| Example 2-25 | 325 | 1 | 3 | application | parallel stretching | 3 | 3 |
| Example 2-26 | 330 | 2 | 3 | application | oblique stretching | 3 | 3 |
| Example 2-27 | 275 | 1 | 5 | immersion | oblique stretching | 5 | 5 |
| Example 2-28 | 265 | 1 | 4 | immersion | oblique stretching | 4 | 4 |
| Example 2-29 | 225 | 1 | 0 | immersion | oblique stretching | 0 | 0 |
| Example 2-30 | 275 | 2 | 2 | immersion | oblique stretching | 2 | 2 |
| Example 2-31 | 215 | 1 | 1 | immersion | parallel stretching | 1 | 1 |
| Example 2-32 | 200 | 3 | 9 | immersion | parallel stretching | 9 | 9 |
| Example 2-33 | 250 | 2 | 4 | application | parallel stretching | 4 | 4 |
| Comparative 2-4* | 100 | 10 | 33 | immersion | parallel stretching | 33 | 33 |
| Comparative 2-5** | 100 | 15 | 56 | immersion | parallel stretching | 56 | 56 |

*Sample 5-11 in Examples of Japanese Patent Publication No. 2003-215351
**Example 1 of Japanese Patent Publication No. 2002-311240

Examples 3 and 4

1. Cellulose Acylate Resin

Cellulose acylate resins having different acyl groups in different substitution degrees mentioned in Tables 3 and 4 were prepared in the same methods as described in Examples 1 and 2. Tg of these cellulose acylate resins was measured in the same methods as described in Examples 1 and 2, and the results thereof were mentioned in Tables 3 and 4. Incidentally, with respective to ones having an additive incorporated therein, values measured after the addition were shown.

2. Film Formation (1) Melt Film Formation [Example 3]

Each of the aforementioned cellulose acylate resins was molded into cylindrical pellets having a diameter of 3 mm and a length of 5 mm. During this molding of pellets, the following optical anisotropy controlling agent was chosen from the followings (indicated in Table 3) and kneaded into the pellets. Also, 0.05 weight % of silicon dioxide microparticles (Aerosil R972V) was added for all the levels.

Optical Anisotropy Controlling Agent

Compound I-(2) described in Japanese Patent Laid-Open Publication No. 2003-344655 (indicated as "A" in Table 1)

Rod-like compound described in paragraph 0055 of Japanese Patent Laid-Open Publication No. 2003-66230 (indicated as "B" in Table 1)

Plate-like compound described in paragraph 0055 of Japanese Patent Laid-Open Publication No. 2003-66230 (indicated as "C" in Table 1)

Compound as described below (indicated as "D" in Table 1)

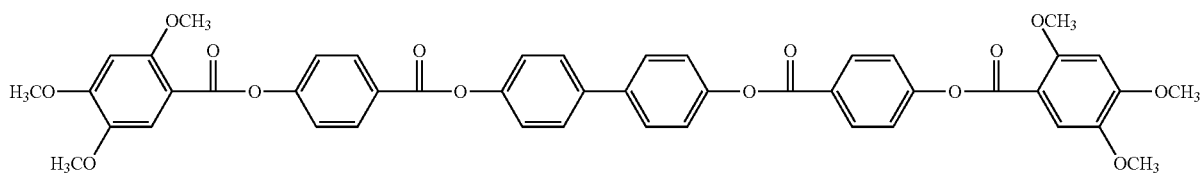

(1)

These were subjected to film formation in the same method as in Example 1.

(2) Solution Film Formation [Example 4]

(2-1) Preparation of Cellulose Acylate (2-1-1) Charging

The cellulose acylate was dissolved in the following solvent system in the same method as in Example 2 such that the concentration was 25 weight %.

Chlorine system: Dichloromethane/methanol/butanol (81.6/14.8/3.6, parts by weight)

The optical anisotropy controlling agent was chosen from the followings and added in an amount indicated in Tables 3 and 4 (weight % against the cellulose acylate).

Optical Anisotropy Controlling Agent

Compound I-(2) described in Japanese Patent Laid-Open Publication No. 2003-344655 (indicated as "A" in Table 1)

Rod-like compound described in paragraph 0055 of Japanese Patent Laid-Open Publication No. 2003-66230 (indicated as "B" in Table 1)

Plate-like compound described in paragraph 0055 of Japanese Patent Laid-Open Publication No. 2003-66230 (indicated as "C" in Table 1)

Compound as described below (indicated as "D" in Table 1)

Further, the following additives were added.

Microparticles: silicon dioxide microparticles (Aerosil R972V, 0.05 weight %)

Ethyl citrate (monoester/diester mixture (1/1), 0.2 weight %)

The aforementioned addition amounts (weight %) are all a proportion against the cellulose acylate.

(2-1-2) Swelling and Dissolution

The swelling and dissolution were carried out in the same method as in Example 2.

(2-1-3) Filtration and Concentration

The filtration and concentration were carried out in the same method as in Example 2.

(2-1-4) Film Formation

The film formation was carried out in the same method as in the band method of Example 2.

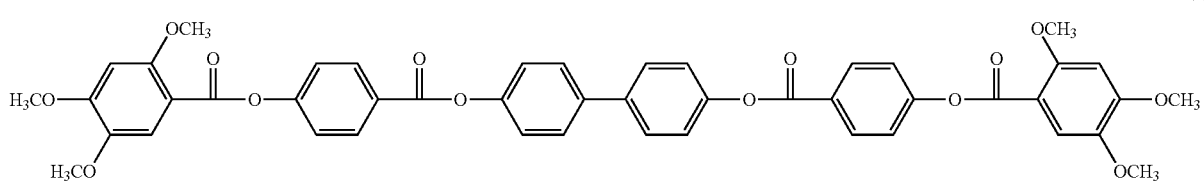

(1)

1. Stretching

After controlling the amount of the residual solvent at 0.1 weight %, the stretching was carried out in the same methods as in Examples 1 and 2. At this time, the slack in the TD direction and the cooling rate after stretching were performed in the methods mentioned in Tables 3 and 4, thereby obtaining a ratio of the film width before and after stretching as shown in Tables 3 and 4.

The evaluation results of the stretched films obtained as described above are shown in Tables 3 and 4. The longitudinal stretching wars performed by using different transportation speeds of nip rollers. Further, when the nip rollers used for the stretching were disposed in the stretching zone, an indication of "Inside" was indicated in Tables 3 and 4, and when they were disposed outside the stretching zone, an indication of "Outside" was indicated in Tables 3 and 4. The transverse stretching was performed by a method of using a tenter at (Tg+10)° C. for all the samples.

The Re values and Rth values (averages) and the variation ratios of these values were measured and are shown in Tables 3 and 4. Adhesion unevenness was also measured and is shown in Tables 3 and 4.

3. Preparation of Polarizing Plate:

(1) Surface Treatment

The stretched cellulosed acylate film was subjected to the same immersion saponification of Examples 1 and 2.

(2) Preparation of Polarizing Film

A polarizing film having a thickness of 20 μm was prepared according to the parallel stretching method of Examples 1 and 2.

(3) Lamination

The polarizing film was held between each of the aforementioned saponified cellulose acylate films (phase difference plates) and a saponified protective layer for polarizing plate (Fuji Tack, manufactured by Fuji Photo Film Co., Ltd.) in the same methods as in Examples 1 and 2. This was placed in an air thermostat at 80° C. for 24 hours and immediately thereafter, was attached to the VA typo liquid crystal display described and evaluated by visual inspection for occurrences of display unevenness per unit area (proportion of area at which the frame-like failure occurred) in the same methods as in Examples 1 and 2. The results were indicated in Tables 3 and 4. Incidentally, with respect to the evaluation of the frame-like failure, the liquid crystal display place was displayed entirely black and carried into a completely dark room, a region where light leakage occurred was marked by visual inspection, and that area was divided by the entire area of the liquid crystal display plate and expressed in terms of percentage.

4. Preparation of Optical Compensation Film

The cellulose acylate film applied with a liquid crystal layer described in Japanese Patent Laid-open Publication No. 11-316379, Example 1 was replaced with the cellulose acylate films of the present invention. As a result, favorable optical compensation films could be prepared as shown in Tables 3 and 4 (indicated as "Optical compensation film A").

The cellulose acylate film applied with a liquid crystal layer described in Japanese Patent Laid-open Publication No. 7-333433, Example 1 was replaced with the stretched cellulose acylate films of the present invention to prepare optical compensation filter films. As a result, favorable optical compensation films could be prepared (indicated as "Optical compensation film B").

5. Preparation of Low Reflective Film

Low reflective films were prepared by using the cellulose acylate films of the present invention according to Kokai Giho of Japan Institute of Invention and Innovation, Kogi No. 2001-1745, Example 47. As a result, superior optical performance could be obtained.

6. Preparation of Liquid Crystal Display Device

The aforementioned polarizing plates of the present invention were used in the liquid crystal display device described in Japanese Patent Laid-open Publication No. 10-48420, Example 1, optically anisotropic layer containing discotic liquid crystal molecules and oriented film applied with polyvinyl alcohol described in Japanese Patent Laid-open Publication No. 9-26572, Example 1, 20-inch VA type liquid crystal display device described in Japanese Patent Laid-open Publication No. 2000-154261, FIGS. 2 to 9, and 20-inch OCB type liquid crystal display device described in Japanese Patent Laid-open Publication No. 2000-154261, FIGS. 10 to 15. Further, the low reflective films of the present invention were adhered to the outermost layers of these liquid crystal display devices and evaluated. As a result, favorable liquid crystal display devices showing no display unevenness originated in the adhesion marks could be obtained as shown in Tables 3 and 4.

TABLE 3

| | cellulose acytate | | | | | | | optical | | |
| | substitution degree | | | | | | polymer- | anisotropy controlling agent | | |
| | acetyl group (A) | propionyl group (B1) | butyryl group (B2) | pentanoyl group (B3) | hexanoyl group (B4) | B (sum of B1-B4) | A + B | ization degree | material | amount (wt %) | Tg (° C.) |
|---|---|---|---|---|---|---|---|---|---|---|---|
| Example 3-1 | 1.0 | | 1.7 | | | 1.7 | 2.7 | 200 | C | 6 | 112 |
| Example 3-2 | 1.0 | | 1.7 | | | 1.7 | 2.7 | 200 | C | 6 | 112 |
| Example 3-3 | 1.0 | | 1.7 | | | 1.7 | 2.7 | 200 | C | 6 | 112 |
| Example 3-4 | 1.0 | | 1.7 | | | 1.7 | 2.7 | 200 | C | 6 | 112 |
| Example 3-5 | 1.0 | | 1.7 | | | 1.7 | 2.7 | 200 | C | 6 | 112 |
| Example 3-6 | 1.0 | | 1.7 | | | 1.7 | 2.7 | 200 | C | 6 | 112 |
| Example 3-7 | 1.0 | | 1.7 | | | 1.7 | 2.7 | 200 | C | 6 | 112 |
| Example 3-8 | 1.0 | | 1.7 | | | 1.7 | 2.7 | 200 | C | 6 | 112 |
| Example 3-9 | 1.0 | | 1.7 | | | 1.7 | 2.7 | 200 | C | 6 | 112 |
| Example 3-10 | 1.0 | | 1.7 | | | 1.7 | 2.7 | 200 | C | 6 | 112 |
| Example 3-11 | 1.0 | | 1.7 | | | 1.7 | 2.7 | 200 | C | 6 | 112 |
| Example 3-12 | 1.0 | | 1.7 | | | 1.7 | 2.7 | 200 | C | 6 | 112 |
| Example 3-13 | 1.0 | | 1.7 | | | 1.7 | 2.7 | 200 | C | 6 | 112 |
| Example 3-14 | 1.0 | | 1.7 | | | 1.7 | 2.7 | 200 | C | 6 | 112 |

TABLE 3-continued

| | | | | | | | | | | |
|---|---|---|---|---|---|---|---|---|---|---|
| Example 3-15 | 1.0 | | 1.7 | | 1.7 | 2.7 | 200 | C | 6 | 112 |
| Example 3-16 | 1.0 | | 1.7 | | 1.7 | 2.7 | 200 | C | 6 | 112 |
| Example 3-17 | 1.0 | | 1.7 | | 1.7 | 2.7 | 200 | C | 2.0 | 102 |
| Example 3-18 | 1.0 | | 1.7 | | 1.7 | 2.7 | 200 | C | 0 | 122 |
| Example 3-19 | 1.2 | | 1.3 | | 1.3 | 2.5 | 200 | C | 6 | 135 |
| Example 3-20 | 0.4 | | 2.5 | | 2.5 | 2.9 | 200 | C | 6 | 92 |
| Example 3-21 | 1.2 | | 1.2 | | 1.2 | 2.4 | 200 | C | 6 | 147 |
| Example 3-22 | 0.2 | 2.7 | | | 2.7 | 2.9 | 250 | D | 4 | 117 |
| Example 3-23 | 0.0 | 2.95 | | | 2.85 | 2.95 | 250 | D | 4 | 114 |
| Example 3-24 | 0.5 | 2.0 | | | 2.0 | 2.5 | 250 | D | 4 | 130 |
| Example 3-25 | 0.7 | | 1.0 | 1.0 | 2.0 | 2.7 | 170 | A | 12 | 103 |
| Example 3-26 | 0.2 | 1.5 | | 1.0 | 2.5 | 0.2 | 170 | B | 18 | 97 |

| | stretching LD | | | | | | | | |
|---|---|---|---|---|---|---|---|---|---|
| | length/width ratio | roller's placement | temperature minus Tg (° C.) | stretching tone temperature minus Tg (° C.) | number of rollers | stretching ratio times | stretching ratio percent | TD stock (%) | after stretching (° C./sec) | width ratio of post-stretching to pre-stretching |
| Example 3-1 | 10 | outside | −55 | +5 | 0 | 1.1 | 10 | 5 | 5 | 0.92 |
| Example 3-2 | 10 | outside | −55 | +5 | 0 | 1.2 | 20 | 5 | 5 | 0.92 |
| Example 3-3 | 10 | outside | −55 | +5 | 0 | 1.05 | 5 | 5 | 5 | 0.92 |
| Example 3-4 | 10 | outside | −55 | +5 | 0 | 1.3 | 30 | 5 | 5 | 0.92 |
| Example 3-5 | 10 | outside | −55 | +5 | 0 | 1.5 | 50 | 5 | 5 | 0.52 |
| Example 3-6 | 10 | outside | −55 | +5 | 0 | 1.4 | 40 | 5 | 5 | 0.92 |
| Example 3-7 | 10 | outside | −55 | +5 | 0 | 2 | 100 | 5 | 5 | 0.92 |
| Example 3-8 | 10 | outside | −55 | +5 | 0 | 1.45 | 45 | 5 | 5 | 0.92 |
| Example 3-9 | 10 | outside | −55 | +5 | 0 | 1.1 | 10 | 0.5 | 5 | 0.92 |
| Example 3-10 | 10 | outside | −55 | +5 | 0 | 1.1 | 10 | 3 | 5 | 0.03 |
| Example 3-11 | 10 | outside | −55 | +5 | 0 | 1.1 | 10 | 20 | 5 | 0.99 |
| Example 3-12 | 10 | outside | −55 | +5 | 0 | 1.1 | 10 | 45 | 5 | 0.05 |
| Example 3-13 | 10 | outside | −55 | +5 | 0 | 1.1 | 10 | 0 | 5 | 0.05 |
| Example 3-14 | 10 | outside | −55 | +5 | 0 | 1.1 | 10 | 1 | 1 | 0.03 |
| Example 3-15 | 10 | outside | −55 | +5 | 0 | 1.1 | 10 | 1 | 27 | 0.53 |
| Example 3-16 | 10 | outside | −55 | +5 | 0 | 1.1 | 10 | 1 | 33 | 0.92 |
| Example 3-17 | 10 | outside | −55 | +5 | 0 | 1.1 | 10 | 5 | 5 | 0.92 |
| Example 3-18 | 10 | outside | −55 | +5 | 0 | 1.1 | 10 | 5 | 5 | 0.92 |
| Example 3-19 | 10 | outside | −60 | +10 | 0 | 1.1 | 10 | 2.5 | 5 | 0.07 |
| Example 3-20 | 10 | outside | −60 | +10 | 0 | 1.1 | 10 | 2.5 | 5 | 0.57 |
| Example 3-21 | 10 | outside | −60 | +10 | 0 | 1.1 | 10 | 2.5 | 5 | 0.52 |
| Example 3-22 | 10 | outside | −60 | +10 | 0 | 1.1 | 10 | 2.5 | 10 | 0.97 |
| Example 3-23 | 10 | outside | −60 | +10 | 0 | 1.1 | 10 | 2.5 | 10 | 0.97 |
| Example 3-24 | 10 | outside | −60 | +10 | 0 | 1.1 | 10 | 2.5 | 10 | 0.97 |
| Example 3-25 | 10 | outside | −60 | +10 | 0 | 1.05 | 5 | 2.5 | 15 | 0.97 |
| Example 3-26 | 10 | outside | −60 | +10 | 0 | 1.05 | 5 | 2.5 | 15 | 0.97 |

| | stretching TD stretching ratio | | | of strected film Ra | | Rth | | number of adhesion marks | polarizing plate display unevenness | | optical compensation film display unevenness |
|---|---|---|---|---|---|---|---|---|---|---|---|
| | times | percent | LD/TD | average (nm) | variation ratio (%) | average (nm) | variation ratio (%) | (per m$^2$) | unevenness | (%) | (per m$^2$) |
| Example 3-1 | 1.5 | 50 | 0.20 | 70 | 0 | 190 | 0 | 0 | 0 | 0 | 0 |
| Example 3-2 | 1.4 | 40 | 0.50 | 50 | 1 | 200 | 1 | 0 | 0 | 3 | 0 |
| Example 3-3 | 2 | 100 | 0.05 | 100 | 1 | 250 | 1 | 0 | 0 | 0 | 0 |
| Example 3-4 | 1.46 | 45 | 0.57 | 30 | 2 | 220 | 3 | 0 | 0 | 25 | 0 |
| Example 3-5 | 1.1 | 10 | 5.00 | 55 | 1 | 170 | 1 | 0 | 0 | 2 | 0 |
| Example 3-6 | 1.2 | 20 | 2.00 | 55 | 2 | 100 | 2 | 0 | 0 | 6 | 0 |
| Example 3-7 | 1.05 | 5 | 20.00 | 50 | 2 | 230 | 2 | 0 | 0 | 1 | 0 |
| Example 3-8 | 1.3 | 30 | 1.50 | 25 | 4 | 300 | 4 | 0 | 0 | 35 | 0 |
| Example 3-9 | 1.5 | 50 | 0.20 | 70 | 1 | 100 | 1 | 0 | 0 | 0 | 0 |
| Example 3-10 | 1.5 | 50 | 0.20 | 70 | 0 | 205 | 0 | 0 | 0 | 0 | 0 |
| Example 3-11 | 1.5 | 50 | 0.20 | 70 | 0 | 210 | 0 | 0 | 0 | 0 | 0 |
| Example 3-12 | 1.5 | 50 | 0.20 | 70 | 0 | 210 | 0 | 0 | 0 | 0 | 0 |
| Example 3-13 | 1.5 | 50 | 0.20 | 70 | 4 | 140 | 1 | 0 | 0 | 0 | 0 |
| Example 3-14 | 1.5 | 50 | 0.70 | 70 | 1 | 230 | 1 | 0 | 0 | 0 | 0 |
| Example 3-15 | 1.5 | 50 | 0.20 | 70 | 0 | 210 | 0 | 0 | 0 | 0 | 0 |
| Example 3-16 | 1.5 | 50 | 0.30 | 70 | 4 | 146 | 4 | 0 | 6 | 0 | 3 |
| Example 3-17 | 1.5 | 50 | 0.20 | 50 | 1 | 150 | 1 | 0 | 0 | 0 | 0 |
| Example 3-18 | 1.5 | 50 | 0.20 | 15 | 4 | 75 | 4 | 1 | 1 | 0 | 0 |
| Example 3-19 | 1.5 | 50 | 0.20 | 50 | 1 | 140 | 1 | 0 | 0 | 0 | 0 |

TABLE 3-continued

| Example 3-20 | 1.5 | 50 | 0.20 | 50 | 1 | 150 | 1 | 0 | 0 | 0 | 0 |
|---|---|---|---|---|---|---|---|---|---|---|---|
| Example 3-21 | 1.5 | 50 | 0.20 | 40 | 3 | 130 | 3 | 5 | 7 | 0 | 4 |
| Example 3-22 | 1.8 | 50 | 0.13 | 50 | 1 | 240 | 1 | 0 | 0 | 0 | 0 |
| Example 3-23 | 1.8 | 50 | 0.13 | 50 | 1 | 300 | 2 | 1 | 1 | 0 | 1 |
| Example 3-24 | 1.8 | 50 | 0.13 | 30 | 1 | 200 | 1 | 0 | 0 | 0 | 0 |
| Example 3-25 | 1.7 | 70 | 0.07 | 50 | 2 | 300 | 2 | 3 | 3 | 0 | 3 |
| Example 3-26 | 1.7 | 70 | 0.07 | 50 | 2 | 280 | 2 | 2 | 2 | 0 | 2 |

TABLE 4

| | cellulose acytate | | | | | | | polymer- | plasticizer | | Tg |
|---|---|---|---|---|---|---|---|---|---|---|---|
| | substitution degree | | | | | | | ization | | amount | |
| | acetyl group (A) | propionyl group (B1) | butyryl group (B2) | pentanoyl group (B3) | hexanoyl group (B4) | B (sum of B1-B4) | A + B | degree | material | (wt %) | (° C.) |
| Example 4-1  | 1.0 | | 1.7 | | | 1.7 | 2.7 | 200 | D | 6 | 111 |
| Example 4-2  | 1.0 | | 1.7 | | | 1.7 | 2.7 | 200 | D | 6 | 111 |
| Example 4-3  | 1.0 | | 1.7 | | | 1.7 | 2.7 | 200 | D | 6 | 111 |
| Example 4-4  | 1.0 | | 1.7 | | | 1.7 | 2.7 | 200 | D | 6 | 111 |
| Example 4-5  | 1.0 | | 1.7 | | | 1.7 | 2.7 | 200 | D | 6 | 111 |
| Example 4-6  | 1.0 | | 1.7 | | | 1.7 | 2.7 | 200 | D | 6 | 111 |
| Example 4-7  | 1.0 | | 1.7 | | | 1.7 | 2.7 | 200 | D | 6 | 111 |
| Example 4-8  | 1.0 | | 1.7 | | | 1.7 | 2.7 | 200 | D | 6 | 111 |
| Example 4-9  | 1.0 | | 1.7 | | | 1.7 | 2.7 | 200 | D | 6 | 111 |
| Example 4-10 | 1.0 | | 1.7 | | | 1.7 | 2.7 | 200 | D | 6 | 111 |
| Example 4-11 | 1.0 | | 1.7 | | | 1.7 | 2.7 | 200 | D | 6 | 111 |
| Example 4-12 | 1.0 | | 1.7 | | | 1.7 | 2.7 | 200 | D | 6 | 111 |
| Example 4-13 | 1.0 | | 1.7 | | | 1.7 | 2.7 | 200 | D | 6 | 111 |
| Example 4-14 | 1.0 | | 1.7 | | | 1.7 | 2.7 | 200 | D | 6 | 111 |
| Example 4-15 | 1.0 | | 1.7 | | | 1.7 | 2.7 | 200 | D | 6 | 111 |
| Example 4-16 | 1.0 | | 1.7 | | | 1.7 | 2.7 | 200 | D | 6 | 111 |
| Example 4-17 | 1.2 | | 1.3 | | | 1.3 | 2.5 | 200 | D | 6 | 134 |
| Example 4-18 | 0.4 | | 2.5 | | | 2.5 | 2.9 | 200 | D | 6 | 92 |
| Example 4-19 | 1.2 | | 1.2 | | | 1.2 | 2.4 | 200 | D | 6 | 147 |
| Example 4-20 | 0.2 | 2.7 | | | | 2.7 | 2.8 | 200 | C | 2 | 157 |
| Example 4-21 | 0.0 | 2.95 | | | | 2.95 | 2.95 | 200 | C | 2 | 143 |
| Example 4-22 | 0.5 | 2.0 | | | | 2.0 | 2.5 | 200 | C | 6 | 173 |
| Example 4-23 | 0.7 | | 1.0 | 1.0 | | 2.0 | 2.7 | 200 | B | 18 | 100 |
| Example 4-24 | 0.2 | 1.5 | | | 1.0 | 2.5 | 2.7 | 200 | A | 12 | 106 |

| | | rollers | stretching none | stretching LD | | | | | rate after stretching | width ratio of post-stretching to pre-stretching |
|---|---|---|---|---|---|---|---|---|---|---|
| | length/width ratio | placement | temperature minus Tg (° C.) | temperature minus Tg (° C.) | number of rollers | stretching ratio times | stretching ratio percent | TD stock (%) | (° C./sec) | |
| Example 4-1 | 10 | outside | −55 | +5 | 0 | 1.1 | 10 | 5 | 5 | 0.92 |
| Example 4-2 | 10 | outside | −55 | +5 | 0 | 1.1 | 20 | 5 | 5 | 0.92 |
| Example 4-3 | 10 | outside | −55 | +5 | 0 | 1.05 | 5 | 5 | 5 | 0.92 |
| Example 4-4 | 10 | outside | −55 | +5 | 0 | 1.3 | 30 | 5 | 5 | 0.92 |
| Example 4-5 | 10 | outside | −55 | +5 | 0 | 1.5 | 50 | 5 | 5 | 0.92 |
| Example 4-6 | 10 | outside | −55 | +5 | 0 | 1.4 | 40 | 5 | 5 | 0.92 |
| Example 4-7 | 10 | outside | −55 | +5 | 0 | 2 | 100 | 5 | 5 | 0.92 |
| Example 4-8 | 10 | outside | −55 | +5 | 0 | 1.45 | 45 | 5 | 5 | 0.92 |

TABLE 4-continued

| Example | | | | | stretching | | | evaluation of stretched film | | | | number of adhesion marks (per m²) | polarizing plate | | optical compensation film |
|---|---|---|---|---|---|---|---|---|---|---|---|---|---|---|---|
| | | | | | TD stretching ratio | | | Ra | | Rth | | | display unevenness | frame- (%) | display unevenness (per m²) |
| | | | | | times | percent | LD/TD | average (nm) | variation ratio (%) | average (nm) | variation ratio (%) | | | | |
| Example 4-1 | | | | | 1.5 | 50 | 0.20 | 65 | 0 | 100 | 0 | 0 | 0 | 0 | 0 |
| Example 4-2 | | | | | 1.4 | 40 | 0.50 | 55 | 1 | 200 | 1 | 0 | 0 | 3 | 0 |
| Example 4-3 | | | | | 2 | 100 | 0.05 | 95 | 1 | 250 | 1 | 0 | 0 | 0 | 0 |
| Example 4-4 | | | | | 1.45 | 45 | — | 25 | 3 | 32 | 3 | 0 | 0 | 24 | 0 |
| Example 4-5 | | | | | 1.1 | 10 | 5.00 | 60 | 1 | 175 | 1 | 0 | 0 | 2 | 0 |
| Example 4-6 | | | | | 1.2 | 20 | 2.00 | 50 | 2 | 150 | 2 | 0 | 0 | 5 | 0 |
| Example 4-7 | | | | | 1.05 | 5 | 20.00 | 35 | 2 | 275 | 2 | 0 | 0 | 1 | 0 |
| Example 4-8 | | | | | 1.5 | 30 | 1.50 | 20 | 4 | 206 | 4 | 0 | 0 | 36 | 0 |
| Example 4-9 | 10 | outside | +5 | −55 | 1.5 | 50 | 0.20 | 65 | 1 | 150 | 1 | 10 | 0.5 | 5 | 0 |
| Example 4-10 | 10 | outside | +5 | −55 | 1.5 | 50 | 0.20 | 65 | 0 | 230 | 0 | 10 | 3 | 5 | 0 |
| Example 4-11 | 10 | outside | +5 | −55 | 1.5 | 50 | 0.20 | 65 | 0 | 220 | 0 | 10 | 20 | 5 | 0 |
| Example 4-12 | 10 | outside | +5 | −55 | 1.5 | 50 | 0.20 | 65 | 4 | 220 | 4 | 10 | 48 | 5 | 0 |
| Example 4-13 | 10 | outside | +5 | −55 | 1.5 | 50 | 0.20 | 65 | 1 | 245 | 1 | 10 | 0 | 5 | 0 |
| Example 4-14 | 10 | outside | +5 | −55 | 1.5 | 50 | 0.20 | 65 | 0 | 32 | 0 | 10 | 1 | 1 | 9 |
| Example 4-15 | 10 | outside | +5 | −55 | 1.5 | 50 | 0.20 | 45 | 4 | 135 | 4 | 10 | 1 | 27 | 0 |
| Example 4-16 | 10 | outside | +5 | −55 | 1.5 | 50 | 0.20 | 45 | 1 | 145 | 1 | 10 | 1 | 33 | 3 |
| Example 4-17 | 10 | outside | +10 | −80 | 1.5 | 50 | 0.20 | 35 | 3 | 155 | 2 | 10 | 2.5 | 5 | 0 |
| Example 4-18 | 10 | outside | +10 | −80 | 1.5 | 50 | 0.20 | 55 | 1 | 135 | 1 | 10 | 2.5 | 5 | 9 |
| Example 4-19 | 10 | outside | +10 | −80 | 1.5 | 50 | 0.20 | 80 | 1 | 250 | 1 | 10 | 2.5 | 5 | 0 |
| Example 4-20 | 10 | outside | +10 | −80 | 1.8 | 80 | 0.13 | 25 | 1 | 300 | 1 | 10 | 2.5 | 10 | 0 |
| Example 4-21 | 10 | outside | +10 | −80 | 1.8 | 80 | 0.13 | 50 | 1 | 285 | 1 | 10 | 2.5 | 10 | 2 |
| Example 4-22 | 10 | outside | +10 | −80 | 1.8 | 80 | 0.13 | 35 | 1 | 345 | 1 | 10 | 2.5 | 10 | 1 |
| Example 4-23 | 10 | outside | +10 | −80 | 1.7 | 70 | 0.07 | 50 | 1 | 275 | 1 | 5 | 2.5 | 10 | 4 |
| Example 4-24 | 10 | outside | +10 | −80 | 1.7 | 70 | 0.07 | 35 | 1 | — | 1 | 5 | 2.5 | 10 | 6 |

The present disclosure relates to the subject matter contained in Japanese Patent Application No. 079973/2004 filed on Mar. 19, 2004, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A cellulose acylate film showing 10 marks/m$^2$ or less of adhesion marks and having an in-plane retardation value (Re value) of 10 to 200 nm and a retardation value along the thickness direction (Rth value) of 30 to 500 nm; wherein the film is obtained by longitudinally stretching at an L/W ratio of more than 2 and not more than 50, using two or more pairs of nip rollers.

2. The cellulose acylate film of claim 1, which shows variation ratios of 5% or less for the Re value and Rth value along both of the width direction and the longitudinal direction.

3. The cellulose acylate film of claim 1, wherein the cellulose acylate film satisfies the following equations (3) and (4):

$$2.5 \leq A+B < 3.0 \qquad \text{Equation (3)}$$

$$1.25 \leq B < 3 \qquad \text{Equation (4)}$$

wherein, in the equations (3) and (4), A represents a substitution degree of acetyl groups, and B represents the sum of substitution degrees of propionyl groups, butyryl groups, pentanoyl groups and hexanoyl groups.

4. The cellulose acylate film of claim 1, which is transversely stretched by 1.05 to 2.5 times.

5. The cellulose acylate film of claim 1, which is stretched with a ratio of longitudinal stretching to transverse stretching of 0.05 to 0.5.

6. The cellulose acylate film of claim 1, which is stretched with a ratio of longitudinal stretching to transverse stretching of 2 to 20.

7. The cellulose acylate film of claim 1, which is formed by a melt film formation method.

8. The cellulose acylate film of claim 1, which comprises 1 to 20% of a plasticizer.

9. The cellulose acylate film of claim 1, which is formed by a solution film formation method.

10. The cellulose acylate film of claim 8, which is obtained by stretching a cellulose acylate resin containing 3% by weight or less of a residual amount of a solvent used for dissolving the cellulose acylate resin in the solution film formation method.

11. The cellulose acylate film of claim 1, wherein the Rth value is larger than the Re value.

12. An optical material comprising the cellulose acylate film of claim 1.

13. The optical material of claim 12, which is a polarizing plate comprising a polarizing film and at least one layer of the cellulose acylate film provided on the polarizing film.

14. The optical material of claim 12, which is an optical compensation film for liquid crystal display panels comprising the cellulose acylate film.

15. The optical material of claim 12 which is an antireflection film comprising the cellulose acylate film.

16. A method for producing a cellulose acylate film showing 10 marks/m$^2$ or less of adhesion marks and having an in-plane retardation value (Re value) of 10 to 200 nm and a retardation value along the thickness direction (Rth value) of 30 to 500 nm, which comprises longitudinally stretching 1.05 to 3 times a cellulose acylate film having a length/width ratio of more than 2 and not more than 50.

17. The method for producing a cellulose acylate film of claim 16, wherein the film is longitudinally stretched by using two or more pairs of nip rollers installed outside a stretching zone.

18. The method for producing a cellulose acylate film of claim 16, wherein the film is transversely stretched by using a tenter.

19. The method for producing a cellulose acylate film of claim 16, wherein the temperature of two or more pairs of the nip rollers is not lower than (Tg−150)° C. and not more than Tg and the temperature of the stretching zone is (Tg) to (Tg+100)° C. in which Tg is a glass transition temperature of the cellulose acylate film.

20. The method for producing a cellulose acylate film of claim 16, wherein the film is longitudinally stretched while the film is transported in a heat treatment zone in a non-contact state.

21. The cellulose acylate film of claim 1, wherein the stretching temperature is (Tg) to (Tg+100)° C.

22. The cellulose acylate film of claim 1, wherein the two or more pairs of nip rollers are installed outside a stretching zone.

23. The cellulose acylate film of claim 1, wherein the temperature of two or more pairs of nip rollers is not lower than (Tg−150)° C. and not more than Tg° C.

24. The cellulose acylate film of claim 1, wherein the film is obtained by controlling slack in a width direction during the longitudinal stretching at 0.5% to 50%.

* * * * *